United States Patent [19]

Friedman et al.

[11] Patent Number: 4,739,321

[45] Date of Patent: Apr. 19, 1988

[54] DECENTRALIZED LINE RESERVATION INTERFACE WITHIN A LOCAL DATA NETWORK

[75] Inventors: Michael S. Friedman, Irvine; Royce E. Slick, Mission Viejo, both of Calif.

[73] Assignee: Computer Automation, Inc., Irvine, Calif.

[21] Appl. No.: 470,517

[22] Filed: Feb. 28, 1983

[51] Int. Cl.$^4$ .............................................. H04Q 1/00
[52] U.S. Cl. .................................... 340/825.5; 370/85
[58] Field of Search ........... 340/825.5, 825.52, 825.53, 340/825.54, 825.07, 825.08, 825.68; 370/85, 94, 92, 82, 91, 80, 83–84; 371/48, 49, 33; 375/8, 81; 364/200, 900

[56] References Cited

U.S. PATENT DOCUMENTS

| | | |
|---|---|---|
| 3,445,822 | 5/1969 | Driscoll . |
| 4,093,823 | 6/1978 | Chu .................................... 370/80 X |
| 4,096,355 | 6/1978 | Rothauser et al. ................ 370/94 X |
| 4,234,952 | 11/1980 | Gable . |
| 4,251,881 | 2/1981 | Ruether . |
| 4,281,380 | 7/1981 | DeMesa, III et al. ........ 340/825.5 X |
| 4,332,027 | 5/1982 | Malcolm et al. ........................ 370/94 |
| 4,380,052 | 4/1983 | Shima ........................... 340/825.5 X |
| 4,409,592 | 10/1983 | Hunt . |
| 4,409,593 | 10/1983 | Bose . |
| 4,439,859 | 3/1984 | Donnan ................................. 371/32 |
| 4,445,214 | 4/1984 | Reynolds et al. .................. 370/85 X |
| 4,521,891 | 6/1985 | Biba et al. .............................. 375/8 |

FOREIGN PATENT DOCUMENTS 0046831  3/1984  France .

OTHER PUBLICATIONS

Bass et al., Electronics, Local Network Gives New Flexibility to Distributed Processing, 1980, pp. 358–366.
Cannon et al., Understanding Communications Systems, 1980, Texas Instruments, pp. 197 and 200.
Micros, Minis, & Maxis, Technology Thrust Vs. User Requirement, pp. 320–325, Fifteenth IEEE Computer Society International Conference, May 6–9, 1977.
Experimental Packet-Switched Service: Procedures and Protocols, Part 2—Transmission Procedures, by W. Neil, M. J. Spooner and E. J. Wilson, Post Office Electrical Engineers Journal, vol. 68, Nos. 1, pp. 22–28, Apr. 1974.
Telecommunication System Engineering—Analog and Digital Network Design by Roger L. Freeman, 1980, (selected pages).

Primary Examiner—Ulysses Weldon
Attorney, Agent, or Firm—Knobbe, Martens, Olson & Bear

[57] ABSTRACT

An interface modem for use in a broadband local area data network with collision avoidance protocol. The data link controller features hardware acknowledge circuitry that acknowledges the receipt of a perfect data packet immediately upon receipt thereof without request to or assistance by the client data processing unit. The DLC prepares the acknowledgement packet from the incoming data packet and places it on the data link without going through a line acquisition protocol. Each received acknowledgment packet is placed in a transmit buffer at a known location relative to the data packet which was just transmitted, for which it is an acknowledgment so that each acknowledgment packet may be located in less time by the client data processing unit. The acknowledgment packets are logically part of the transmit process and are therefore placed in the transmit buffer.

48 Claims, 55 Drawing Sheets

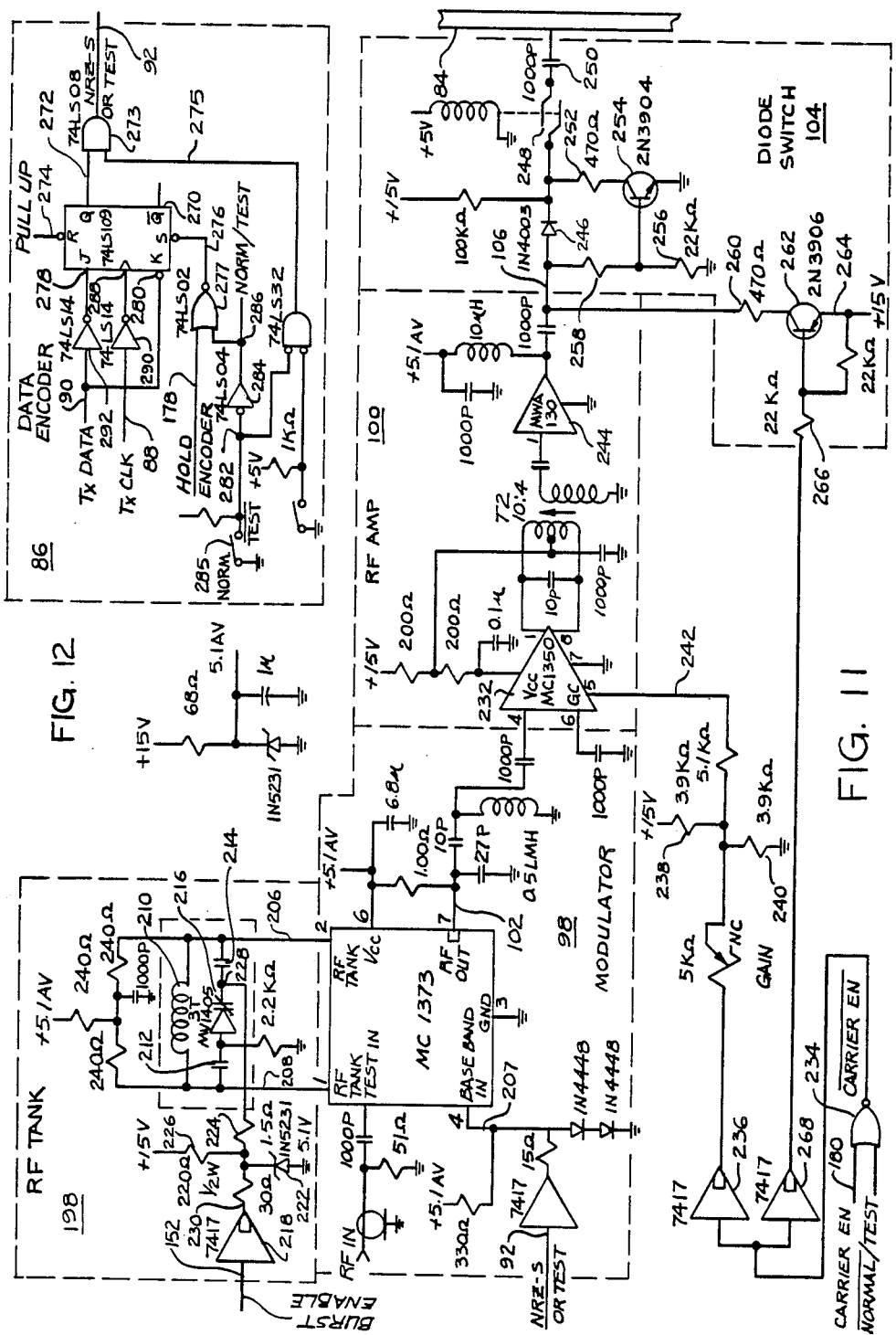

TRANSMIT CYCLE TIMING

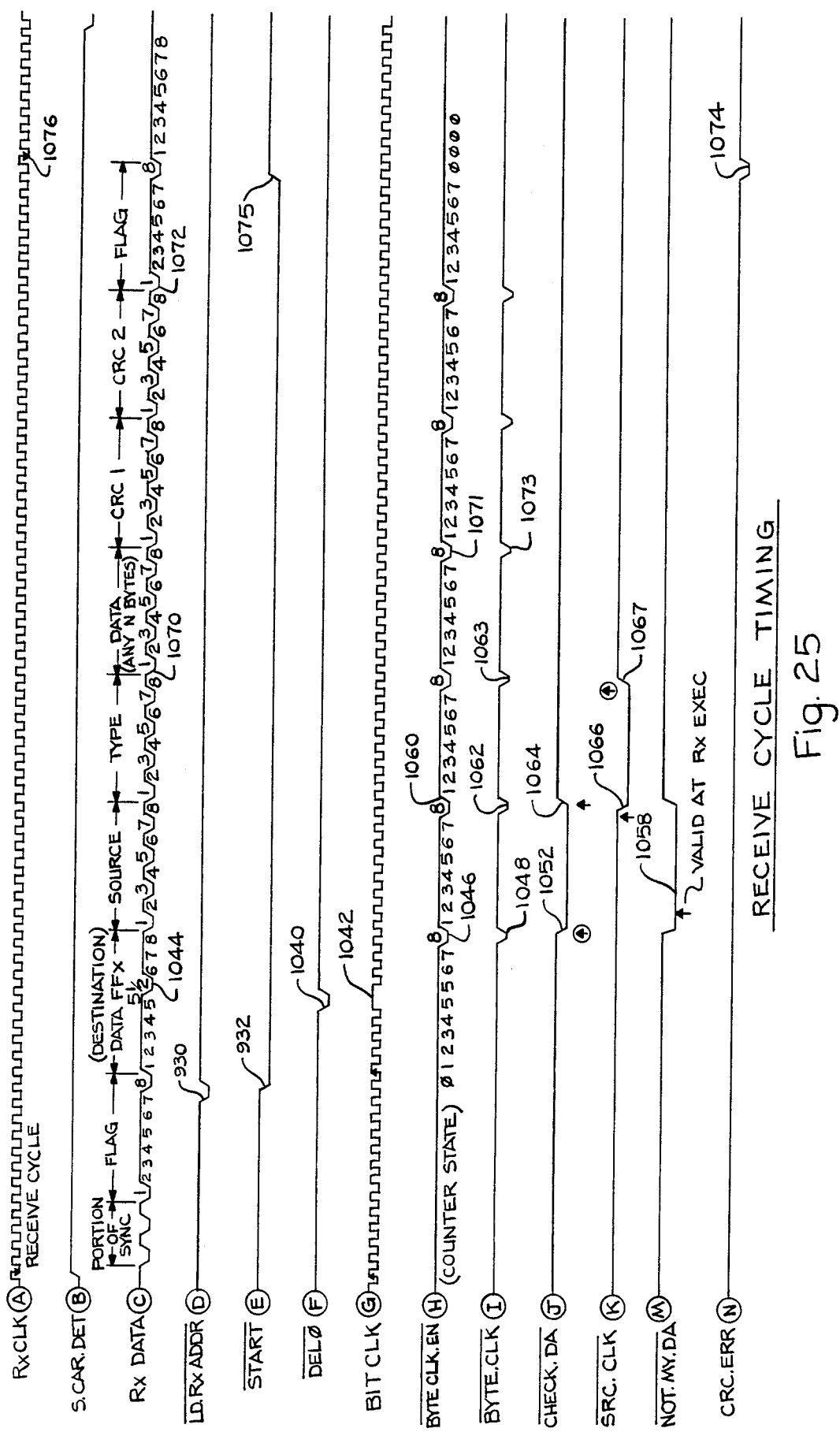

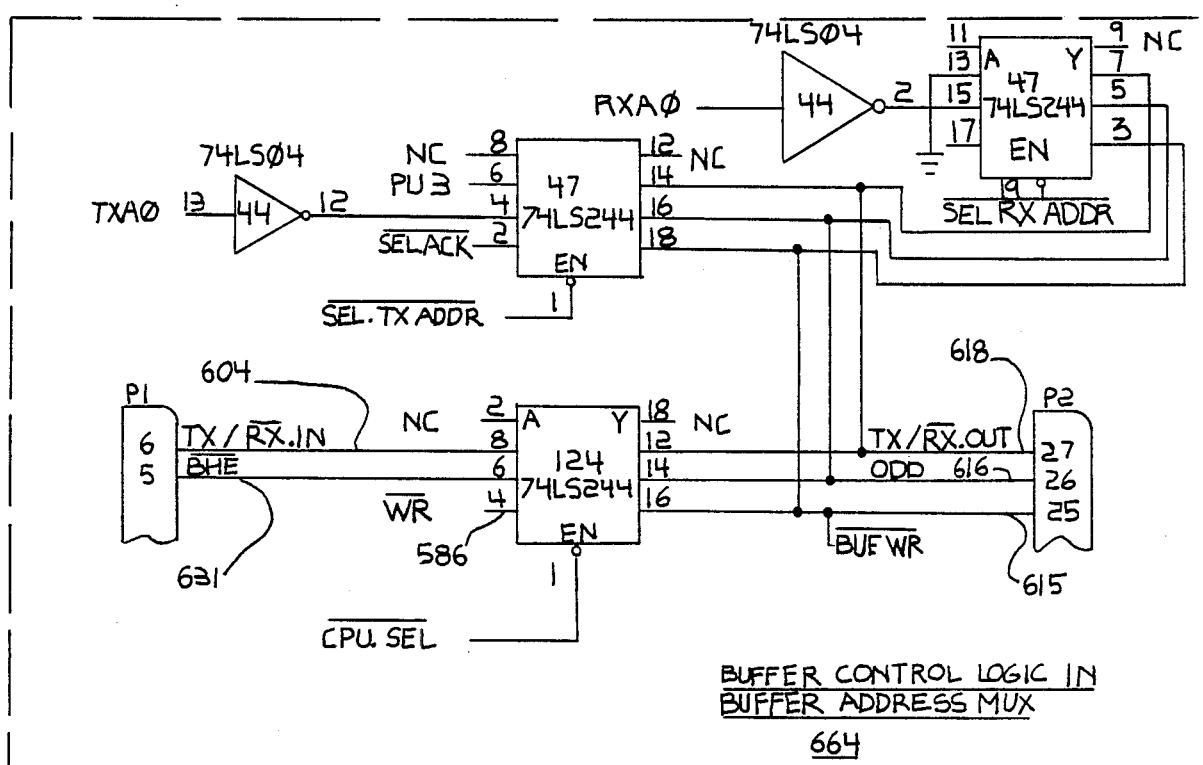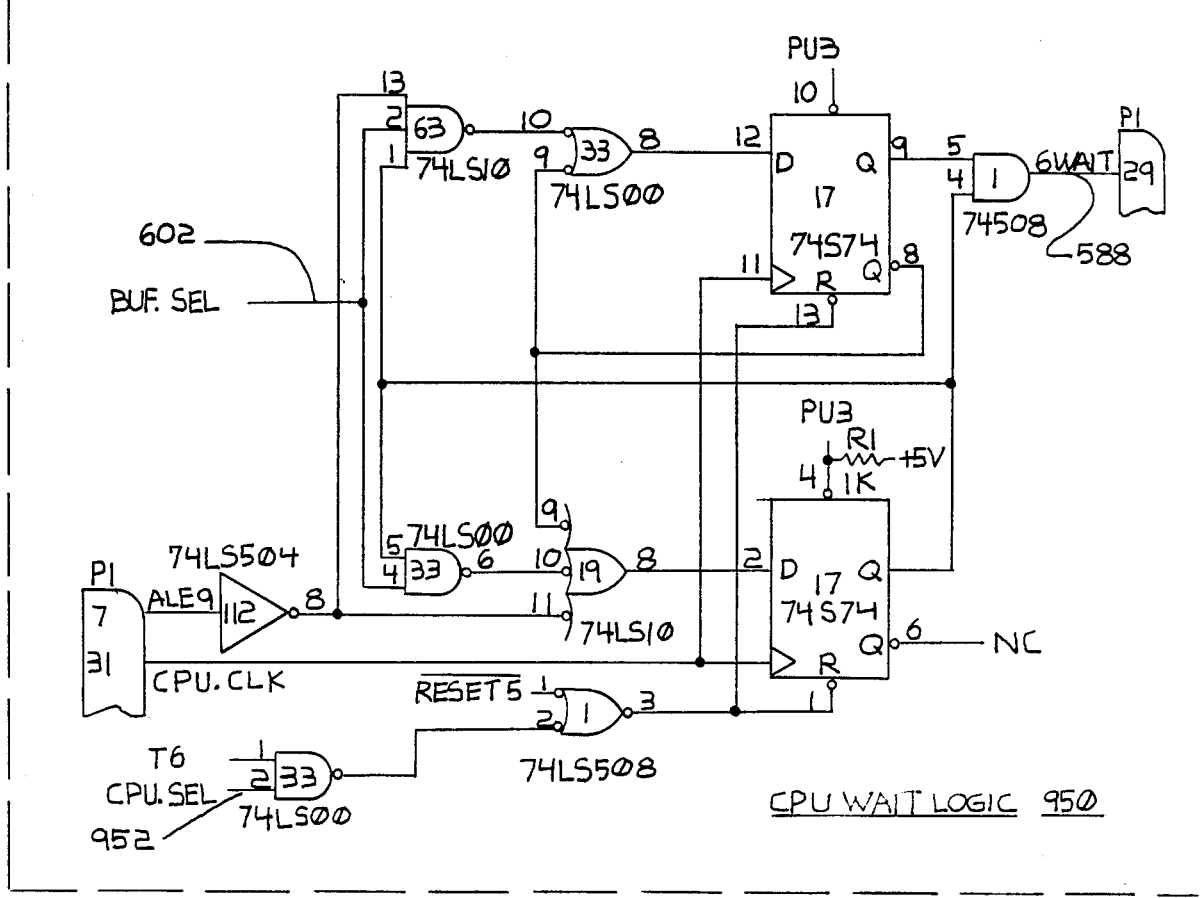
Fig. 31A

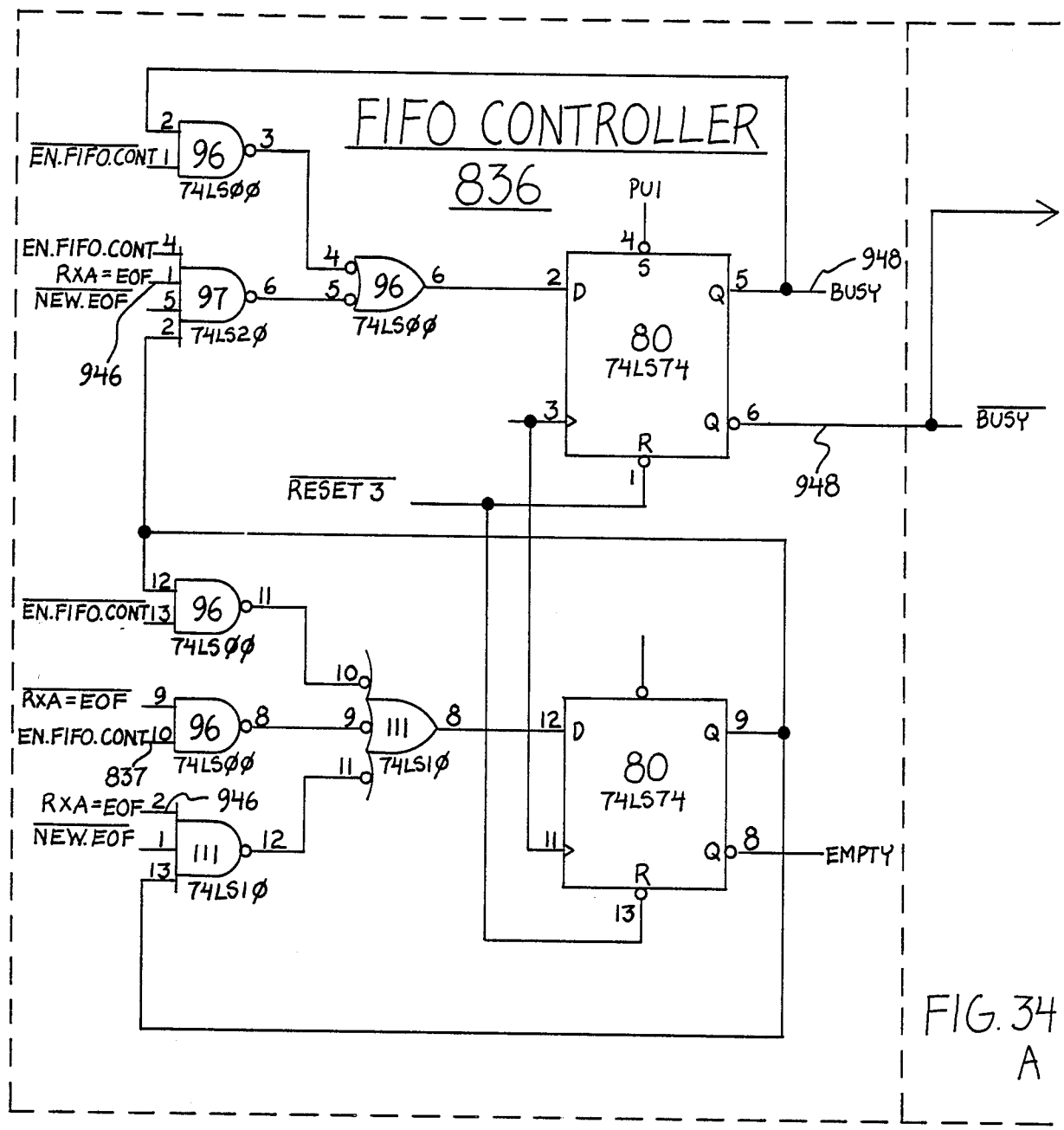
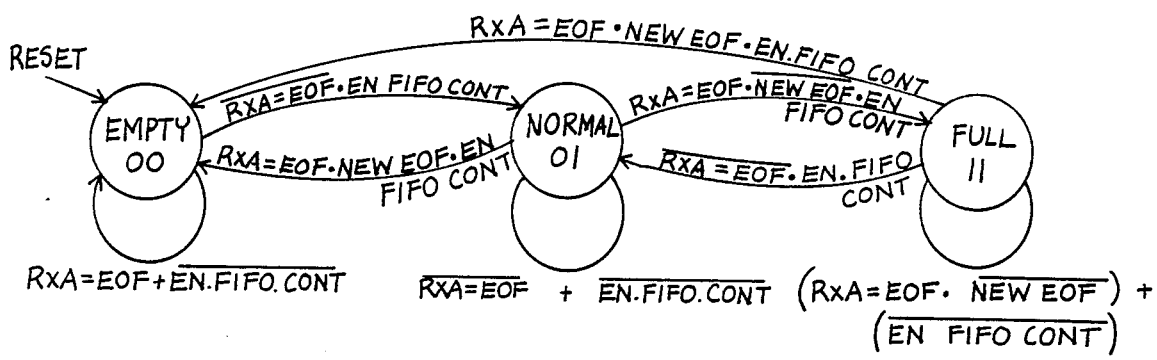
FIG. 34 A

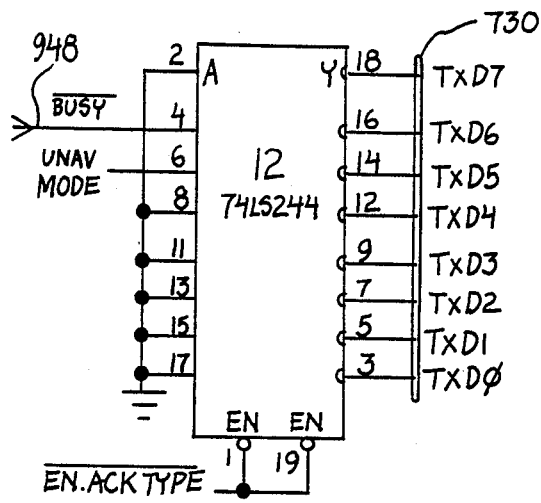
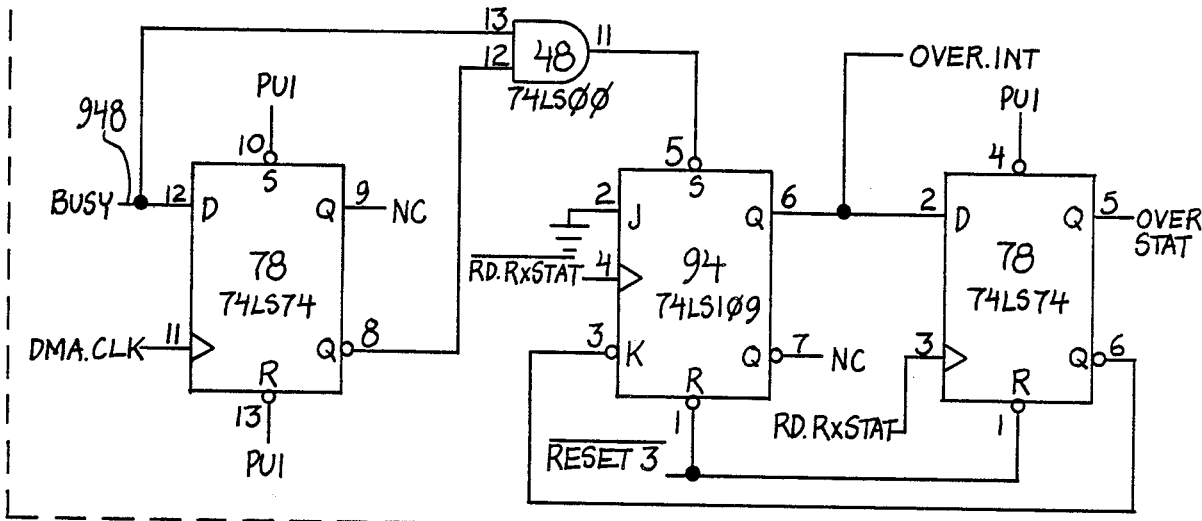
FIG. 34B
ACK TYPE 830
RCVR STATUS REG 670

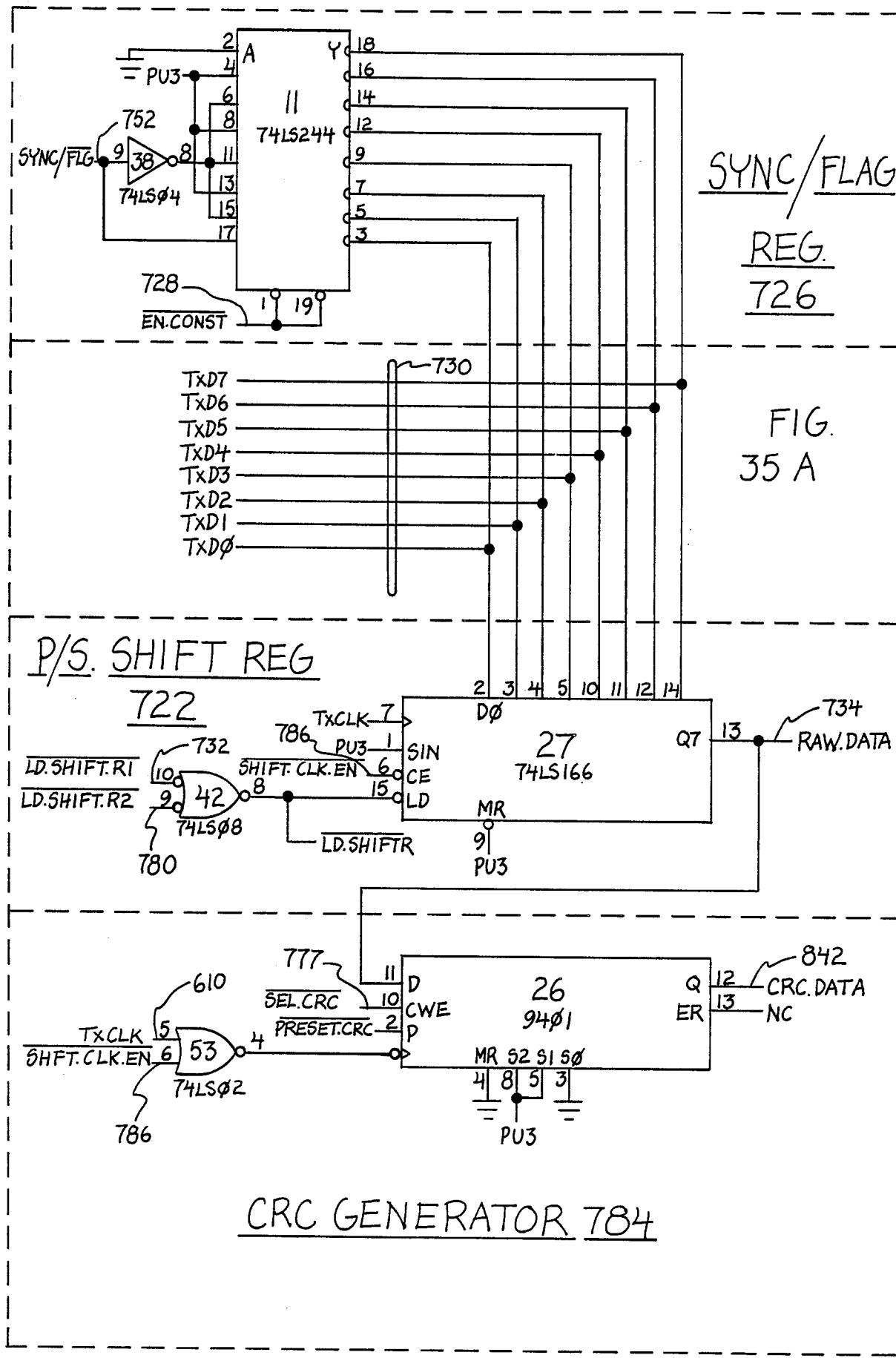

CONTROL INTERFACE 686

CONTROL INTERFACE 686

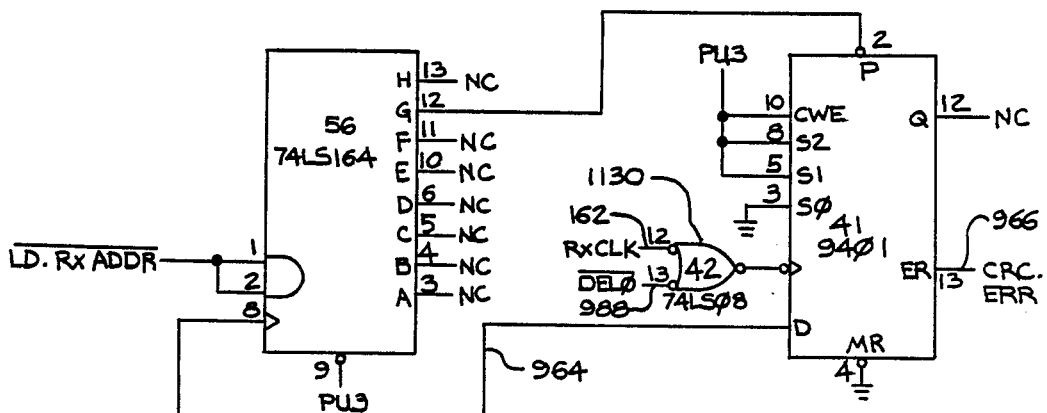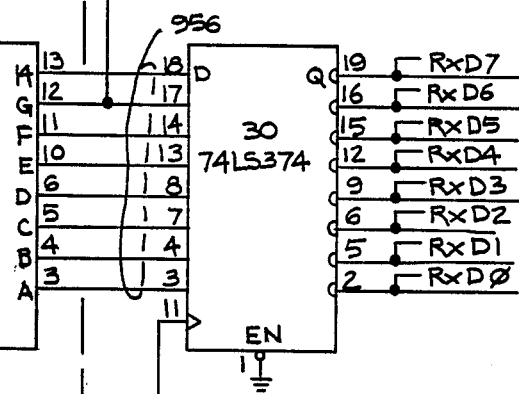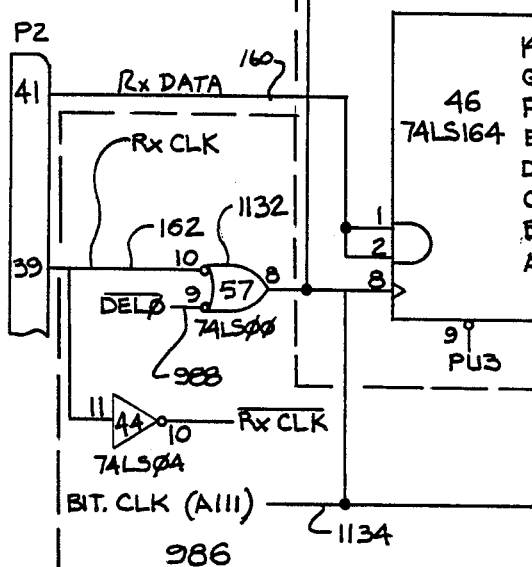
Fig. 37A

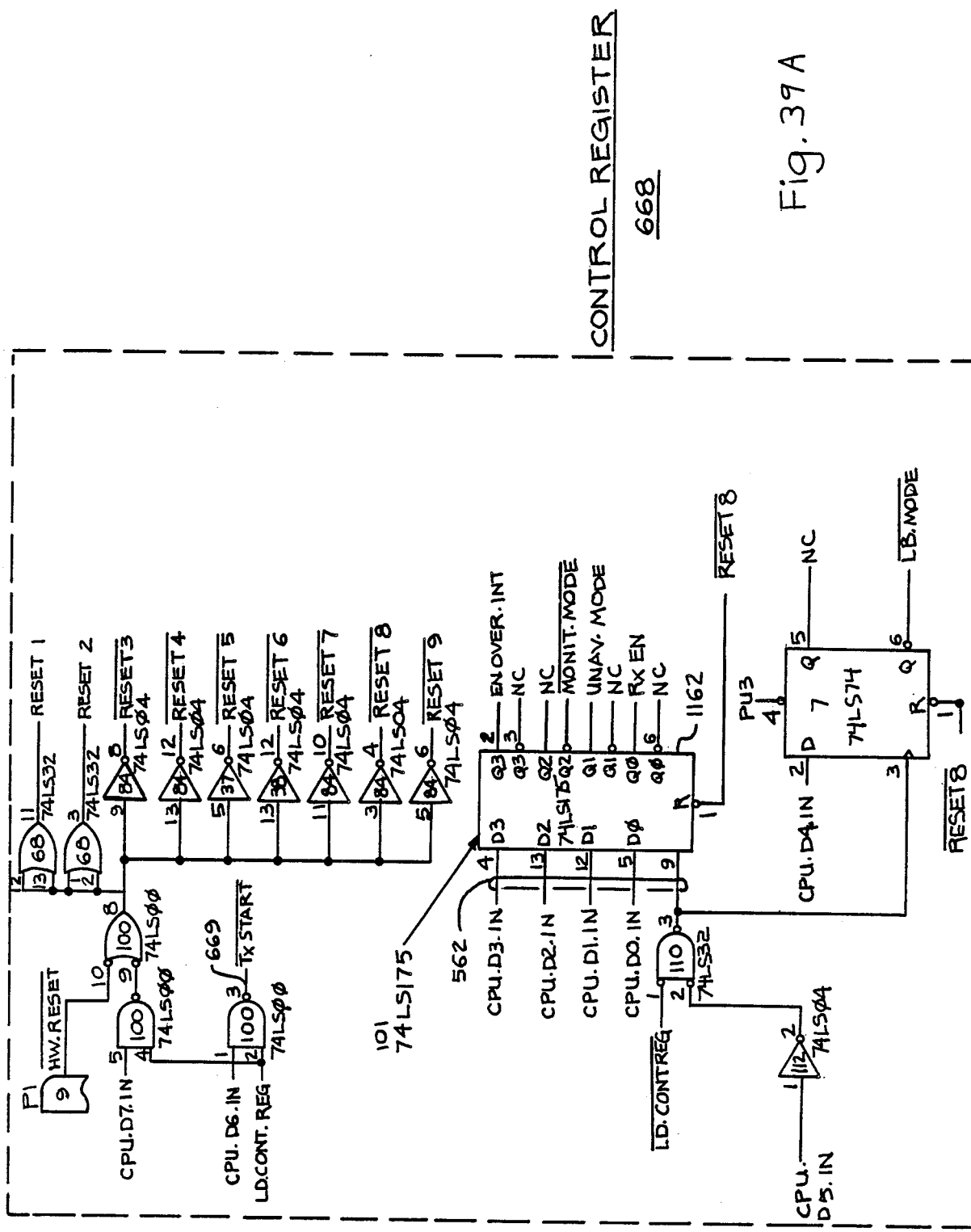

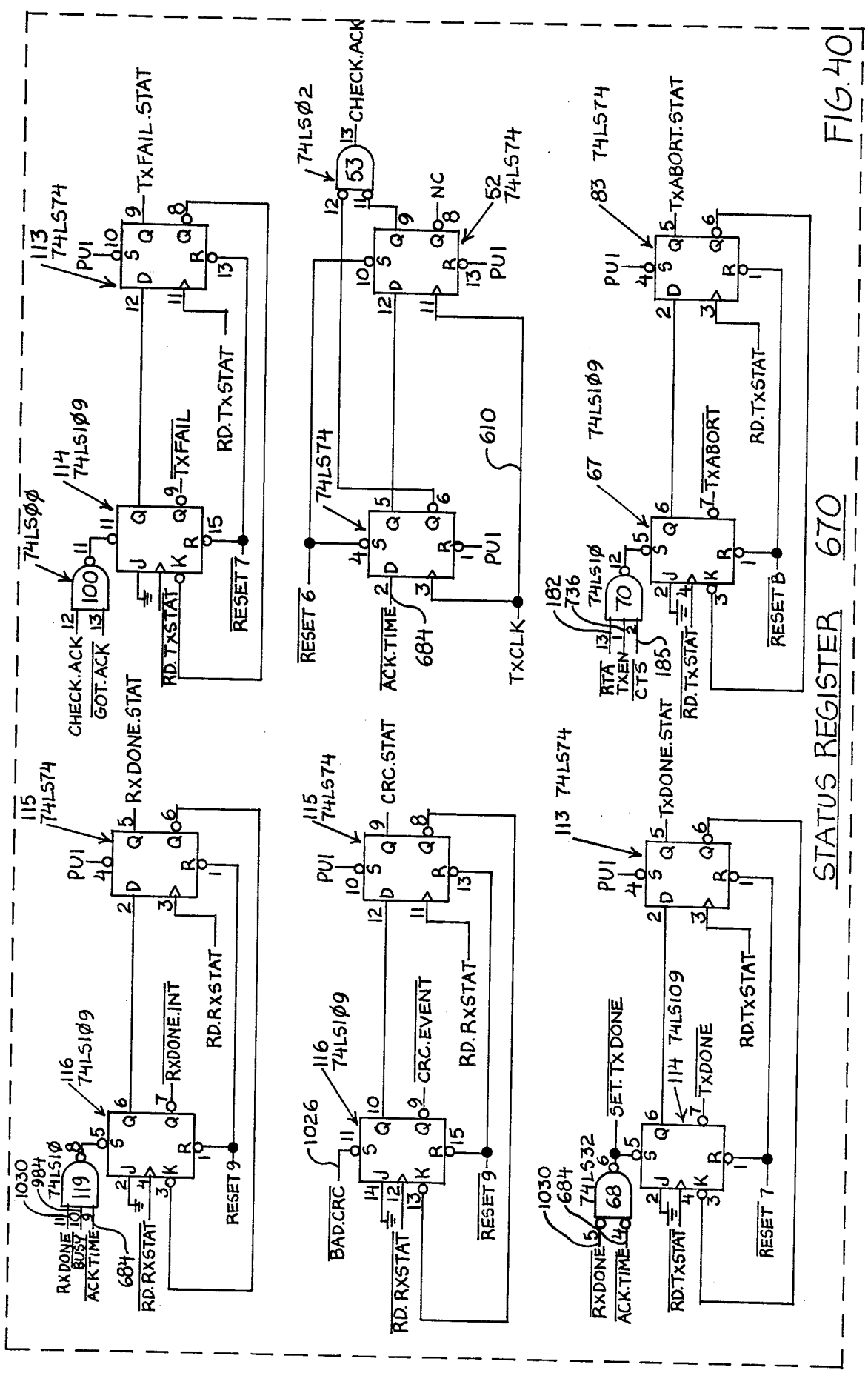

DECENTRALIZED LINE RESERVATION INTERFACE WITHIN A LOCAL DATA NETWORK

BACKGROUND OF THE INVENTION

The invention pertains generally to a data link controller for a local area data network. More particularly the invention relates to a data link controller that causes an acknowledgment packet to be sent without going through a separate line acquisition protocol.

As the computer using segment of the population has grown, it has become more important to share expensive assets among multiple users. For example in large companies with large mainframe CPUs, their associated peripherals, and large central data bases, as well as numerous local devices, task processors and terminals used by individual employees and subdivisions of the company, it is advantageous to have the remote users be able to share the assets of the mainframe CPU. Thus it is advantageous to have the remote task processors be able to send and receive data from the main CPU, tap the main data bases and be able to print data and store and retrieve data using the printers and magnetic storage media of the main CPU.

It is important to ascertain in each system whether the data transmitted has been received without error. To that end prior art systems have utilized acknowledgment or handshaking schemes. These acknowledgment schemes have involved preparation, by the client data processing device, of an acknowledgment packet or signal and transmission of that signal to the sending unit after going through a line acquisition protocol. The sending unit then placed the acknowledgment packet in a receive buffer which was used to store all incoming messages. Subsequently when the sending unit wanted to know whether the data packet was successfully received, it searched the receive buffer to find the acknowledgment packet corresponding to the data packet it sent.

Because the unit that wished to send an acknowledgment packet had to go through a line acquisition protocol, extra time was consumed in this process. Extra overhead time was also consumed by the sending unit in determining whether its outgoing data packet had been properly received in searching through a long receive buffer containing many messages to find the acknowledgment packet that corresponds to the data packet that was sent.

The present invention represents an improved data link controller and an improved method of transmitting and receiving data on a local area data network or other data communication network.

SUMMARY OF THE INVENTION

The invention is an improved communications interface for a data processing unit coupled by the communications interface to a local area data network. The communications interface utilizes a separate modem which transmits digital data intended for another data processing unit modulated onto a carrier wave and receives digital data modulated onto the same frequency carrier. Before transmitting a data packet to another data processing unit on the network, the moden performs link acquisition to prevent two units from simultaneously trying to transmit data over the common link. The data link controller receives the incoming data packet and checks it for accuracy. The data link controller in the communications interface also checks the status of a FIFO receive buffer which it uses to store incoming data packets addressed to the client data processing unit of the data link controller. The link controller then prepares from the incoming data packet an acknowledgment packet addressed to the sending unit. The acknowledgment packet includes a code generated by the data link controller indicating whether the incoming data packet was received perfectly or that it was not received and stored perfectly. This code immediately tells the sending unit whether re-transmission is necessary.

No acknowledgment packet is sent if a check of the incoming data indicates that the data was not received perfectly since an error may have occurred in the source address field which is the address of the sending unit that initiated the exchange.

The data link controller also causes unique flag signals to be sent out with each data acknowlegment packet to positively delimit the packets.

The data link controller for the data processing unit receiving the acknowledgment packet places the acknowledgment packet in a transmit buffer in a known position relative to the location of the data packet that started the exchange. This provides a means by which the transmitting data processing unit, i.e., the source unit can rapidly determine whether the data packet sent has been perfectly received by the destination unit without the need for searching through a long receive buffer holding data packets directed to the source unit, thereby improving the net data throughout.

BRIEF DESCRIPTION OF THE DRAWINGS

FIG. 11 is a detailed schematic of the modulator, RF amplifier and diode switch of the transmitter.

FIG. 12 is a detailed logic diagram of the data encoder of the transmitter.

FIG. 25 is a timing diagram of the receive cycle.

FIGS. 26-41 are a logic diagram of the circuitry for the circuitry of the DLC depicted in FIGS. 19A and 19B.

DETAILED DESCRIPTION OF THE PREFERRED EMBODIMENT

Figure 1:
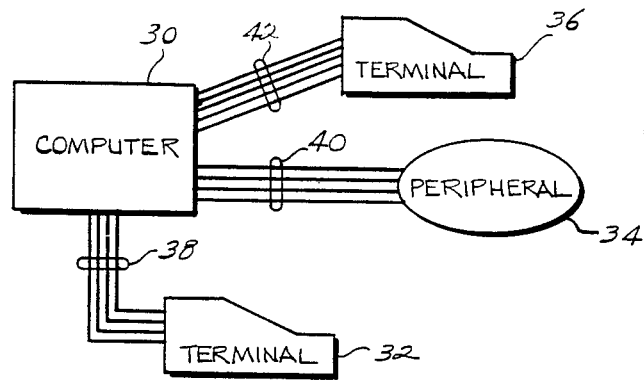
FIG. 1 is a drawing of a typical prior art computer installation using parallel connections.

Referring to FIG. 1 there is shown a typical parallel cable computer installation. The computer or CPU 30 is coupled to its various peripherals 32, 34 and 36 by parallel conductor cables 38, 40 and 42. These cables carry data, address and control signals to and from the units of the system.

Figure 2:
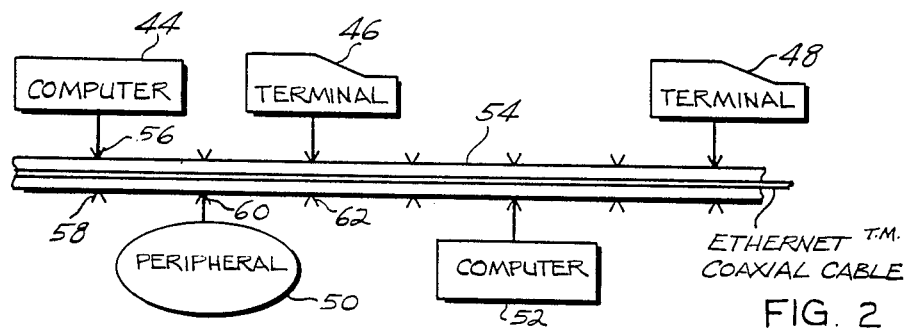
FIG. 2 is a prior art local data network using coaxial cable and baseband data transmission.
Figure 3:
FIG. 3 is a sample pulse train of data pulses as transmitted on the coaxial cable of FIG. 2.

Referring to FIG. 2 there is shown one proposed solution for distributed local data networks which utilize coaxial cable which may or may not already be in place in the user facility. This system sometimes referred to as Ethernet ™. The Ethernet ™ system transmits data between the units 44, 46, 48, 50 and 52 of the system on the coaxial cable 54. The units of the system place square wave pulses in serial format on the coax 54 in the manner shown in FIG. 3.

Figure 4:
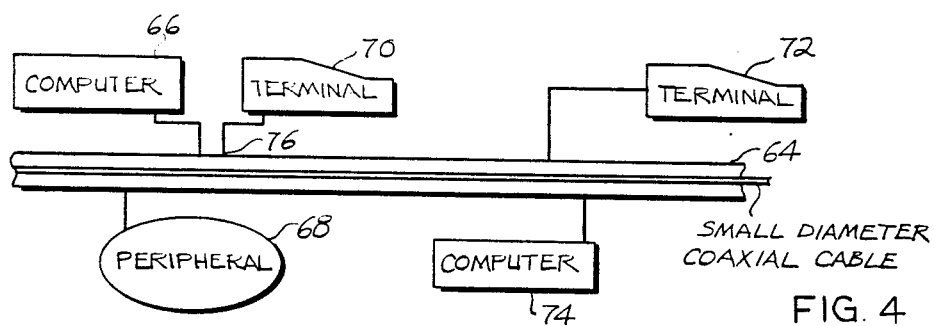
FIG. 4 is a system diagram of the units in a local distributed processing system such as might use the invention described herein.

Referring to FIG. 4 there is shown a drawing of a typical local data network utilizing coaxial line which could utilize the invention described herein. A coaxial cable 64 is coupled throughout a user facility to various units of the distributed data processing system. For example a main CPU 66 and its associated line printer, disk drive or magnetic tape reader 68 can be connected to the coax 64 in the main data processing room. Remote terminals 70 and 72 may be located elsewhere in the building. A local task processor 74 might be located in the test lab or design area to perform local application program's. Each unit on the system can have the benefit of use of the main CPU 66 and its high speed peripherals to process or put data into or take data out of the main data bases.

Figure 5:
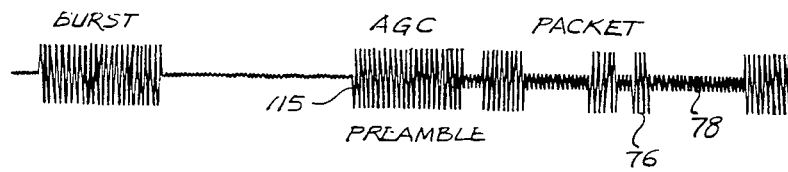
FIG. 5 is a waveform diagram of a modulated RF carrier used to transmit data between the units of the system of FIG. 4.

Data is transmitted between the units of the system of FIG. 4 via an amplitude modulated carrier such as that illustrated in FIG. 5. Frequency modulation or pulse width modulation could also be used. A logic 1 is represented in the preferred embodiment by a section of the carrier modulated at 100% of its amplitude such as at 77 while a logic zero would be represented by a section of carrier modulated at some arbitrary smaller percentage of the 100% value, for example 20% in the preferred embodiment, as illustrated at 79. The data encoding scheme of the preferred embodiment is non-return-to-zero encoding but other coding schemes could be used in other embodiments. This modulated RF carrier scheme is commonly called broadband.

Figure 6:
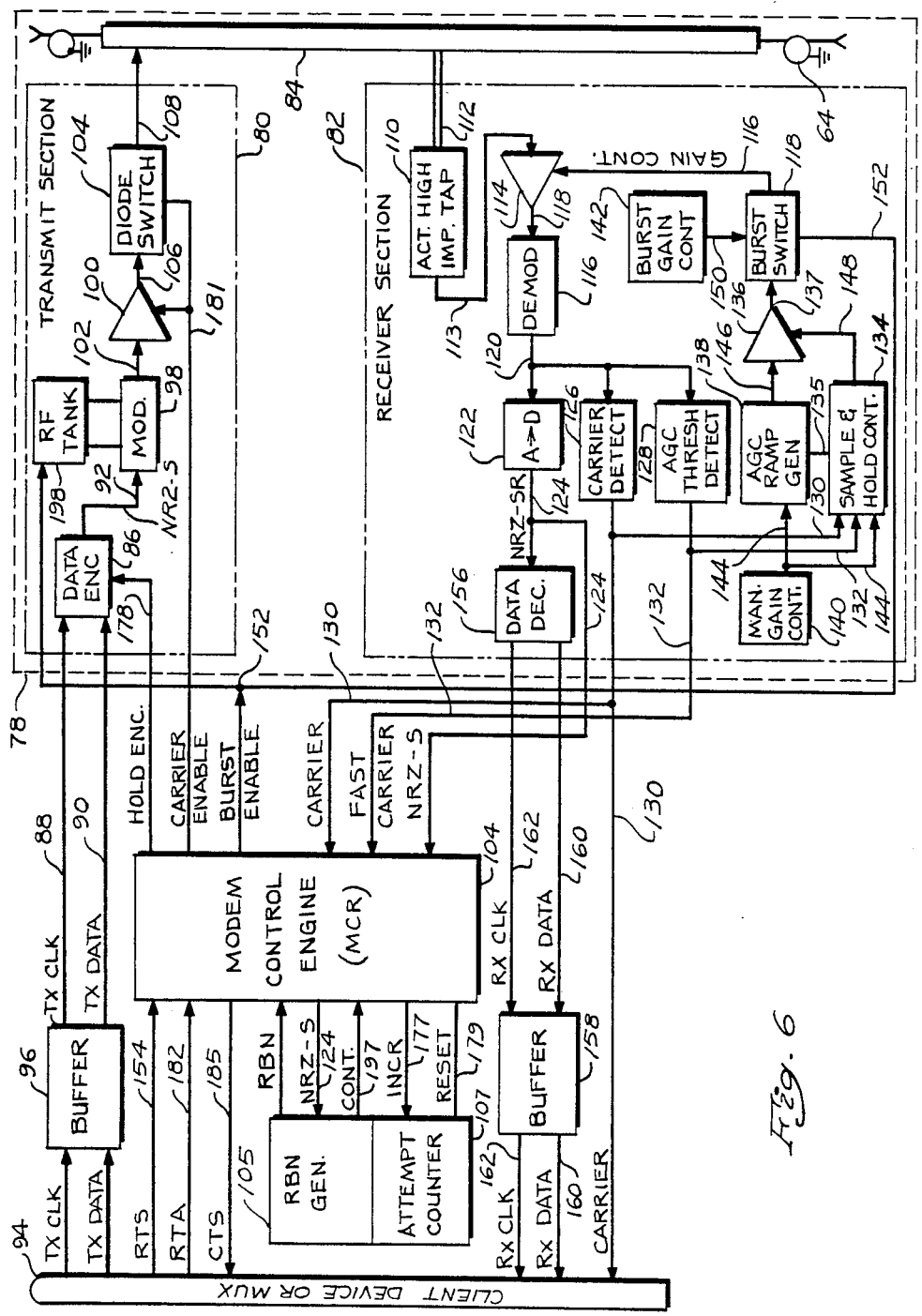
FIG. 6 is a block diagram of the modem of the invention.
Figure 7A:
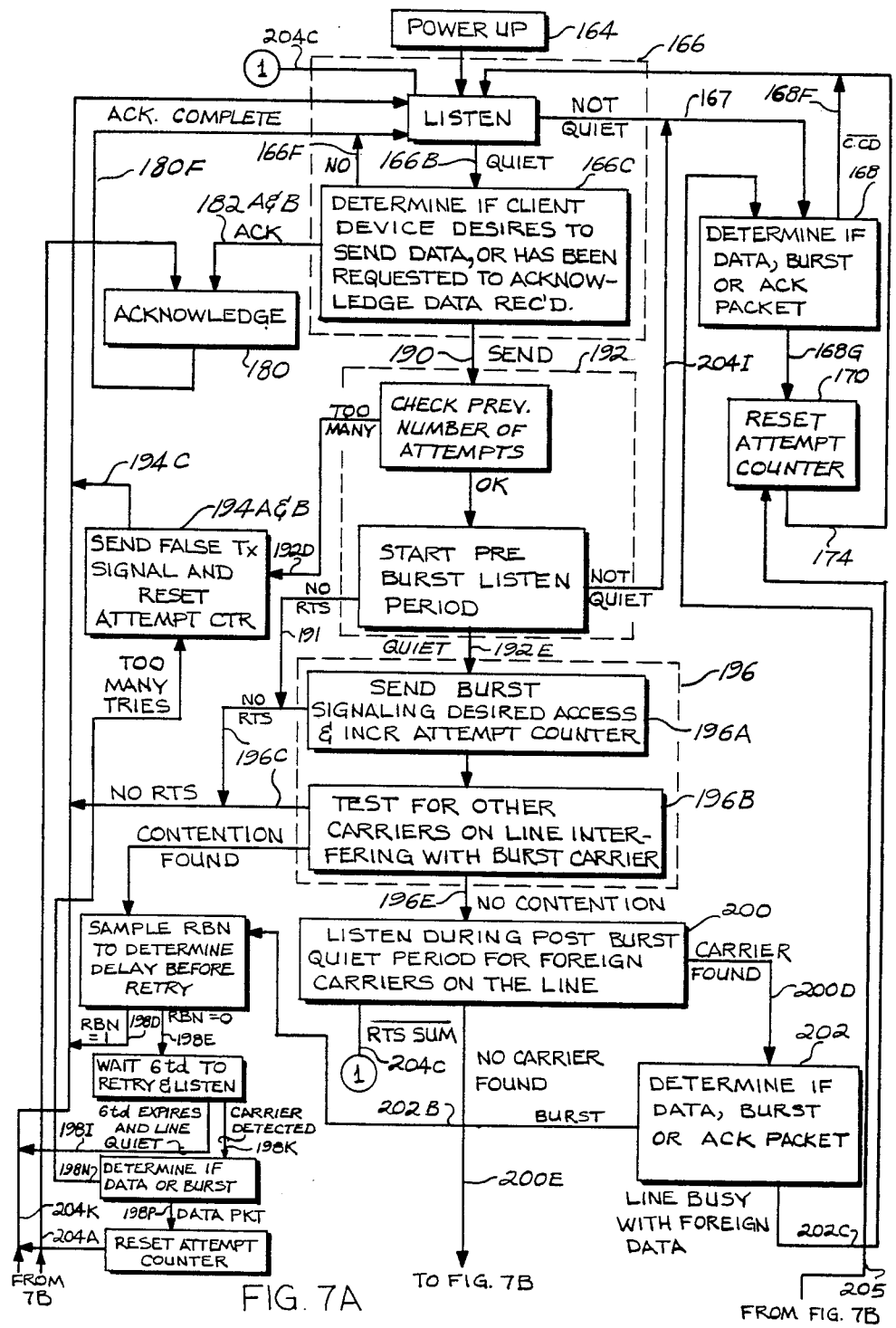
FIGS. 7A and B are a general flow chart of steps in the protocol followed by the modeem of FIG. 6.
Figure 7B:
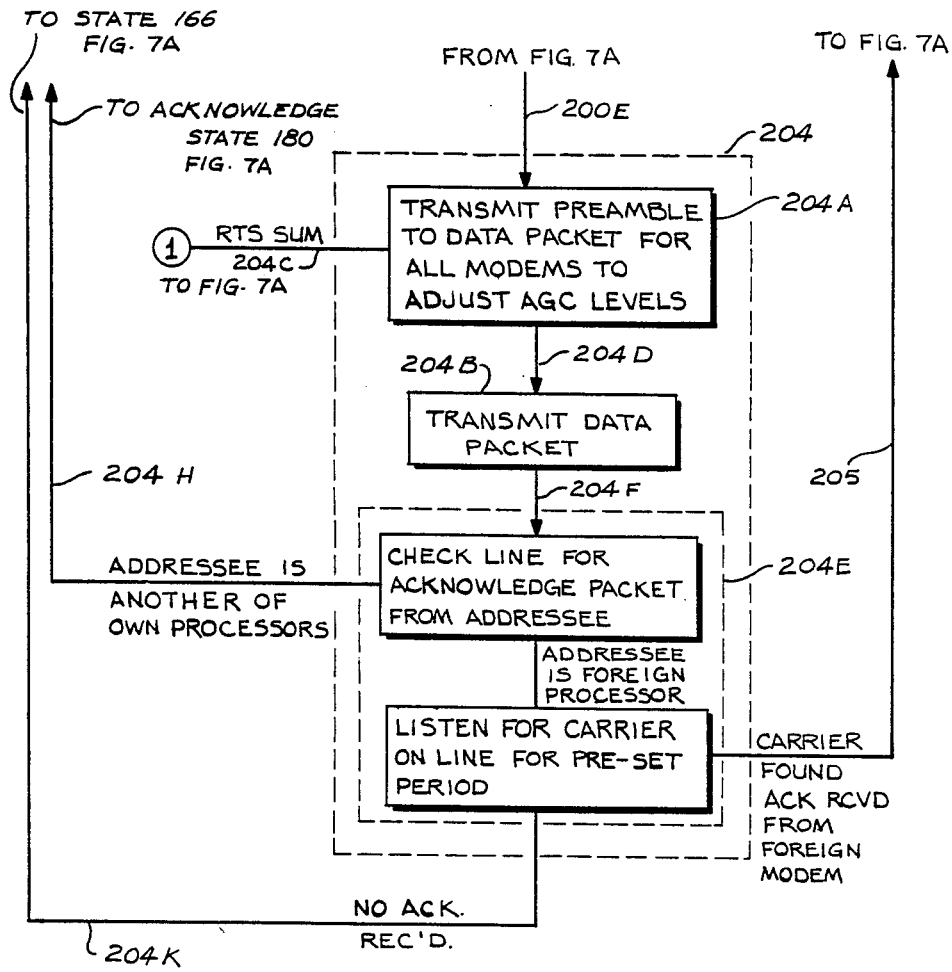

Each unit in the system of FIG. 4 can utilize a modem of the type described herein. In FIG. 6 there is shown a block diagram of one modem for a local area data network which can be used with the present invention. However, any type modem which satisfies the interface requirements of FIG. 44 will be satisfactory. FIGS. 4-16 herein define the preferred embodiment of a modem that can be used with the invention in a broadband local area data network. FIGS. 7A and 7B are a flow chart of the line acquisition collision avoidance protocol implemented by the modem of FIG. 6. Referring simultaneously to FIG. 6, 7A and 7B, the operation and construction of the modem is as follows.

The modem is comprised of a transceiver 78 including a transmit section 80 and a receive section 82. Both the transmit section and the receive section are coupled to a strip line 84. The strip line 84 is coupled to the coax 64 in FIG. 4 using standard coaxial type connectors and is designed using standard transmission line techniques such that the strip line 84 is effectively an extension of the coax 64 and has a characteristic impedance to substantially match that of the coax to which it is attached.

The transmitter section 80 is comprised of a data encoder 86 which converts a transmit clock signal on a line 88 and a transmit data signal on a line 90 to the non-return-to-zero-space modulation signal NRZ-S on the line 92. The signals on the lines 88 and 90 are transmitted through an optional multiplexer (MUX) 94 of conventional design and a buffer 96 to the data encoder 86 from one of the four client devices (not shown) coupled to the MUX 94. If the multiplexer 94 is not used then block 94 should be interpreted as the client device. Further the signals for requesting to send data, RTS Sum and RTA Sum become RTS and RTA when the multiplexer 94 is not used. The multiplexer 94 serves to sum the individual requests to send or acknowledge from the individual client devices into the composite signals RTA Sum and RTS Sum so that the modem will know when any of its client devices is requesting to send or acknowledge.

The NRZ-S modulation signal on the line 92 is coupled to a modulator 98 and is used to amplitude modulate an RF carrier generated in the modulator 98. The modulated carrier is coupled from the modulator 98 to an RF amplifier 100 via a line 102 where it is amplified. The gain of the RF amplifier 100 is controlled by the Carrier Enable signal on a line 181 from a modem control engine 104. The modem control engine 104 shuts off the RF amplifier 100 when no transmission is desired.

The modulated carrier signal at the output of the RF amplifier 100 is coupled to a diode switch 101 via a line 106. The diode switch 101 is coupled to the strip line 84 via a tap 108 and is also coupled to the Carrier Enable signal on the line 181. The tap 108 is a capacitor soldered to the conductor of the strip line 84. The diode switch 101 is forward-biased by the Carrier Enable signal when the transmitter is transmitting so as to present a low output impedance to the strip line 84 which closely matches the impedance of the transmission medium. When the transmitter is not transmitting, the diode switch 101 is reverse-biased by the absence of the Carrier Enable signal so as to present a high impedance to the strip line 84.

In the receiver 82, the strip line 84 is coupled to an active high impedance tap circuit 110 via an strip line 112. The function of the active high impedance tap 110 and the strip line 112 is to present a high impedance to the strip line 84 at all times with little or no imaginary component so as to minimize insertion loss and not load down the coax 64 when a large number of modems are coupled to the coax line. The modem of FIG. 6 would function without the help impedance tap 110 but not as many modems could be coupled to the coax 64 because of excessive loading. The minimization of the reactive component of the impedance presented to the strip line 84 by the active tap 110 serves to minimize the amount of reflected power from the tap so as to minimize the standing wave pattern caused by disturbances of the line 84.

The output of the high impedance tap 110 is fed on the line 113 to the input of an RF amplifer 114. The RF amplifier has its gain input coupled to a Gain Control signal on a line 117 from a burst switch 118. The Gain Control signal on the line 117 is controlled so that the RF amplifier 114 assumes a certain gain level during some portions of the acquisition protocol and a different gain level during other periods in the acquisition protocol as will be explained in more detail below.

The output of the RF amplifier 114 is applied to a demodulator 116 via a line 119. The demodulator 116 converts the RF signal on the line 119 to an analog signal called RF Envelope on a line 120 which has an amplitude which varies with the amplitude of the envelope of the RF signal on the line 119.

The line 120 is coupled to the input of an analog to digital converter 122. The A/D converter 122 compares the signal on the line 120 to an adjustable reference voltage and generates an NRZ-SR signal on a line 124 which is true or logic 1 when the amplitude of the signal on the line 120 exceeds the reference level.

The signal on the line 120 is also coupled to the input of a Carrier Detect circuit 126 and to the input of an AGC threshold detect circuit 128. The Carrier Detect circuit 126 senses the level of the signal on the line 120 and compares it with a fixed reference level to determine if a carrier is present on the strip line 84. The Carrier Detect circuit generates a Carrier signal on a line 130 which is true when the signal on the line 120 exceeds the predetermined reference level.

The AGC threshold detect circuit 128 compares the RF envelope signal to an adjustable reference voltage and generates a Fast Carrier signal on a line 132. This Fast Carrier signal is coupled to an input of a sample and hold control circuit 134.

The sample and hold control circuit 134 functions with the AGC threshold detector 128, the AGC ramp generator 138, the sample and hold circuit 136, the burst switch 119 and the modem control engine 104 to establish the automatic gain control level for the RF amplifier 114 during receive periods. That is during receive periods, the receiver automatic gain control circuitry must sample a constant amplitude preamble signal, portion 115 in FIG. 5, at the start of each data packet in order to establish an appropriate amplification level, and hold this amplification level constant for receipt of the data packet following the preamble 115.

The manual gain control 140 is coupled to inputs of both the AGC ramp generator and the sample and hold control 134 by a line 144. The output of the AGC ramp generator 138 is coupled to the input of the sample and hold circuit 136 by a line 146. The sample and hold control circuit 134 has its output coupled to a control input of the sample and hold circuit 136 by a line 148. The sample and hold circuit 136 has its output coupled through the burst switch 118 to the automatic gain control input 117 of the RF amplifier 114. The burst switch 118 is also coupled to a burst gain control 142 by a line 150 and is coupled to the Burst Enable signal from the modem control engine 104 by a line 152.

Generally, the receiver's gain control circuitry has two phases of operation. The first phase is during bursting by the transmitter when access to the line is desired. During this phase, the receiver must listen for interference beating on the line which will result in amplitude changes of the received signal. To detect these changes, the gain of the RF amplifier 114 must be reduced so that the RF amplifier 114 is not swamped by the output from the transmitter 80 and so that the output of the demodulator 116 can be compared to a fixed reference level.

During interference beating, the DC signal on the line 120 will be rising above and falling below a fixed reference level. The A/D converter circuit 122 looks for this phenomena during bursting to determine when another carrier is on the line. The A/D converter 122 generates the signal NRZ-S on the line 124 which will contain a pulse each time the changing level on the line 120 exceeds the reference level.

This first phase of gain control operation is accomplished by the modem control engine 104 signalling the burst switch 118 by making a Burst Enable signal on a line 152 true indicating that bursting is occurring. This causes the sample and hold signal on the line 137 from the sample and hold circuit 136 to be disconnected from the gain control input 117 of the RF amplifier 114. Simultaneously, the manually adjustable burst gain control 142 is connected to the line 117 and controls the gain of the RF amplifier 114. The burst gain control 142 can be manually set to establish the gain at any desired level depending upon the predetermined reference level.

The second phase of operation of the receiver gain control circuitry is during the data transmission preamble. The gain of the RF amplifier 114 is initially set at a maximum until a preamble is detected when the transmitter is not bursting as determined by the Carrier Detect circuit 126 and the burst switch 118. When a preamble occurs, the signal on the line 130 causes the sample and hold control circuit 134 to signal the AGC ramp generator 138 via the line 135 to start generating a ramp signal voltage on the line 146 which is passed through the sample and hold circuit 136 and the burst switch 118 to the RF amplifier 114 and causes the gain to be decreased. As the gain of the RF amplifier 114 is ramped down, the DC level of the signal on the line 120 starts to change until it reaches a certain threshold level. When the threshold level is reached, the AGC threshold detector 128 signals the sample and hold control circuit 134 via the line 132 that the proper gain level has been established. The sample and hold control circuit 134 then signals the sample and hold circuit 136 via the line 148 to hold the DC level on the line 137 steady at the level then existing. That DC level is directly coupled to the RF amplifier 114 gain control input on the line 117 through the burst switch 118 to hold the gain steady throughout the entire data packet.

The incoming data packet is decoded in a data decoder 156 which is coupled to the NRZ-SR signal on the line 124. The data decoder 156 recovers the clock signal from the NRZ data coming in and synchronizes the incoming data with the local modem clock which is part of the data decoder 156. The received data and the recovered clock signals are transmitted through a buffer 158 and to the client device as the Receive Data and Receive Clock signals on lines 160 and 162 respectively.

The operation of the modem control engine 104 in relation to the client task processors, the receiver and the transmitter in carrying out the transmit protocol will be best understood by referring to FIGS. 7A and 7B in conjunction with FIG. 6.

FIGS. 7A and 7B are a flow chart of the steps carried out by the modem control engine (MCE) 104 in carrying out the transmit line acquisition and contention resolution protocol. Initially, the modem control engine starts at power up state in block 164 of FIG. 7A wherein the system is initialized and then moves to a listen state 166. In that state the MCE 104 listens for foreign carriers on the line 64 by checking the state of the Carrier signal on the line 130. If the line is not quiet, Carrier will be true and the MCE 104 will make a transition on the path 167 to a state 168 wherein the MCE 104 will time the foreign carrier by enabling an internal timer and watching the Carrier signal on the line 130. The purpose of this series of steps is to determine the duration of the foreign carrier to determine if it is a burst, data packet or an acknowledgment packet. This determination is made by determining whether the Carrier signal is on longer than a predetermined time. If it is on longer than a predetermined time, then an attempt counter internal to the MCE 104 is reset to zero attempts after the carrier signal disappears. In FIG. 7A this step is represented by a transition to a state 170 along a path 172.

After resetting the attempt counter, the MCE 104 returns to the listen state 166 along a path 174.

Figure 8A:
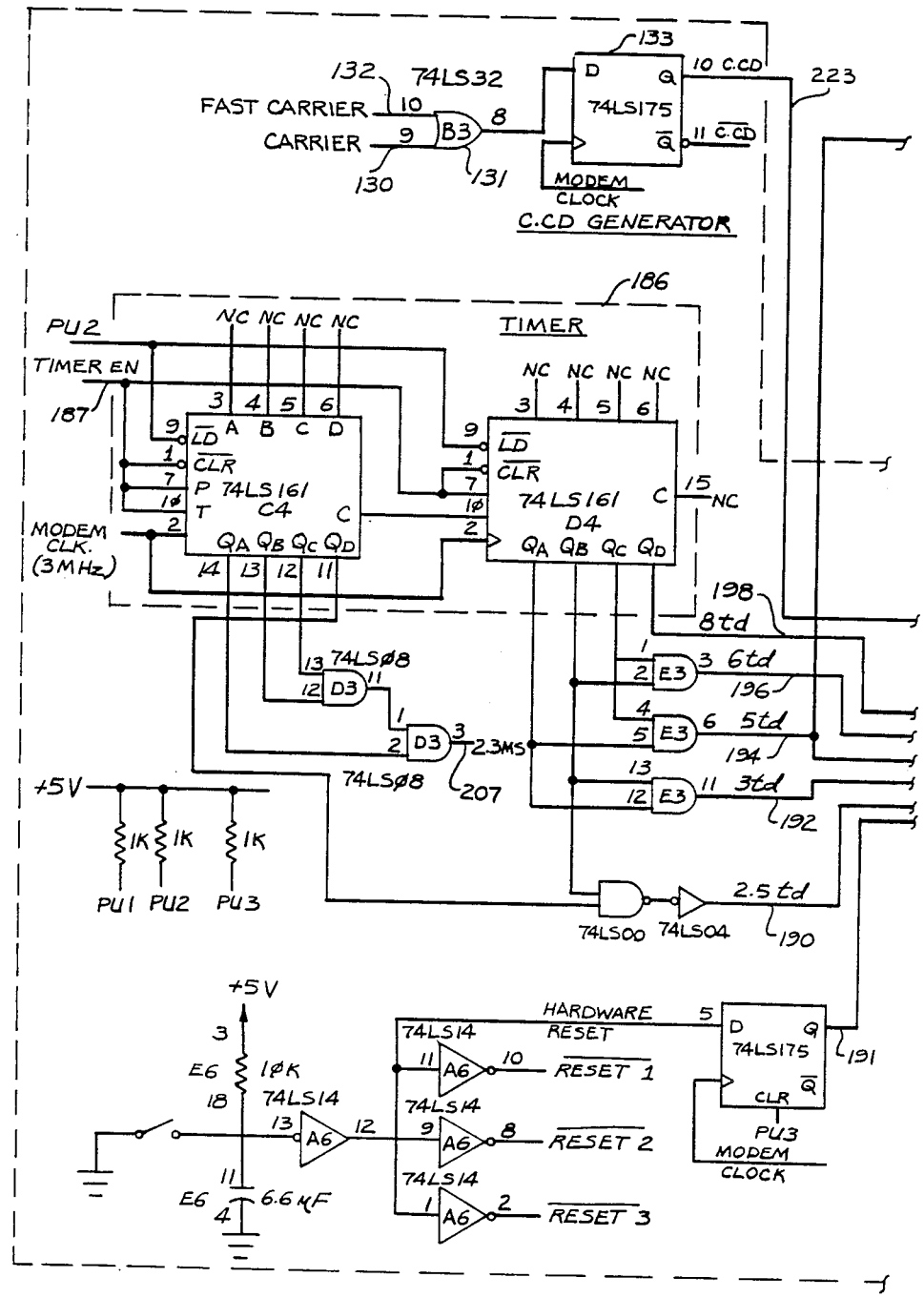
FIGS. 8A and 8B are a detailed logic diagram of the modem control engine.
Figure 8B:
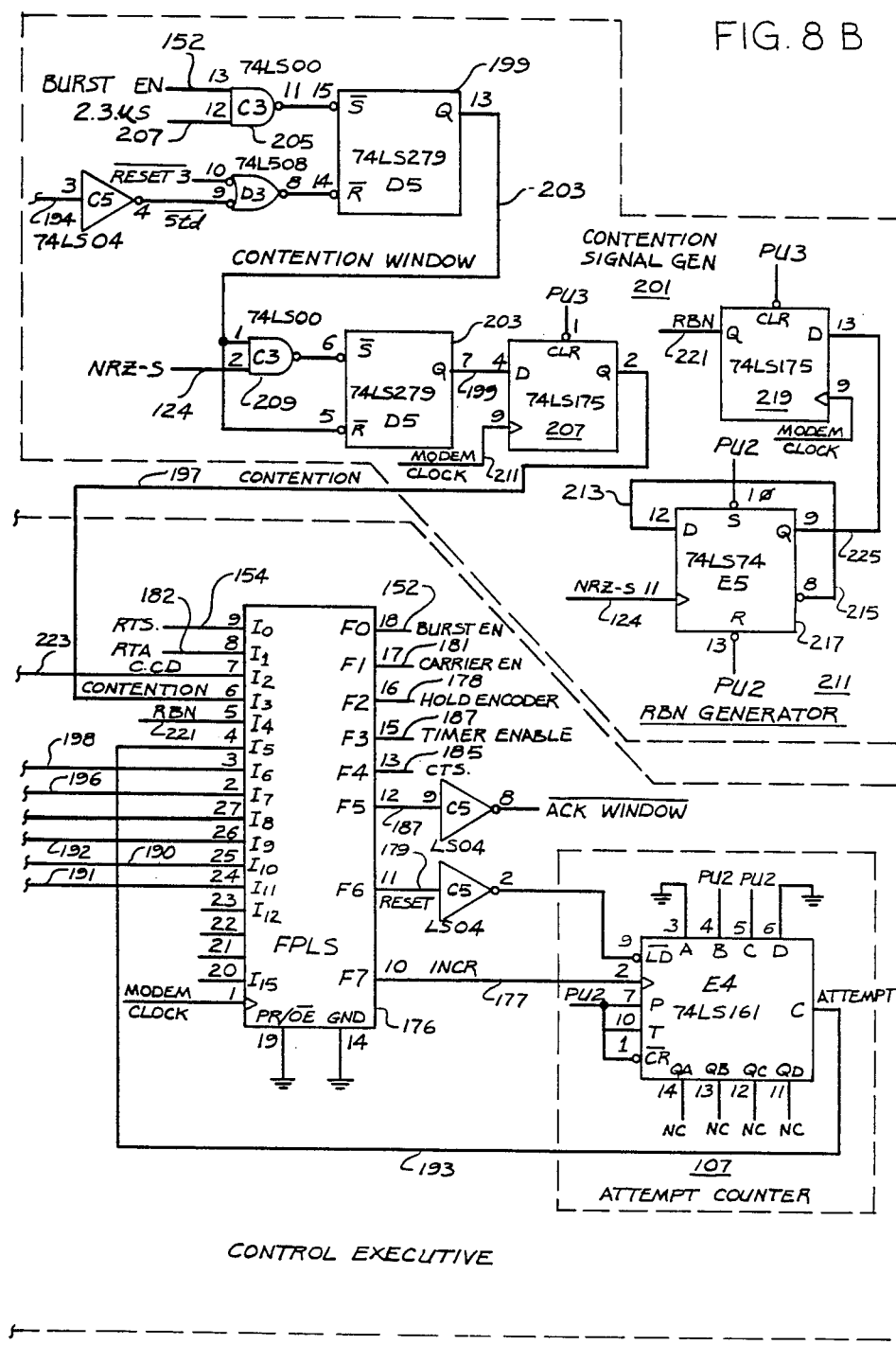
Figure 9:
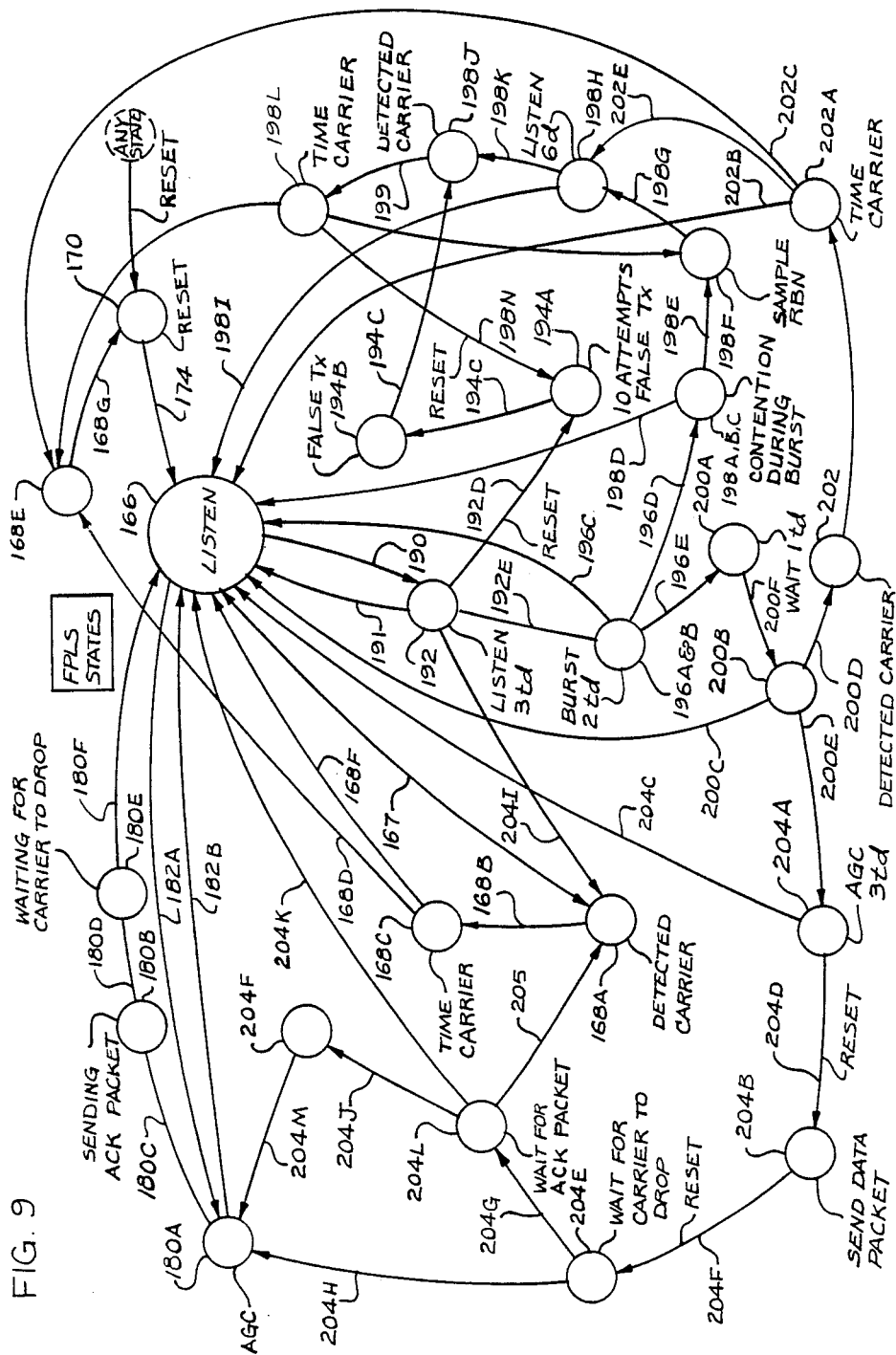
FIG. 9 is a state flow diagram showing the states the modem control engine can assume and the paths between states.
Figure 10A:
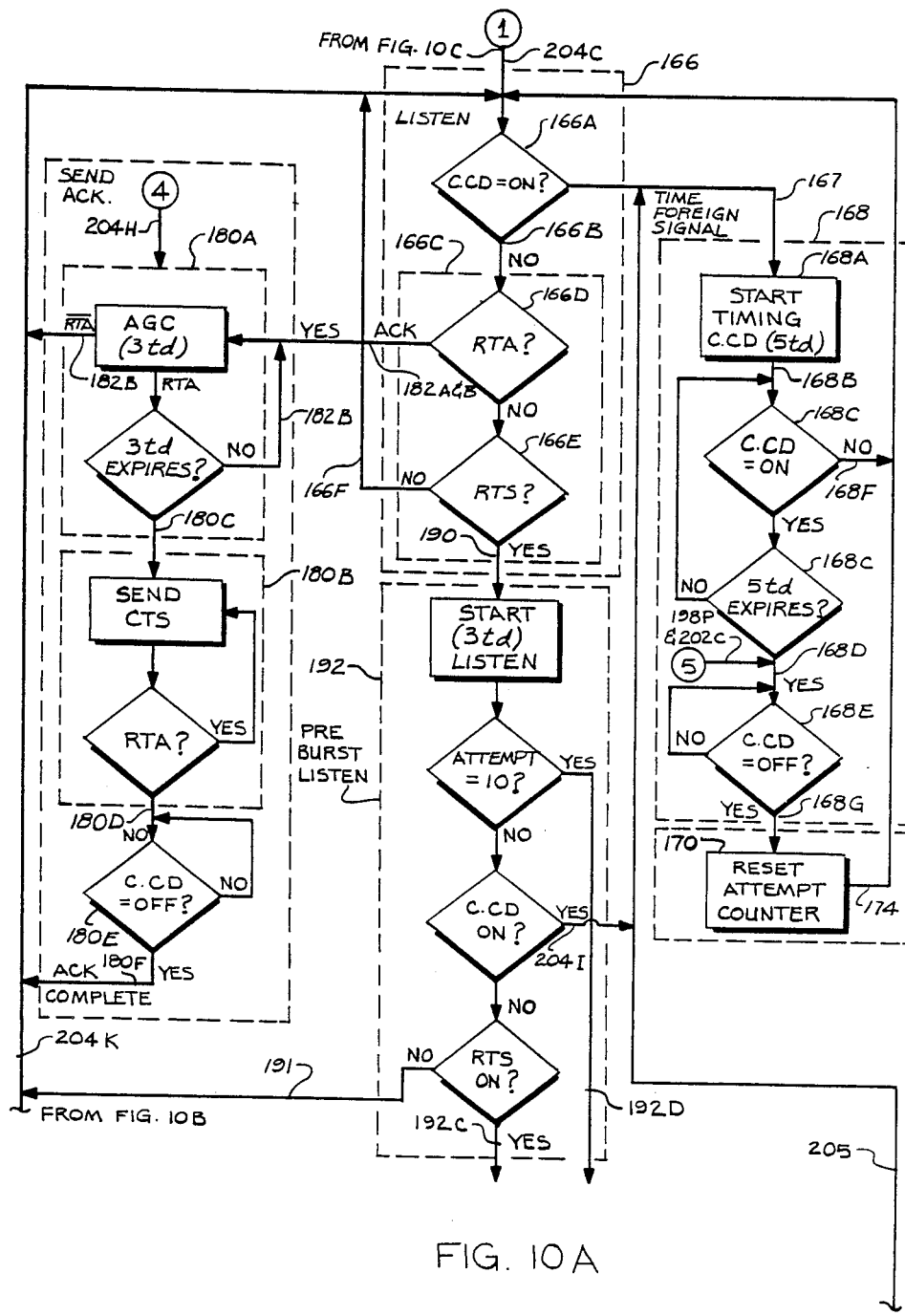
FIGS. 10A-C are a detailed flow chart of the separate steps in the line acquisition and collision avoidance protocol established by the modem control engine.
Figure 10B:
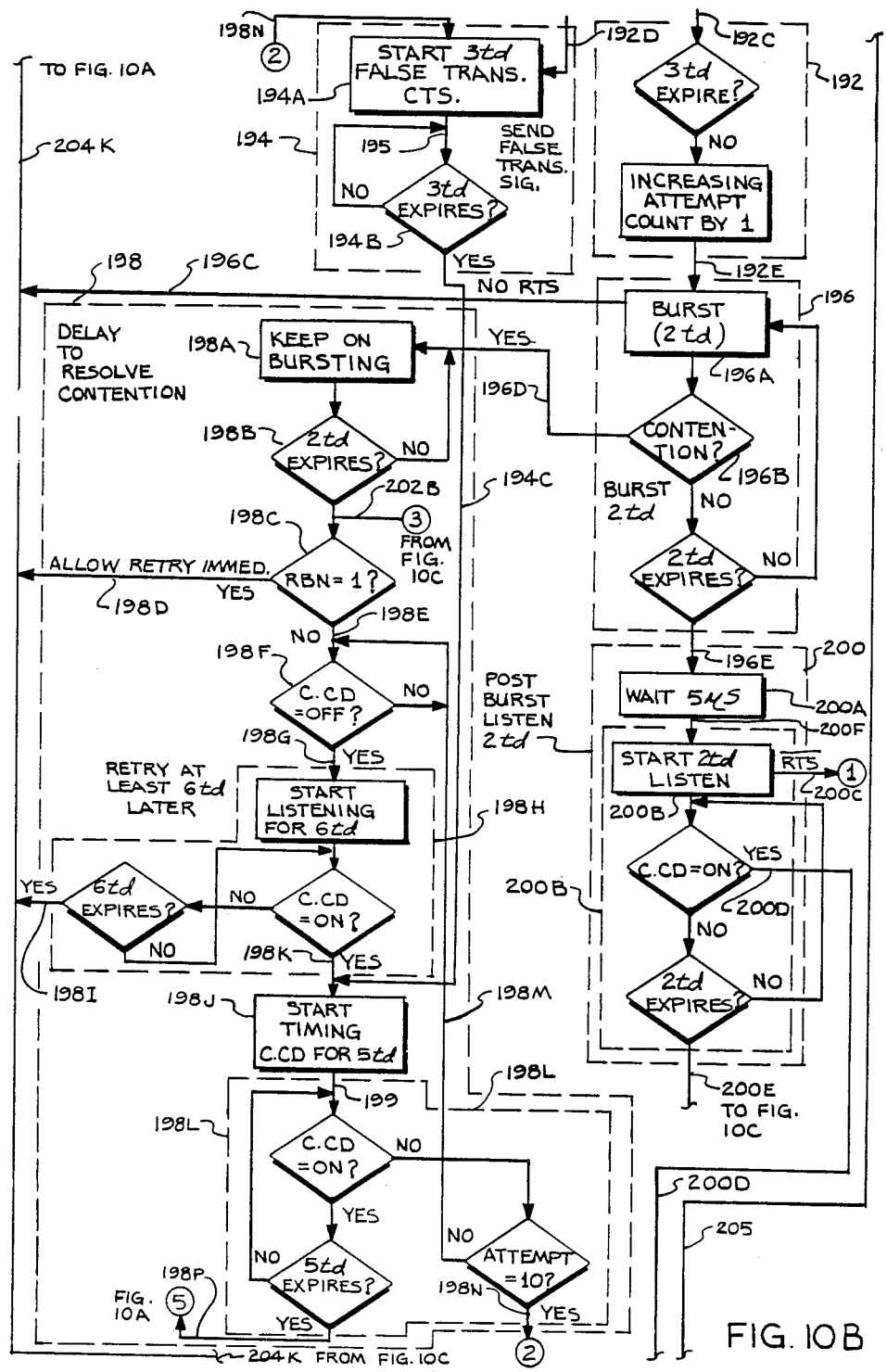
Figure 10C:
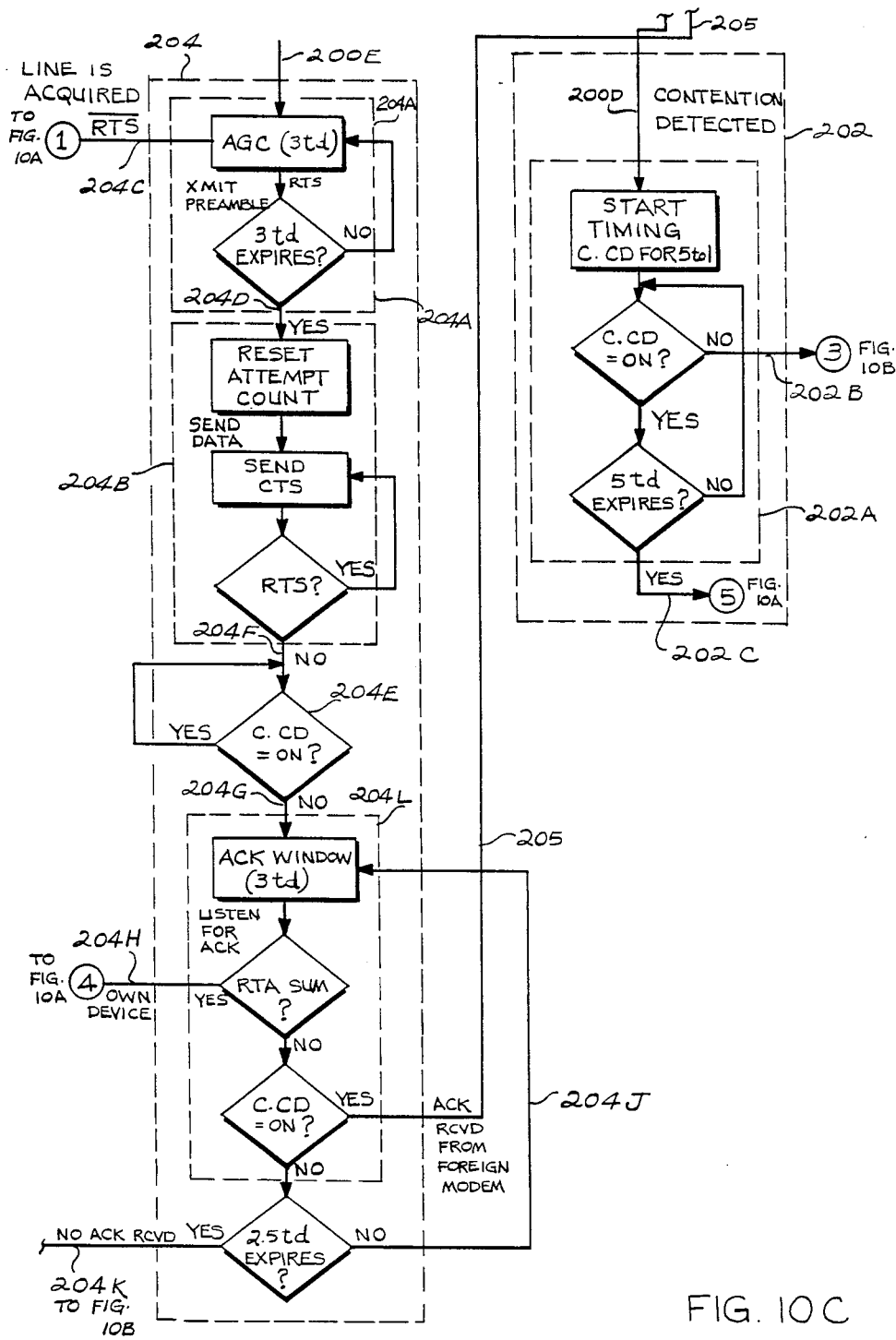

Referring to FIGS. 8A and B, 9, and 10A, B and C the actual implementation of this portion of the transmit protocol can be understood more fully. FIGS. 8A and 8B are a detailed logic diagram of the modem control engine. FIG. 9 is a machine state diagram of the separate states the modem control engine 104 can assume and of the paths between the states. FIGS. 10A–C are a detailed flow diagram of the steps in the transmit protocol implemented by the modem control engine 104.

Referring first to FIGS. 8A and B, the heart of the MCE 104 is shown on FIG. 8B as a fuse programmable logic sequencer (FPLS) 176. This sequencer is, in the preferred embodiment, an 82S105 manufactured by Signetics. The FPLS is coupled to the attempt counter 107 by the signal lines INCR and RESET on lines 177 and 179 respectively which increment the counter and pre-load it to a predetermined constant of 0110 binary respectively.

The FPLS 176 is coupled to the transmitter 80 in FIG. 6 by the Hold Encoder signal on a line 178, a Carrier Enable signal on a line 180 and the Burst Enable signal on a line 152.

The FPLS 176 is coupled to the receiver 82 by the signal Carrier on the line 130 in FIG. 8A, the signal Fast Carrier on the line 132, the Burst Enable signal on the line 152 in FIG. 8B and the signal NRZ-SR on the line 124 in FIG. 8B.

Finally the FPLS is coupled to the client device by signals RTS or, optionally, RTS Sum if a multiplexer is present on a line 154, RTA or, optionally, RTA Sum on a line 182 and CTS or, optionally, CTS Sum on a line 185. That is, if the optional multiplexer is present, the RTS, RTA and CTS signals are RTS Sum, RTA Sum, and CTS Sum, respectively.

The FPLS 176 is modified structurally by destroying selected fuses in the internal structure of the chip to implement the Boolean functions illustrated in the table accompanying FIG. 9. The table is included below and should be referred to in conjunction with the discussion of FIG. 9. The transmission and contention resolution protocol represented by FIGS. 7A and B, 10A–C, 9, and 8A and B will be explained structurally and functionally by referring to the above-listed drawings in conjunction with the following explanation.

The steps of the protocol represented by states 166, 168 and 170 in FIGS. 7A-B are detailed in FIGS. 10A–C and FIG. 9. The listen state 166 is represented by the decision block 166A in FIG. 10A and state 166 in FIG. 9. The signal C.CD is equivalent to either Carrier or Fast Carrier because these two signals are combined by the OR gate 131 in FIG. 8A. In state 166 as soon as the signal C.CD on the line 223 coupled to the I2 input of FPLS 176 in FIG. 8B becomes true, the FPLS changes to a state 168A along a path 167. There is listed below a table for the inputs and outputs from the FPLS 176 for each of the paths in FIG. 9.

| Path | Inputs | Outputs |
|---|---|---|
| 167 | C.CD | Nil |
| 168B | Nil | Timer Enable |
| 168D | 5td & C.CD | Nil |
| 168F | C.CD not | Nil |
| 168G | C.CD not | Reset |
| 174 | Nil | Reset & Incr |
| 182A | RTA & C.CD not | Carrier Enable & Hold Encoder & Timer Enable |
| 182B | RTA not | Nil |
| 180C | RTA & 3td | CTS & Carrier Enable & Ack Window |
| 180D | RTA not | Nil |
| 180F | C.CD not | Nil |
| 190 | C.CD not & RTS & RTA not | Timer Enable |
| 191 | C.CD not & RTS not & Attempt not | Nil |
| 192D | Attempt | CTS & Reset |
| 192E | Attempt not & C.CD not & RTS & 3td | Burst Enable & Carrier Enable & Hold Encoder & Timer Enable & Incr |
| 195 | Nil | CTS & Reset & Incr & Timer Enable |
| 194C | 3td | Nil |
| 196C | RTS not | Nil |
| 196D | RTS & Contention | Timer En & Burst En & Burst En & Carrier En Hold Encoder |
| 196E | 5td & Contention not & RTS | Timer En |
| 198D | 5td & RBN | Nil |
| 198E | RBN not & 5td | Nil |
| 198G | C.CD not | Timer Enable |
| 198I | 6td & C.CD not | Nil |
| 198K | C.CD | Nil |
| 198N | Nil | Timer Enable |
| 198M | Attempt not & C.CD not | Nil |
| 199 | Attempt & C.CD not | Reset |
| 198P | C.CD & 5td | Nil |
| 200F | 6td | Timer En |
| 200C | RTS not | Nil |
| 200D | RTS & C.CD | Nil |
| 201 | Nil | Timer Enable |

-continued

| Path | Inputs | Outputs |
|---|---|---|
| 202B | C.CD not & RBN | Nil |
| 202C | 5td & C.CD | Nil |
| 202E | C.CD not & RBN not | Timer En |
| 200E | C.CD not & 8td & RTS | Carrier Enable & Hold Encoder & Timer Enable |
| 204C | RTS not | Nil |
| 204D | 3td & RTS | CTS & Carrier En & Reset |
| 204F | RTS not | Reset & Incr |
| 204G | C.CD not & RTA not | Timer En & Ack Window |
| 204H | RTA & C.CD not | Timer En & Hold En & Ack Window & Carrier En |
| 205 | C.CD | Nil |
| 204J | 2.5 td not & C.CD not & RTA | Carrier En & Hold En & Ack Window |
| 204M | Nil | Ack Window & Carrier Enable & Timer En & Hold Encoder |
| 204K | 2.5 td & C.CD not | Nil |

The nomenclature C.CD/Nil for the path 167 transition shown in FIG. 9 means that when the I2 input C.CD in FIG. 8B becomes true, the path 167 is taken and there is no output at any of the outputs F0-F7 in FIG. 8B. It is suggested that the reader use 8B, FIG. 9 and the table herein to understand physically which inputs and outputs are in various conditions during various machine states. FIGS. 7A and 7B and FIGS. 10A-C should be used by the reader to understand conceptually the protocol steps which are implemented by the FPLS 176.

As previously noted, the purpose of the state 168 in FIG. 7A is to determine whether the detected carrier which caused the transition on the path 167 was a burst carrier or a data packet. Referring to FIG. 10A, when the FPLS reaches the state 168A, the output signal F3, Timer Enable, on line 187 in FIG. 8A is made true. This initiates a timer 186 in FIG. 8A which is comprised of two 74LS161 standard TTL synchronous counters with direct clear such as are manufactured by Texas Instruments, Inc. and numerous other sources. Both counters are four-bit binary synchronous counters which start to count when the Timer Enable signal on the line 187 is true. The various outputs of the counters are coupled together in known fashion to generate five ouput signals, i.e., $2.5t_d$ on line 241, $3t_d$ on line 233, $5t_d$ on line 235, $6t_d$ on line 237 and $8t_d$ on line 239. Each of these output lines carries a signal which makes a transition from one logic state to another at a predetermined multiple of a fixed time period $t_d$. This unit of time measure $t_d$ is equal to the transmission delay on the line.

The object of the state 168 in FIG. 7A is to determine whether the detected carrier lasts for a period greater than $5t_d$. The FPLS makes its transition from state 166 to 168A along the path 167 in FIG. 9 as soon as the input signal I2, C.CD, becomes true indicating that a carrier has been detected. The Timer Enable signal, F3, is then immediately made true in making the transition on the path 168B to the state 168C.

Referring to FIG. 9 the FPLS stays in state 168C until $5t_d$ has expired and the C.CD signal is still true, at which time it makes a transition on the path 168D to a state 168E. No output is generated on this transition. When C.CD becomes false, the FPLS makes a transition from the state 168E to a state 170 along a path 168G. In making this transition, the Reset signal on the line 179 in FIG. 8B is made true causing the attempt counter 107 to be enabled for a parallel load. When the state 170 is reached, the signal Reset remains true and the signal Incr on the line 177 in FIG. 8B is made true which parallel loads the binary constant 0110 at the A-D inputs into the attempt counter. If C.CD becomes false before $5t_d$ has expired, however, the FPLS moves back to the state 166 along the path 168F which indicates that the foreign carrier lasted less than $5t_d$, is no longer present, and that the line is clear.

To account for the possibility that the packet was addressed to one of its client devices, the FPLS 176 checks for the presence of a request to acknowledge signal RTA or, optionally, RTA Sum at its I1 input. In FIGS. 9 and 10A, this decision is represented by the transition from decision block 166D in state 166 to the block 180A in state 180 along the path 182A. This transition occurs when the FPLS 176 finds its I1, input true and its I2 input false indicating that the line is now quiet and one of its client devices has been requested to acknowledge a data packet.

When the input variables are I1 and I2, not, one of the client devices has been requested to acknowledge a data packet. In that event the transition along the path 182A is made and the output signals Carrier Enable (F1) on the line 181, Hold Encoder (F2) on the line 178 and Timer Enable (F3) on the line 187 in FIG. 8B are made true. These signals enable the transmitter 80 to produce an AGC burst as a preamble for an acknowledgement packet.

Referring to FIG. 6, the Carrier Enable signal on the line 181 drives the RF amplifier 100 in the transmitter to maximum gain and causes a forward bias on the diode switch 101 to put the RF carrier on the strip line 84 and coax 64 via the line 108. The Hold Encoder signal on the line 178 causes the data encoder 86 to put out a string of logic 1's on the line 92 coupled to the modulator 98. This causes the modulator to modulate the RF carrier at the 100% amplitude level. In FIG. 8B, Timer Enable signal starts the timer 186 which times the AGC preamble period.

Referring to FIGS. 9 and 6, if the RTA signal on the line 182 from the client device goes false before the expiration of $3t_d$, the FPLS 176 will return to the state 166 along the path 182B. No output is generated during this transition.

If RTA is still true after $3t_d$ has expired, the FPLS will move to a state 180B along a path 180C. In the state 180B the FPLS will be holding true the CTS signal on the line 185 in FIG. 6 and will also be holding true the signals Carrier Enable on line 181 in FIG. 6 and the signal Ack Window on the line 184 in FIG. 8B. These signals tell the client device to send the acknowledgment packet which it does along the Transmit Data and Transmit Clock paths 90 and 88 in FIG. 6. The acknowledgment data goes out on the line in whatever NRZ code has been established for the acknowledgment protocol.

While the acknowledgment packet is going out, the receiver 82 in FIG. 6 is receiving the carrier and the Carrier Detector 126 in FIG. 6 is holding the carrier signal on the line 130 true while the Fast Carrier signal on the line 132 is also true. These Carrier and Fast Carrier signals causes the C.CD signal to be true by the action of the gate 131 and the flip-flop 133 in FIG. 8A. The flip-flop 133 serve to synchronize the output of the gate 131 with the modem clock such that the signal C.CD on the line 223 will be set to the true condition on a low to high transition of the modem clock cycle. When the acknowledgment packet is sent, the client device removes the RTA or, optionally, the RTA Sum signal on the line 182 which causes the FPLS to move from the state 180B to the state 180E along the path 180D. The state 180E is a waiting state which waits for the signal C.CD to go false indicating that the line is quiet. When that occurs, the FPLS 176 makes the transition back to the state 166 along the path 180F to continue to listen to the line.

Referring to FIG. 10A, if the original data packet which came in was not addressed to any of the client devices, when the FPLS must determine if any of the client devices are requesting to send data to any other unit in the system. This determination is represented by the block 166E in the state 166. The FPLS looks for the presence of the RTS signal on the line 154 in FIG. 8B from its client device or devices. If none is found, then the FPLS remains in the state 166 as indicated by the path 166F in FIG. 10A.

However, if RTS is true then the FPLS makes a transition from the state 166 to a state 192 via a path 190 as shown in FIG. 7A. The purpose of making this transition is to establish that the line is quier prior to transmitting an access burst signalling an intention to acquire the line.

As will be apparent to those skilled in the art from the notations for path 190 in the table for FIG. 9, the input conditions required to make the transition from the state 166 to the state 192 are that RTS be true while the C.CD and RTA signals are false indicating that the line is quiet and no request to acknowledgment is present while one of the client devices is requesting to send a data packet. In making this transition, the FPLS 176 raises Timer Enable to true which starts the timer 186 to time the listening period for $3t_d$.

Referring to FIGS. 7A, 9 and 10A & B, in the state 192, the FPLS checks the previous number of attempts. If ten previous attempts have been made to transmit, the FPLS will transfer to the state 194A along the path 192D in order to send a false transmission message. During this transition, the Reset signal on the line 179 in FIG. 8B is made true resetting the attempt counter and the signal CTS on the line 185 in FIG. 8B is made true indicating the FPLS is signalling a false transmission.

If the previous number of attempts is less than ten, Attempt on line 193 in FIG. 8B is false. In that event, the FPLS checks the C.CD signal at its $I_2$ input to see if any foreign carriers are on the line. If C.CD is false, the FPLS checks to see if RTS on line 154 in FIG. 8B is false. If all three samples are false, the FPLS makes a transition from the state 192 back to the state 166 via the path 191.

If a foreign carrier comes on the line during this preburst listening period with the number of attempts less than 10, the FPLS senses that the coax line 64 is not quiet from the C.CD signal and makes the transition to the previously described path 168A along the path 204I. The foreign carrier is timed in the state 168 as previously described and processing proceeds as previously described.

When the transition to the state 194A in FIGS. 7A, 9 and 10B is made, the CTS signal, or optionally, the CTS Sum on the line 185 in FIG. 6 is made true and then false $3t_d$ later by the FPLS indicating to the client device trying to send data that there is some sort of trouble or heavy traffic and the transmission is aborted. This operation is represented by the transition on the path 195 to the state 194B in FIGS. 10B and 9. On this path the attempt counter 107 is pre-loaded with a constant and the timer is enabled. When $3t_d$ expires the FPLS moves to the state 198J on the path 194C.

Referring to FIGS. 7A, 9 and 10B if 10 previous attempts have not been made to transmit and the line has been quiet for $3t_d$ and the client device is still requesting to send, the FPLS makes a transition to the burst for $2t_d$ state 196 along the path 192E. This marks the start of the $2t_d$ burst of non-data-bearing carrier for contention resolution. This transition on the path 192E will not occur unless the RTS signal is still true, indicating that the client device still desires to send a data packet, attempt is false and the coax line has been quiet for $3t_d$ as indicated by C.CD false and $3t_d$ true. The FPLS then makes the Burst Enable, Carrier Enable, Hold Encoder, Timer Enable and Incr. signals true on the lines 152, 181, 178, 187 and 177 respectively in FIG. 8B. The Timer Enable signal starts the Timer 186 to time the burst, and the Incr. signal increments the attempt counter 107 to keep account of the number of attempts to acquire the coax line 64 which have been made to transmit the data packet for which the transmission request has been made. If RTS becomes false while in the state 196, the FPLS will make a transition back to the listen state 166 along a path 196C.

Referring to FIG. 6, the Hold Encoder signal causes the data encoder 86 to put a string of NRZ logic 1's on the line 92 to cause the modulator to modulate the RF Carrier at 100% amplitude such that the burst carries no data. The Carrier Enable signal on line 181 enables the RF amplifier 100 in the transmitter 82 and causes the R.F. amplifier 100 to pass the modulated carrier on line 102 through to the diode switch 101 and causes the diode switch 101 to change impedance states from a high impedance to a low impedance which approximately matches the impedance of the strip line 84.

The Burst Enable signal on the line 152 is coupled to an RF tank circuit 99 in the transmitter 80 as well as the burst switch 118 in the receiver. The RF tank 99 is coupled to the modulator 98 so as to control the frequency of the RF carrier generated by the modulator 98 by virtue of the electrical characteristics of the RF tank 99. When the Burst Enable signal is false during non-burst transmissions, the electrical characteristics of the RF tank 99 are stable and the frequency of the RF carrier does not vary. However, during burst, the Burst Enable signal causes the electrical characteristics of the RF tank to be varied. The varying electrical characteristics of the RF tank cause the frequency of the RF carrier to be swept automatically over a range of frequencies during the burst transmission.

The purpose of altering the frequency of the RF carrier is to insure that that the contention will be detected if another modem is simultaneously bursting. That is, two burst carriers will interfere with each other and cause interference beating as is known in the art. The interference beating will cause the amplitude on the carrier on the strip line 84 to change in a random wave motion. The reason this interference beating is desirable is to enable the receiver 82 and modem control engine 104 to more easily determine whether another modem is simultaneously contending for the coax line 64.

The Burst Enable signal also causes the burst switch 118 in the receiver 82 to disconnect the AGC signal on the line 137 from the AGC input line 117 to the RF amplifier 114. Simultaneously, the burst gain control signal on the line 150 is applied to the gain control input 117 of the RF amplifier 114 to set the gain at a fixed, predetermined, manually adjustable level. This level is established such that the demodulator 116 and A/D converter 122 will detect amplitude changes caused by the beating in the demodulated carrier analog signal on the line 120. If beating is occurring, the A/D converter 122 will generate an NRZ-SR pulse on the line 124 each time the signal on the line 120 rises above a predetermined level.

The next machine state in the transmission protocol is to test the NRZ-SR signal to determine if any other modem is contending for the line. Referring to FIGS. 10B, 7A, and 8B, the FPLS moves to state 196B, wherein the FPLS examines the Contention signal on a line 197 to determine if a contention exist. In FIG. 8B, the Contention signal is generated by a contention signal generator 220.

The contention signal on the line 197 is generated by two conventional TTL 74LS279 latches 188 and 183 and a 74LS175 sync latch 227. The latch 188 serves to delay the opening of the contention window by a predetermined time by not raising the Q output on the line 203 until 2.3 microseconds after Burst Enable on the line 152 becomes true. This is necessary because for a short period after Burst Enable becomes true, the receiver 82 is not able to detect any contentions. The delay is implemented by applying the Burst Enable signal to the set not input of the latch 188 through a NAND gate 245 which has an input coupled via a line which carries a signal from the timer 186 which does not become true until the 2.3 microseconds after the burst starts as will be apparent upon inspection of FIG. 8A.

The contention signal on the line 197 becomes true when the contention window signal on the line 203 is true and the NRZ-SR signal on the line 124 from the receiver 82 is true and the Modem Clock signal on the line 111 makes a low to high transition. Contention Window and NRZ-SR are applied to the set not input of the latch 183 through a conventional 74LS00 NAND gate 209.

When Contention is true on the line 197, the FPLS 176 knows that the receiver 82 is seeing amplitude changes in the strip line 84 indicating that another modem is contending for the transmission medium.

Referring to FIGS. 9, 7A and 10B, there are three paths out of the state 196 for the FPLS 176. The path 196C is taken if the RTS signal becomes false. When this happens, the FPLS knows the client device no longer desires to send or that RTS was falsely asserted for some reason and returns to the listen state 166.

If a contention is found, the FPLS moves to a contention resolution state 198 via a path 196D. If no contention is found, the FPLS moves to a post burst listen state 200 via a path 196E.

The contention resolution protocol of the state 198 consists of a series of steps to determine the amount of delay before retrying the transmission. The amount of delay is determined by generating a random binary number using the randomness of the beat pattern itself and using the random binary number to control the amount of delay before a retry attempt.

Referring to FIG. 10B, the first steps in the contention resolution protocol are steps 198A, B and C. Steps 198A and B wait for the burst to finish after $2t_d$. In step 198C, the FPLS checks the state of the random binary number (RBN) generator 211 in FIG. 8B to see if the RBN on the line 221 is true or false. If the RBN is true, the FPLS takes a path 198D back to the listen state 166 to retry the transmission after whatever transitions are made from the state 166 as previously described.

If the RBN is false, the FPLS 176 moves over the path 198E to a state 198F where it waits for the foreign carrier to drop off the line by waiting for the signal C.CD to become false. When C.CD does become false, the FPLS moves over a path 198G to a listening state 198H which lasts for $6t_d$.

The details of the RBN generator will be apparent to those skilled in the art upon inspection of FIG. 8B. The RBN generator is comprised of a TTL 74LS74 flip flop 217 with its D input 213 coupled to the Q not output 215 and its clock input coupled to the NRA-SR signal on the line 124. The Q output 225 of the flip flop 217 is coupled to the D input of a sync flip flop 219 which has its clock input coupled to the Modem Clock signal from the timer 186 in FIG. 8A. Whatever is the state on the Q output 225 of the flip flop 217 at the time of a low to high transition of the Modem Clock signal will be transferred to the Q output 221 as the signal RBN. As a result of this structure, the flip flop 217 will toggle each time the NRZ-S signal makes an upward transition. Because the beat pattern on the strip line 84 is random, the toggling action is random and the binary number resulting therefrom will be random.

Returning to FIG. 10B, the FPLS, after determining that the foreign carrier is off the line, starts a 6td listening period on the path 198G such that it stays in the state 198H for 6td. If, during the listening period, no foreign carrier is detected through the C.CD signal on the line 223 in FIGS. 8A and B, the FPLS returns to the listening state 166 via a path 198I after 6td expires.

However, if a foreign carrier is detected during the 6td listening period, then the FPLS makes a transition to a detected carrier state 198J via a path 198K. The FPLS then moves to a state 198L by a path 199 wherein it enables the timer and checks the condition of the C.CD signal during a 5td time period. The FPLS also checks the condition of the attempt counter. If the C.CD signal goes false before the expiration of 5td and the number of previous attempts is less than 10, the FPLS moves to the previously described state 198F via the path 198M. Processing then proceeds as previously described.

If the number of attempts has reached 10, the FPLS enable the attempt counter for parallel load and moves over a path 198N to the previously described state 194A to send a false transmission signal. Processing then proceeds as previously described.

If the C.CD signal remains on during the entire $5t_d$ time period, upon the signal $5t_d$ becoming true, the FPLS moves from the state 198L via a path 198P to the previously described state 168E. When the carrier drops the FPLS moves on the path 168G to the previously described state 170 to load reset the attempt counter and then returns to the listen state 166 via the path 174. Thereafter, processing proceeds as previously described. Thus a random distribution of delay periods is incorporated prior to transmission retry.

Returning to the state 196 in FIGS. 10B and 7A, if no contention was detected during the $2t_d$ burst period, the FPLS 176 moves to a post burst listening period state 200 via the path 196E. The first step in this post-burst listening period protocol is 200A where the FPLS waits for a period of $1t_d$, i.e., 5 microseconds. Upon the expiration of this period, the FPLS move to a state 200B along the path 200F and the timer 186 is started. While in the state 200B, if the signal RTS becomes false, the FPLS transfers back to the previously described state 166 via a path 200C.

While the state 200B, if a carrier is detected by the signal C.CD becoming true and RTS is still true, then the FPLS moves to a timer state 202 via a path 200D to determine if the detected carrier is a burst, data packet or acknowledge packet. Immediately upon reaching the state 202, the FPLS makes a transition on the path 201 to a state 202A. The transition on the path 201 causes the Timer Enable signal to be made true.

Referring to FIG. 7A, the purpose of the state 202 is to time the foreign carrier to determine whether it is a burst carrier or a data or acknowledge packet. The protocol of the steps of the state 202 are shown in more detail in FIG. 10C. The first step is to begin timing the foreign carrier. If the signal C.CD becomes false before the expiration of $5t_d$ and RBN is true, the FPLS transfers to the previously described listen state 166 in FIG. 10B via the path 202B. If RBN is false however, the FPLS transfers via the path 202E to the previously described state 198H to listen for 6td. If C.CD is still on at the expiration of 5td, the FPLS transfers on the path 202C to the previously described state 168E. Processing from those points then proceeds as previously described.

Returning to the state 200B in FIGS. 9 and 10B, if no foreign carrier is discovered on the line during the post burst listening period of the state 200 in FIG. 7A, then the FPLS will transfer to a state 204 via a path 200E. The purpose of the state 204 is to transmit the preamble to a data packet for the purpose of allowing the receivers in the system to adjust their gain levels. This transfer occurs when C.CD becones false, RTS is true and 8td is true.

There are two steps in the transmission sequence. The first step is 204A in FIGS. 7B and 10C and FIG. 9. The purpose of this step is to transmit a preamble to the data consisting of a 100% modulated non data bearing RF carrier which lasts for 3td. If the client device trying to send a data packet renders the signal RTS false, then the FPLS will return to the state 166 via the path 204C.

If the client device is still requesting to send data, the FPLS will move to the state 204B via the path 204D after the preamble. The purpose of the state 204B is to send the data packet. The FPLS, in moving to the state 204B along the path 204D, sends the signal CTS or, optionally, CTS Sum when using an optional MUX. Thereafter, the client device sends the data to be modulated onto the RF carrier to the transmitter 80 in FIG. 6 through the buffer 96 along the $T_x$ DATA line 90 and the $T_x$ CLK line 88. The FPLS in moving to the state 204B makes the signal Carrier Enable true which causes the transmitter 80 to set the gain of the RF amplifier 100 at transmit levels and to cause the diode switch 101 to switch to its low impedance state. Thereafter, the data goes onto the strip line via the line 108 and the attempt counter is enabled for a pre-load.

Upon completion of transmission of the data packet, the FPLS moves to the listen state 204E along the path 204F to wait for the carrier to drop. The transition to the state 204E does not occur until the signal RTS becomes false indicating that the client device has completed sending its data packet. Upon making the transition, the attempt counter is pre-loaded to 0110 binary.

In the state 204E, the FPLS waits for the carrier signal on the strip line 84 to drop as indicated by the signal C.CD becoming false. The signal C.CD is true during the transmission of the data packet because the receiver section 82 has its gain automatically set by its own automatic gain control circuitry during the preamble section of the data packet to the proper level to receive the signal from the transmitter 80.

There are two possibilities for the address of the previously transmitted data. First, the data may have been sent to a client device connected to a foreign modem, or second, the data may have been sent to one of the other client devices coupled to an optional multiplexer connected to the same modem. To determine which is the case, the FPLS examines a signal RT on a line 182 from the client device to determine if the data was sent to one of its own client devices. If the block 94 is a multiplexer in FIG. 6, the signal on the line 182 is RTA Sum which is a combination of the request to acknowledge signals RTA from each of the client devices attached to the multiplexer. Otherwise the signal on the line 182 is simply the request to acknowledge signal from the client device.

If RTA is true, the FPLS transfers from the state 204E to the previously described state 180A along the path 204H. Processing then continues as previously described in order to send out an acknowledgment packet.

If RTA has not become true by the time the state 204E is reached, the FPLS 176 makes a transition to the state 204L along the path 204G. The path 204G will be taken only if the FPLS inputs C.CD not and RTA not are true when the state 204E is reached. The Timer Enable and Ack Window outputs will be made true when this transition is made to create the acknowledge window.

If the signal C.CD becomes true while the FPLS is in the state 204L, the FPLS transfers from the state 204L to the previously described state 168A via the path 205 to time the foreign carrier to determine what kind of transmission it is.

If, however, the signal C.CD is false with RTA becoming true while in the state 204L, the FPLS determines whether $2.5t_d$ have expired since the acknowledgement window was opened. If $2.5t_d$ has not elapsed, and there is still no foreign carrier on the strip line and RTA is true, the modem's own client device has received the data, and the FPLS transfers control on the path 207J to the state 204N and then, immediately, to the previously described state 180A via the path 204M to send an acknowledgment packet. If RTA remains false, the FPLS continues to wait until either the signal C.CD has become true or the signal C.CD has remained false and $2.5t_d$ has expired.

If both C.CD is false and $2.5t_d$ has expired, the FPLS knows no ackowledgment has been received and transfers back to the previously described state 166 via the path 204K and processing continues as previously described. This completes the description of the line acquisition protocol of the modem depicted in FIG. 6.

The individual details of the functional blocks of the transmitter 80 and the receiver 82 are seen in FIGS. 11, 12, 13, 14 and 15.

FIG. 11 shows the details of the modulator 98, the amplifier 100, the diode switch 101 and the RF tank circuit 99. These elements will be described in terms of their function only since the details of the functions of the individual components and the interconnections thereof with the integrated circuits will be apparent to those skilled in the art.

The heart of the modulator 98 is a Motorola MC1373 TV video modulator. The chip has an internal RF oscillator and RF modulator and depends upon the circuitry connected to lines 208 and 206 to determine the frequency of the carrier generated by the RF oscillator. The modulating signal is the signal NRZ-S on the line 92. This signal or a test modulation signal is supplied through a standard TTL 7417 open collector buffer with its output coupled to the baseband input 229 of the modulator. The RF tank inputs 206 and 208 are coupled to a parallel-tuned circuit comprised of an inductor 210 with a 150 picofarad capacitor 212 coupled to one end and a 150 picofarad capacitor 214 coupled to the inductor 210 at the other end. Between the two capacitors 212 and 214 there is coupled a Motorola MV 1405 varactor diode 216 which completes the parallel-tuned circuit. The anode of the varactor diode is coupled to the capacitor 212 while the cathode of the varactor is coupled to the capacitor 214. The cathode of the varactor diode 216 is also coupled to the Burst Enable signal through a 7417 open collector buffer amplifier 218. The output of the buffer 218 is coupled to a 15 volt supply through a resistor 226 and to the cathode of a 5.1 volt zenor diode 222 which has its anode grounded. When the Burst Enable signal on the line 152 is false, a 15 volt signal will be applied to the cathode of the varactor diode 216, and the diode will be in a reverse biased state because of the 15 volt supply voltage coupled through the resistors 224 and 226 to the node 228. Thus, a certain fixed junction capacitance will exist in the varactor diode 216 when the Burst Enable signal on the line 152 is false. Therefore, when Burst Enable is false, the carrier frequency generated by the RF oscillator and the MC 1373 will be fixed at a reference frequency of around 50 megahertz.

When, however, the Burst Enable signal is true, the buffer 218 will ground the line 230 which will result in the varactor 216 becoming less reverse biased. The biased condition on the varactor 216 changes the junction capacitance thereof which causes the total capacitance in the tuned RF tank circuit 99 to be altered. This insures that the frequency of the carrier during the burst segment of the acquisition protocol will be altered over a range of frequencies to insure that interference beat patterns will occur with any burst signals put out by other similar modems.

The modulated RF output on the line 102 is coupled to the input of the RF amplifier 100 the heart of which is a Motorola MC 1350 integrated IF amplifier 232. The amplifier 232 has its gain control input coupled to the Carrier Enable signal on line 181 through a 74LS02 NOR gate 234 and a 7417 open collector buffer 236. A voltage divider comprised of the resistors 238 and 240 establish a steady state gain control level on the line 242 when the Carrier Enable signal on the line 181 is false. When the Carrier Enable signal is true, the voltage on line 242 is altered by the buffer 236 so as to allow the amplifier 232 to pass the RF carrier signal on line 102 through to the diode switch 101 on the line 106 as will be apparent to those skilled in the art.

A Motorola MWA 130 broadband amplifier is interposed between the output of the RF amplifier 232 and the input on line 106 of the diode switch 101. The purpose of this amplifier is to supply additional fixed gain for the fundamental and all harmonics of the modulated RF signal at the output of the amplifier 232.

The diode switch 101 is comprised of a 1N4003 diode 246 interposed between the line 106 and a reed relay 248 coupled to the strip line 84 through a 1,000 picofarad capacitor 250. The cathode of the diode 246 is connected through a load resistor 252 to the collector of a 2N3904 transistor 254 which has its emitter grounded. The base of the transistor 254 is connected to ground through a resistor 256 and is connected to the anode of the diode 246 through a resistor 258. The anode of the diode 246 is also connected through line 106 and a resistor 260 to the collector of a 2N3906 transistor 262. The emitter of this PNP transistor 262 is coupled to a 15 volt D.C. supply via a line to 264. The base of the transistor 262 is coupled through a resistor 266 to the output of a standard 7417 open collector buffer 268. The input of this buffer 268 is coupled to the output of the NOR gate 234. As will be apparent to those skilled in the art, the foregoing structure of the diode switch 101 will cause the diode 246 to be forward-biased when the Carrier Enable signal on 181 is true. The reed switch 248 will be closed when the modem is powered on. Therefore, when the Carrier Enable signal on the line 181 is true, the low impedance of the forward-biased diode 246 is presented to the strip line 84 and tends to provide a closer match between the output impedance of the transmitter 80 and the characteristic impedance of the strip line 84.

However, when the Carrier Enable signal on the line 181 is false, the diode 246 is reverse-biased and a high impedance is presented to the strip line 84 by the transmitter 80. Thus, the strip line 84 is not loaded down by a low impedance at the transmitter output when the modem is in the receive or listening states.

Referring to FIG. 12 there is shown a detailed logic diagram of the data encoder of the transmitter. The heart of the data encoder 86 is a standard 74LS109 JK positive edge triggered flip flop. The NRZ-S signal on the line 92 is coupled through the output of a 74LS08 and gate 273 with one of its inputs coupled to the Q output of the flip flop 270 by the line 272. The clear input on line 274 is coupled to a constant positive DC voltage equivalent to a logic 1. The preset input 276 is coupled to the output of a 74LS02 NOR gate 277 which has one of its inputs coupled to the Hold Encoder signal on the line 178 and the other to the output of an inverter 284 which has its input coupled to a constant DC voltage source equivalent to a logic 1. A switch 285 is coupled to the input line 282 and to ground to cause a logic 0 condition on the line 282 when the switch is in a test position. The input 282 is in a logic 1 condition when the switch 285 is in the normal operation position.

When the Hold Encoder signal on the line 178 is true, the 74LS02 forces the preset input coupled to the line 276 to a logic 0 state which forces the Q output 272 of the flip flop 270 to a logic 1 condition regardless of the condition at the J and K inputs 278 and 280 respectively and regardless of the condition at the clock input 288. Because the AND gate 273 has its other input coupled to a line 275 which is always in a logic 1 condition during normal operation, the NRZ-S signal on the line 92 is a constant logic 1 when the signal Hold Encoder is true.

When the Hold Encoder signal on the line 178 is false, the NOR gate 277 will hold the preset input 276 of the flip flop 270 in a logic 1 condition because of the logic 1 level signal during normal operation at the node 282 which is converted by the inverter 284 to a logic 0 signal on the line 286 coupled to the other input of the NOR gate 277. Thus, during normal operation, when the Hold Encoder signal on the line 178 is false, both the preset and the clear inputs are in a logic 1 condition and the flip flop 270 is free to change state in response to the conditions at the J and K inputs, 278 and 280 respectively, and the clock input 288. The clock input 288 is coupled through a 74LS14 inverter 290 to the signal $T_x$ CLK on the line 88 from the buffer 96 in FIG. 6. The K input 280 is coupled to the signal $T_x$ DATA on the line 90 while the J input 278 is coupled through a 74LS14 inverter 292 to the line 90.

The foregoing input structure of the flip flop 270 implements a non-return-to-zero-space encoding scheme where a transition during a bit cell indicates a logic zero and no transition indicates a logic 1. That is, when the data bit on the line 90 is a logic 1 at the time of the negative transition of the signal $T_x$ CLK on the line 88, the J input 278 will be in a logic 0 condition and the K input 280 will be in a logic 1 condition. The resultant positive going transition at the clock input 288 will cause the flip flop 270 to remain in whatever state it was in during the last bit cell which indicates that the data bit was a logic 1. However, when the data bit on the line 90 is a logic 0 at the time of the negative transition of the clock signal on the line 88, the flip flop 270 will toggle from its previous state, which indicates a logic zero in the bit stream.

Figure 13:
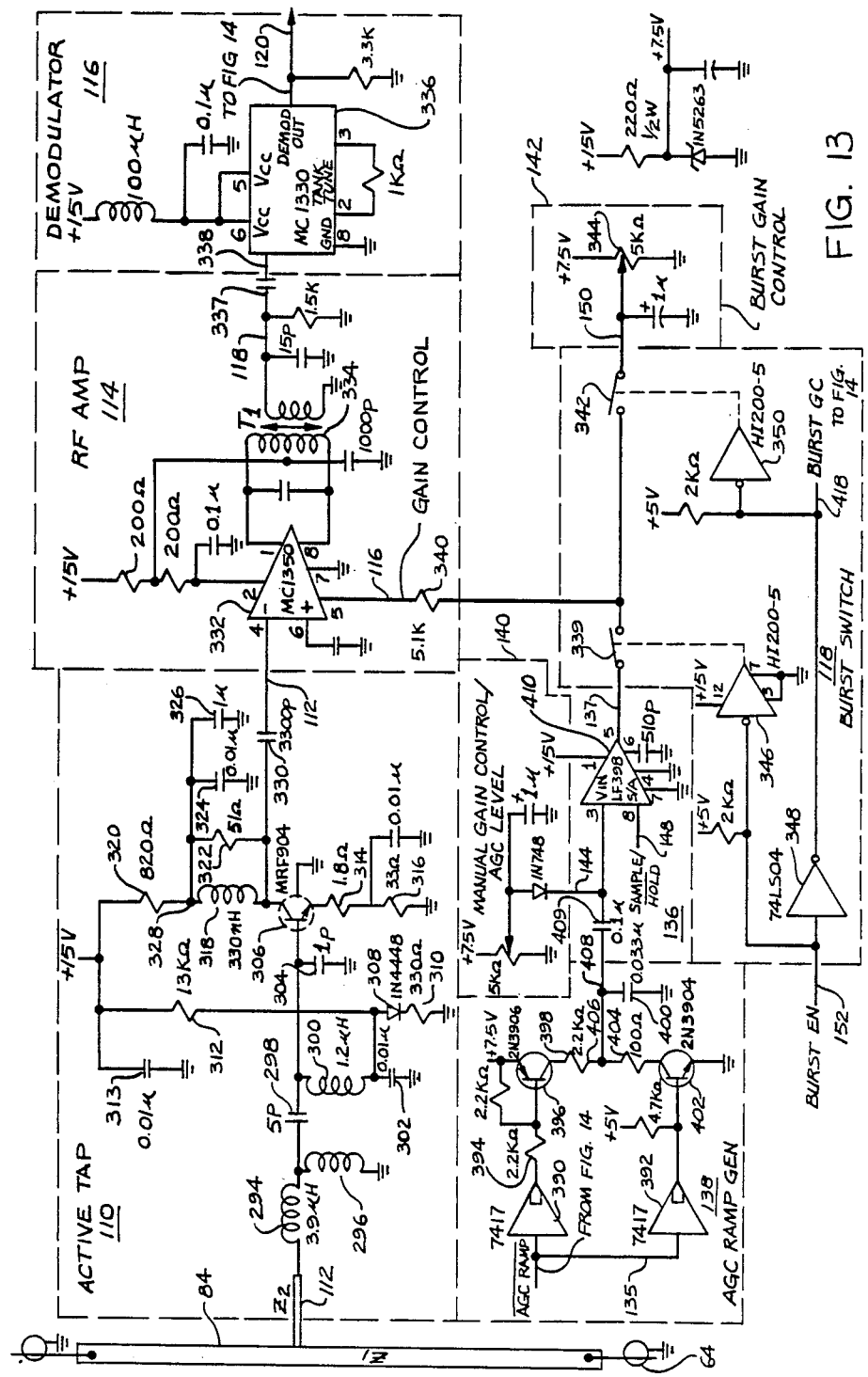
FIG. 13 is a detailed logic diagram of the active tap, RF amplifier, demodulator, AGC ramp generator, manual gain control, sample and hold circuit, burst switch and the burst gain control of the receiver.

Referring to FIG. 13 there is shown in detail a schematic diagram of portions of the receiver. FIG. 13 includes the detailed circuitry of the active tap 110, the RF amplifier 114, the demodulator 116, the AGC ramp generator 138, the burst switch 118, the manual gain control 140, the sample and hold circuit 136 and the burst gain control 142.

The active tap 110 is comprised of a strip line 112 which contacts the strip line 84 coupling the strip line to a high input impedance active gain stage. The purpose of the active tap 110 is to minimize the insertion loss while presenting a high, substantially non-reactive impedance to the strip line 84. The strip line 84 is an extension of the coaxial line 64 and is designed in accordance with microwave RF design principles. The strip line 112 physically touches the strip line 84 and is designed to have a capacitive reactance component of impedance which cancels out the inductive reactance component of the impedance presented by the input network of inductors and capacitors.

The active tap 110 presents an input impedance for the receiver 82 of approximately 4,000 ohms with little or no reactive component such that very little disturbance is created by the active tap 110 on the 75 ohm strip line. It is the reactive component of the input impedance which will cause reflected energy so the active tap has been designed to both present a high impedance and to cancel out the reactive component of that input impedance. Thus, a large number of modems are connected to the coaxial line 64 without loading down the line.

The dimensions of the strip line 112 are critical to establishing the proper reactance cancelling component of the input impedance for the receiver. The strip line 112 has been computer optimized in the preferred embodiment, and it has been found that a strip line 112 which is approximately 0.009 inches wide by 0.684 inches long will have the proper reactive component. The strip line 112 is connected to the base lead of a Motorola MRF 904 high frequency transistor 306 through an impedance matching network comprised of and inductor 294 and a capacitor 298. An inductor 296 couples the node between the inductor 294 and the capacitor 298 to ground. An inductor 300 couples the node between the capacitor 298 and the base of the transistor 306 to ground through a capacitor 302. The anode of a 1N4448 diode 308 is coupled to the node between the capacitor 302 and the inductor 300. The cathode of the diode 308 is connected to ground through a resistor 310. The anode of the diode 308 is also coupled through a resistor 312 to a 15 volt DC supply. A bypass capacitor 313 couples the +15 volt DC supply to ground. The base of the transistor 306 is also coupled to ground through a capacitor 304. The purpose of the inductors 294, 296 and 300 and the capacitors 298, 302 and 304 is to match the output impedance of the strip line 112 to the input impedance of the transistor 306. The input impedance of the transistor 306 is defined by its S parameters in the Motorola R.F. Data Book. Those skilled in the art will appreciate that the impedance looking into the network interposed between the base of the transistor 306 and the output of the strip line 112 toward the base will approximately match the input impedance of the transistor 306 at the frequency of interest and have a certain reactive component. However the impedance looking from the strip line 84 into the strip line 112 toward the base of the transistor 306 should be approximately 4,000 ohms with little or no reactive component.

The emitter of the transistor 306 is coupled to ground through the resistors 314 and 316. These resistors supply negative voltage feedback to the transistor 306 to stablize it. The purpose of the diode 308 is to supply temperature tracking for the transistor 306 to make its operations stable over a range of temperatures.

The collector of the transistor 306 is coupled to the 15 volt supply through an inductor 318 and a resistor 320. A resistor 322 is coupled across the inductor 318, and capacitors 324 and 326 are coupled between the node between the inductor 318 and the resistor 320 and ground. The collector of the transistor 306 is also coupled through a capacitor 330 to the output line 113 of the active tap which is coupled to the input of the RF amplifier 114. The purpose of the output network comprised of the inductor 318, the resistor 322 and the capacitors 324, 326 and 330 is to present an output impedance looking into the active tap from the line 113 of approximately 50 ohms.

The heart of the RF amplifier 114 is a Motorola MC 1350 integrated IF amplifier 332. The output of the amplifier 332 is applied through a transformer 334 and a capacitor 337 to the RF 338 input of the demodulator 116 by the line 119. The function of the various components in the RF amplifier 114 will be apparent to those skilled in the art.

The heart of the demodulator 116 is a Motorola MC 1330 low-level video detector 336. The detector 336 converts the modulated RF carrier at its input 338 to a varying DC voltage signal at its output 120. The signal on the line 120 varies in DC level with the amplitude of the RF carrier at the input 338. The RF Envelope signal on the line 120 is approximately 2 volts for a 100% modulated carrier at 338 and rises to +6 volts for no carrier at the input 338. The function of the other components in the demodulator 116 will be apparent to those skilled in the art.

The operation of the burst switch 118 in FIG. 13 is controlled by the Burst Enable signal on the line 152. The burst switch 118 is comprised of a normally closed relay contact 339 which is coupled to the output of the sample and hold circuit 136 by the line 137 and is coupled to the gain control input line 117 of the RF amplifier 114 through a resistor 340. A separate normally open relay contact 342 is connected between the output 150 of the burst gain control 142 and the gain control input 117 of the RF amplifier 114 through the resistor 340. The burst gain control 142 is a manually adjustable potentiometer 344 coupled between a 7.5 volt DC voltage source and ground.

The burst enable signal on the line 152 is coupled to the input of the relay driver inverting amplifier 346 which controls the relay contacts 339. When Burst Enable is true, the contacts 339 are opened by the relay driver 346. In the preferred embodiment, the relay driver is an HI200-5 manufactured by Harris Semiconductor. The Burst Enable signal is also coupled through an inverter 348 to the input of an inverting relay driver amplifier 350 which controls the contacts 342 and is the same model as the driver 346. When the Burst Enable signal on the line 152 is true, the relay driver amplifier 350 causes the contacts 342 to be closed. Thus when the Burst Enable signal is true, the gain control input 117 of the RF amplifier 114 is coupled through the relay contacts 342 to a manually adjustable DC voltage level established by the setting of the potentiometer 344. The potentiometer 344 is set at a level to prevent the RF amplifier 114 from being swamped by the burst transmission of the transmitter 80 in FIG. 6. The demodulator 116 then converts the received signal by the RF amplifier 114 into the analog demodulated carrier signal on the line 120 which is coupled to the A/D converter 122, the Carrier Detector 126, and the ACG threshold detector 128 in FIG. 6.

Figure 14:
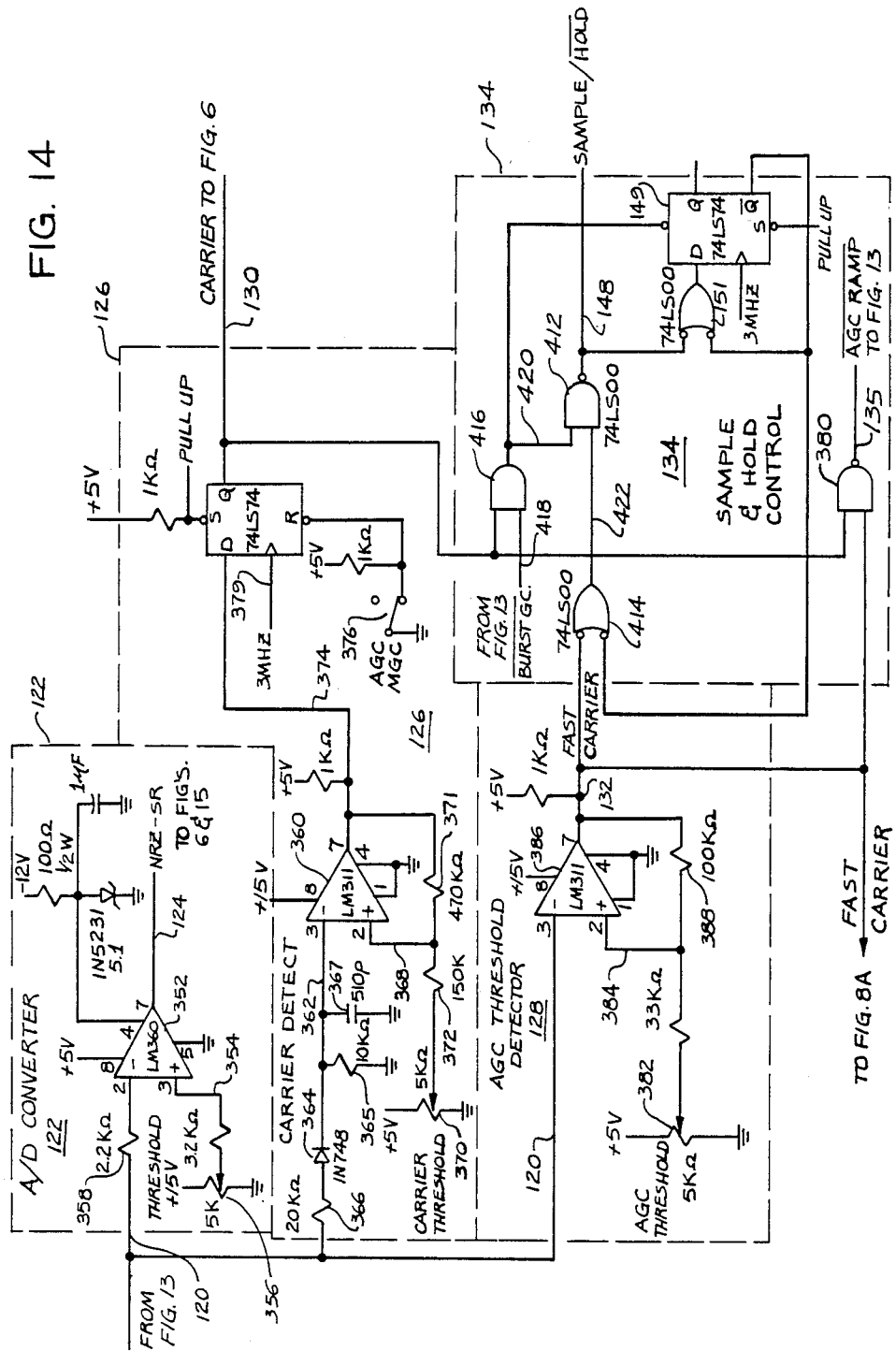
FIG. 14 is a detailed schematic diagram of the A/D converter, carrier detect, threshold detect and sample and hold control circuits of the receiver.

Referring to FIG. 14 there is shown the detailed circuitry of the A/D converter 122, the Carrier Detector 126 and the AGC threshold detector 128 and the sample and hold control circuit 134.

The A/D converter 122 is used to convert the analog signal on the line 120 to the digital pulses of the signal NRZ-SR on the line 124. As previously noted, the signal NRZ-SR is used by the modem control engine 104 in FIG. 6 to detect when there is a contention on the coax cable during the burst. Further, the signal NRZ-S is used by the data decoder 156, shown in more detail in FIG. 15, to recover the received data and the clock encoded in the data to synchronize the local receiver clock with the transmitter clock.

The A/D converter 122 generates the NRZ-SR signal by using a National Semiconductor LM 360 voltage comparator or equivalent to compare the signal on the line 120 to a reference voltage on a line 354 connected to the non-inverting input. The reference voltage on the line 354 is generated by a manually adjustable potentiometer 356 coupled between a 15 volt DC voltage source and ground. In the preferred embodiment, the reference voltage on the line 354 is set at approximately 3.8 volts. The signal on the line 120 is coupled through a resistor 358 to the inverting input of the comparator 352. During burst, the burst circuitry sets the demodulated carrier signal on the line 120 to a level of 3.6 volts if only the carrier from the transmitter 80 is on the line. When the signal on the line 120 exceeds the threshold reference voltage on the line 354, a positive going transition occurs on the line 124. The signal on the line 120 will vary in amplitude because of beating which is occurring on the strip line 84 because of a contention for the line with another modem which also bursts simultaneously. The NRZ-SR signal will constitute a train of pulses randomly spaced from each other.

The Carrier Detect circuit 126 also has as its heart a National Semiconductor LM 311 voltage comparator 360. The inverting input 362 of the comparator 360 is coupled to the signal on the line 120 through a diode 364 and a resistor 366 which function in conjunction with a resistor 365 and a capacitor 367 coupled from the line 362 to ground to filter the signal and smooth it out to prevent the output signal from the comparator 360 on the line 374 from pulsing. It is desirable that once a carrier is detected, the carrier signal on the line 130 stay on until the signal on the line 120 rises to 6 volts for a predetermined time.

The non-inverting input 368 is coupled to a carrier threshold manually adjustable potentiometer 370 through a resistor 372. The carrier threshold potentiometer 370 is coupled between a +5 volts DC supply and ground and can be adjusted to establish a reference level at the input 368 over a sufficient range to detect any level of carrier out to the maximum range of the system. The output of the voltage comparator 360 on the line 374 is coupled to the D input of a 74LS74 flip flop 378 by a line 374 and is coupled through a positive feedback resistor 371 to the non-inverting input of the comparator 360. The positive feedback provides a hysteresis in the switching point such that the comparator will switch states when the voltage on the line 120 drops below approximately 0.4 volts but will not switch again until the voltage on the line 120 rises above approximately 1.5 volts.

The flip flop 378 serves as a digital filter with a sampling rate of 3 megahertz because of the connection of the clock input 379 to a 3 megahertz clock input. That is unless the signal at the D input on the line 374 drops to a logic 0 for more than the period of the clock or during a rising clock edge, the carrier signal on the line 130 will remain a logic 1. The flip flop 378 has its preset and clear inputs both held high when the switch 376 is in the automatic gain control position. The switch 376 has a manual gain control position which grounds the clear input of the flip flop 378 such that the signal Carrier on the line 130 is always false.

The Carrier signal on the line 130 is coupled to a NAND gate 380 in the sample and hold control circuit 134 which generates an output signal $\overline{\text{AGC RAMP}}$, on the line 135 which is coupled to the AGC ramp generator 138 in FIG. 13. When the switch 376 is in the manual gain control position, the Carrier signal on the line 130 is always false regardless of the amplitude of the signal on the line 120 which causes the $\overline{\text{AGC RAMP}}$ signal on the line 135 to be false or a logic 1. The effect of this will be discussed in connection with the operation of the AGC ramp generator 138 in FIG. 13.

The ACG threshold detector 128 in FIG. 14 serves to determine when the signal on the line 120 exceeds a certain AGC threshold level established by a potentiometer 382 at the non-inverting input 384 of a National Semiconductor LM 311 voltage comparator 386 or equivalent. The signal on the line 120 is applied to the inverting input of the comparator 386. The comparator 386 is connected to have positive feedback around the comparator to cause hysteresis and to prevent oscillation. This positive feedback also avoids excessive noise in the output. The positive feedback is provided by a resistor 388 feeding part of the output signal on the line 132 back to the non-inverting input 384. The amount of feedback is selected such that when the signal 120 falls below the 0.6 volt reference level set by the AGC threshold potentiometer 382, the output on the line 132 goes immediately to a logic 1 condition. However, when the signal on the line 120, starting from below the 0.6 reference level begins to rise, it must reach a level of approximately two volts before the output on the line 132 drops to a logic 0.

During non-burst times it is the responsibility of the AGC Ramp generator 138 and the sample and hold circuit 136 in FIG. 13 to work in conjunction with the AGC threshold detector 128 and the sample and hold control circuit 134 in FIG. 14 to adjust the gain of the RF amplifier during the preamble of the incoming data packet to a level for comfortable reception of the entire data packet and then to hold the gain at that established level for the entire data packet. This is accomplished as follows:

When the preamble of the incoming data packet is received, the 100% modulated RF carrier causes the signal on the line 120 to move from the 6 volt condition indicating no carrier to the zero volt condition, indicating full carrier at the RF input 338 of the demodulator 116. As the voltage on the line 120 coupled to the inverting input of the AGC threshold detector comparator 386 passes through the 0.6 volt reference voltage established by the potentiometer 382, the output on the line 132 switches from a logic 0 to a logic 1. Because a carrier is being received, the Carrier Detector 126 causes the Carrier signal on the line 130 to be true. The NAND gate 380 in the sample and hold control circuit 134 has its inputs coupled to the lines 130 and 132 and therefore sees true signals at its inputs during the preamble period. This causes its output signal $\overline{\text{AGC RAMP}}$ to be true or a logic 0.

This $\overline{\text{AGC RAMP}}$ signal on the line 135 is coupled to the inputs of two open collector 7417 buffers 390 and 392 in the AGC ramp generator 138 in FIG. 13. The output of the buffer 390 is coupled through a resistor 394 to the base of a PNP 2N3906 transistor 396. The collector of this transistor is coupled through a resistor 398 and a capacitor 400 to ground. The output of the buffer 392 is coupled to the base of a 2N3904 NPN transistor 402. The collector of the transistor 402 is coupled through a resistor 404 to the ungrounded node of the capacitor 400. Because the signal on the line 135 is a logic 0 during the preamble, the transistor 396 will be turned on and the transistor 402 will be turned off. Since the emitter of the transistor 396 is coupled to a 7.5 volt DC voltage source, a current flow will be established through the transistor 396, the resistor 398, the line 406, the line 408 and the capacitor 400 to ground. Thus the voltage on the line 408 will begin to ramp upward during the preamble. Just before the preamble started, the voltage on the line 408 would be approximately ground by virtue of transistor 402 being turned on by a false $\overline{\text{AGC RAMP}}$ signal, i.e., a logic 1. This establishes a low resistance path from the line 408 through the resistor 404 and the transistor 402 to the ground connection at the emitter lead of the transistor 402. The line 408 is connected to the input line 144 of the sample and hold circuit 136 through a capacitor 409. The heart of the sample and hold circuit 136 is a National Semiconductor LF 398 sample and hold circuit 410.

The Sample/$\overline{\text{HOLD}}$ terminal of the sample and hold circuit 410 is connected to a line 148 carrying the Sample/$\overline{\text{HOLD}}$ signal from the output of a NAND gate 412 in the sample and hold control circuit 134 on FIG. 14. The NAND gate 412 has one of its inputs coupled to the output of an inverted input OR gate 414 which in turn has one of its inverted inputs coupled to the line 132 from the AGC threshold detector 128. The other input of the NAND gate 412 is coupled to the output of an AND gate 416. This AND gate has one of its inputs coupled to the Carrier signal on the line 130 and the other input coupled to the signal $\overline{\text{Burst GC}}$ on the line 418 from the output of the inverter 348 in the burst switch 118 on FIG. 13. When the preamble is being received, the transmitter 80 is not bursting and therefore the inputs to the AND gate 416 are both in a logic 1 condition. Therefore the output on the line 419 coupled to an input of the NAND gate 412 is in a logic 1 condition. The other input to the NAND gate 412, i.e., the line 423 is also in a logic 0 condition at this point in time because a full carrier is being received during the preamble which causes the output of the AGC threshold detector comparator 386 to assume a logic 1 condition. Therefore the inverted input OR gate 414 causes the signal on the line 423 to be in a logic 0 condition which causes the NAND gate 412 to cause the signal Sample/$\overline{\text{HOLD}}$ on the line 148 to be in a logic 1 condition. This causes the sample and hold chip 410 in FIG. 13 to act as if a conducting wire were coupled between the input line 144 and the output line 137 coupled through the closed relay contacts 339 to the gain control input 117 of the RF amplifier 332.

Thus as the preamble is just starting to come in, the RF amplifier 114 has its gain set at a maximum value by virtue of the discharged condition of the capacitor 400 which was discharged through the transistor 402 by the action of the signal $\overline{\text{AGC RAMP}}$ on the line 135. The sample and hold circuit 410 continues to act as a straight-through conductor as the voltage on the capacitor 400 begins to rise. As the voltage on the capacitor 400 rises, the gain of the RF amplifier 332 is decreased which is reflected in a rising DC level of the signal on the line 120. As the signal on the line 120 rises, it eventually reaches a cross-over point of about 2 volts at the inverting input of the AGC threshold detector comparator 386 in FIG. 14. However, when this 2 volt point is reached, the output of the comparator 386 changes to a logic 0 which causes the output of the inverted input OR gate 414 to change to a logic 1. At that time, both inputs to the NAND gate 412 will be in a logic 1 condition which causes the signal Sample/$\overline{\text{HOLD}}$ on the line 148 to become a logic 0. When the line 148 drops to a logic 0 condition, the sample and hold circuit 410 in FIG. 13 holds the voltage level on the line 137 at its then existing level thereby establishing the level of gain of the RF amplifier 114 at a fixed level which lasts for approximately 4 or 5 milliseconds. This period is long enough to receive the entire incoming data packet.

At the same time that the the signal Sample/$\overline{\text{HOLD}}$ changed to a logic 0, the signal $\overline{\text{AGC RAMP}}$ on the line 135 also changed condition causing the transistor 402 to once again turn on and discharge the capacitor 400 making it ready for the next carrier search.

A latch 149 has its D input coupled to the output of an inverted input Or gate 151. One input to the gate 151 is coupled to the output of the NAND gate 412 and the other input is coupled to the Q not output of the 74L574 latch 149. This Q not output is also coupled to the other input of the inverted input Or gate 414.

The purpose of the latch 149 is to latch the line 148 for noise immunity to noise on the line 132 during a packet. As long as a carrier is present, the Sample/$\overline{\text{HOLD}}$ signal on the line 148 will remain in hold mode after hold has been established.

Figure 15:
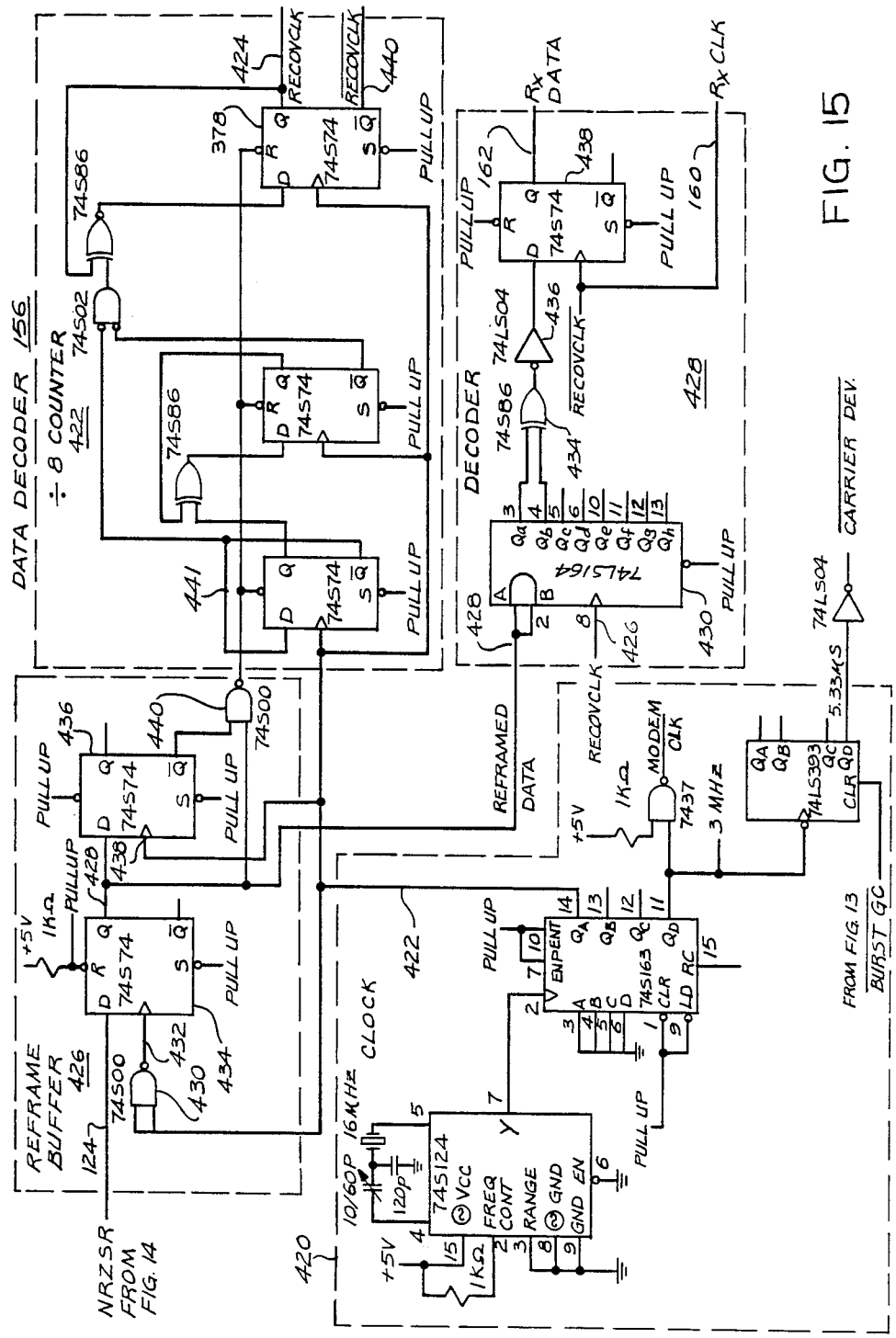
FIG. 15 is a detailed logic diagram of the data decoder in the receiver.

Referring to FIG. 15 there is shown a detailed logic diagram of the data decoder 156 in FIG. 6. The decoder is comprised of a local receiver clock 420 which puts out a pulse train at 24 megahertz on the output line 422. This local clock signal on line 422 is applied to the clock input of a divide by eight counter 425 which divides the 24 megahertz clock signal down to the 3 megahertz data rate of the system. The output of the counter 425 is the signal recovclk on the line 424. A reframe buffer 426 has a data input coupled to the signal NRZ-SR from the A/D converter 122 in FIG. 14.

The local clock signal on the line 422 is coupled through an inverter 430 to the clock input 432 of the reframe buffer 426. The NRZ-SR signal on the line 124 represents the incoming data from the coax 64. The clock transitions on the clock input 432 to the first flip flop 434 of the reframe buffer 426 serve to reframe the incoming data with the local clock as will be apparent to those skilled in the art.

The reframed data appears on the Q output of the flip flop 434, line 428, which is coupled to the D input of a second flip flop 436 in the reframe buffer 426. The purpose of the second flip flop 436 is to reset all the flip flops in the divide by eight counter 425 whenever there is a low to high transition of the reframed incoming data signal on the line 428.

Because the phase of the signal recovclk on 424 compared to the phase of the clock which was used to encode the signal NRZ-SR on the line 124 is not known, there must be some structure which yanks the divide by eight counter output signal recovclk signal back to the middle of the bit cells every time the phase starts to drift off from the transmit clock phase. The structure which accomplishes this function is the flip flop 436 and the NAND gate 439. The flip flop 436 has its clock input coupled to the local clock output 422. The Q not output of the flip flop 436 is coupled to one input of the NAND gate 439 which has its other input coupled to the reframed data signal on the line 428. The output of the NAND gate 439 is coupled to the reset inputs of all three flip flops of the divide by eight counter 425. As will be appreciated by those skilled in the art, the output 441 of the NAND gate 439 makes a high to low transition every time the reframed data on the line 428 makes a low to high transition. This causes the recovclk signal on the line 424 to make its transitions approximately in the middle of each data bit cell of the incoming data signal on the line 124 to synchronize the recovclk signal on the line 424 with the transmitter clock of the sending modem. To avoid loss of synchronization during a long string of one's, the transmitting client's data link controller causes zero bit insertion. That is, a zero is inserted by the transmitter after any succession of five contiguous logic 1's within a frame.

The recovclk signal on the line 424 is applied to the clock input of a decoder 431. The decoder 431 is comprised of a 74LS164 shift register chip 433 having its data input coupled to the Reframed Data signal on the line 428. The $Q_a$ and $Q_b$ outputs of the shift register 433 of the decoder 431 are applied through a 74S86 exclusive OR gate 435 and an inverter 437 to the D input of a 74S74 flip flop 438. The flip flop 438 has its clock input coupled to the signal recovclk nt on the line 440. The Q output of the flip flop 438 is the signal $R_x$ DATA on the line 162 coupled to the MUX 94. The $R_x$ CLK signal on the line 160 in FIG. 6 is the same as the signal recovclk nt on the line 440. The detailed description of the operation of the decoder 431 will be appreciated by those skilled in the art.

Data Link Controller

Figure 16:
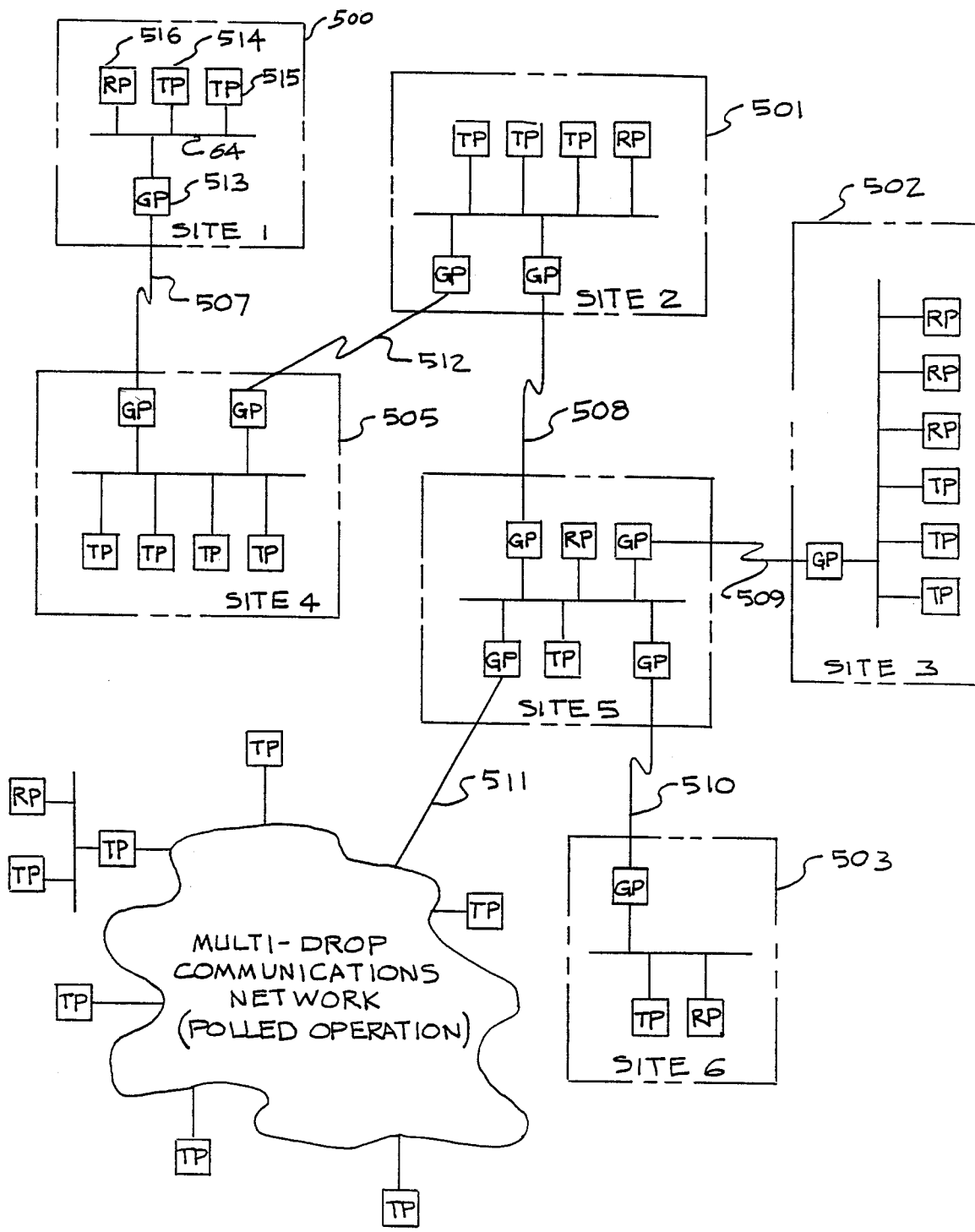
FIG. 16 is a configuration for a data network comprised of a plurality of local area data networks.

Referring to FIG. 16 there is shown a possible configuration for a network comprised of a plurality of local area networks. Local area networks 500 thru 506 are coupled to each other by data links 507 thru 512. The data links 507 thru 512 could be any sort of communication links such as coaxial cable or satellite transmission. Each local area data network is coupled to another local area data network through a gateway processor GP such as the gateway processor 513 in the local area data network 500.

Each local area data network 500 thru 506 is comprised of a plurality of task processors TP such as the task processors 514 and 515 in the local area data network 500. The task processors are coupled to a resource processor 516 and the gateway processor 513 by a data link 64 which typically is a coaxial cable. The task processors can be any sort of data processing unit, and the resource processor 516 can be any type of processor having printers, disk drives, tape drives and other peripherals which are too expensive for each task processor to have for its own use.

Figure 17:
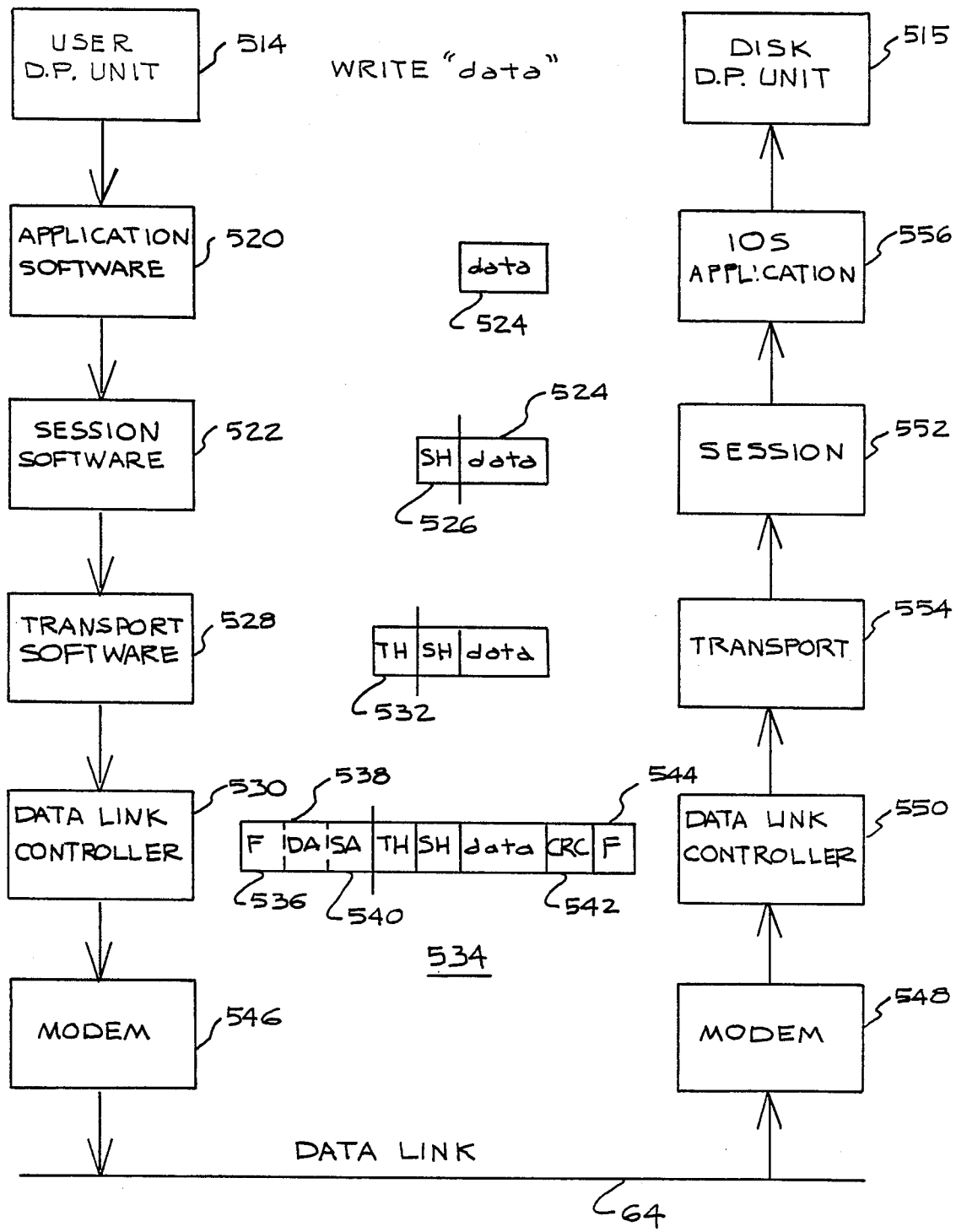
FIG. 17 is a symbolic diagram of the layering of the communications interface for two data processing units on a local area data network.

Referring to FIG. 17 there is shown a symbolic diagram of the layering of the communications interface for two data processing units in one of the typical local area data networks. To explain the operation of the layers of the communications interface, a typical transaction will be examined between a data processing unit 514 and another unit such as disc drive data processing unit 515. The transaction examined will be a write operation wherein the data processing unit 514 writes data to the disc data processing unit 515. Typically, the application software 520 will be performing some processing function and will make a request to store one or more bytes of data on a file on the disc data processing unit 515. The write operation called for by the application software 520 would cause the data processing unit 514 to execute instructions in the session software 522. The data to be written to the disc 515 is represented by the block 524 in the middle of the drawing. The session software 522 in the CPU performs an addressing and routing function. That is, the session software 522 determines the destination address for the data 524 and adds a session header 526 to the data block 524. This packet is then sent to the transport software 528.

The transport software 528 in the CPU performs the function of controlling the hardware of the data link controller 530. The transport software 528 takes the data 524 and the session header 526 and appends to it a transport header 532 which includes control information for the data link controller 530.

The data link controller 530 accepts the packet from the transport software comprised of the data 524, the session header 526 and the transport header 532 and adds serveral fields to complete the data packet to be sent to the destination data processing unit 515. The complete data packet is illustrated generally at 534 in the middle of FIG. 17. The fields added by the data link controller 530 include the opening flag field 536 the destination address 538 which indicates the address of the unit for which the data packet is intended, and the source address 540 which indicates which data processing unit on the net is the originating unit for the data packet. The data link controller 530 also adds a CRC filed 542 and a closing flag 544. The CRC field is an error check field taken over the fields to the right of the opening flag 536 and to the left of the CRC field 542. The generation of the CRC field will be discussed in more detail later, but suffice it to say now that the destination data processing unit can determine whether or not the data packet has been properly received by processing the received fields along with the CRC field in a known manner. The opening and closing flags 536 and 544 serve to completely delimit the data packet 534 such that there is no question that a data transmission has started and there is no ambiguity as to when it ends. The data link controller 530 passes the data packet 534 to the modem 546 which modem has been described in detail above with reference to FIGS. 6 thru 15.

When the data packet arrives at the modem 548, the modem signals the data link controller 550 that a packet is arriving. The data link controller 550 then reconverts the data from serial to parallel format and checks it for accuracy. The data link controller 550 signals the disc data processing unit 515 that a data packet intended for the disc unit has arrived. The transport and session software layers 554 and 552 then strip off the excess data fields and pass the data to be recorded on the disc to the IOS application software layer 556 which controls the disc data processing unit as it writes the data to the proper sector on the disc.

Figure 18:
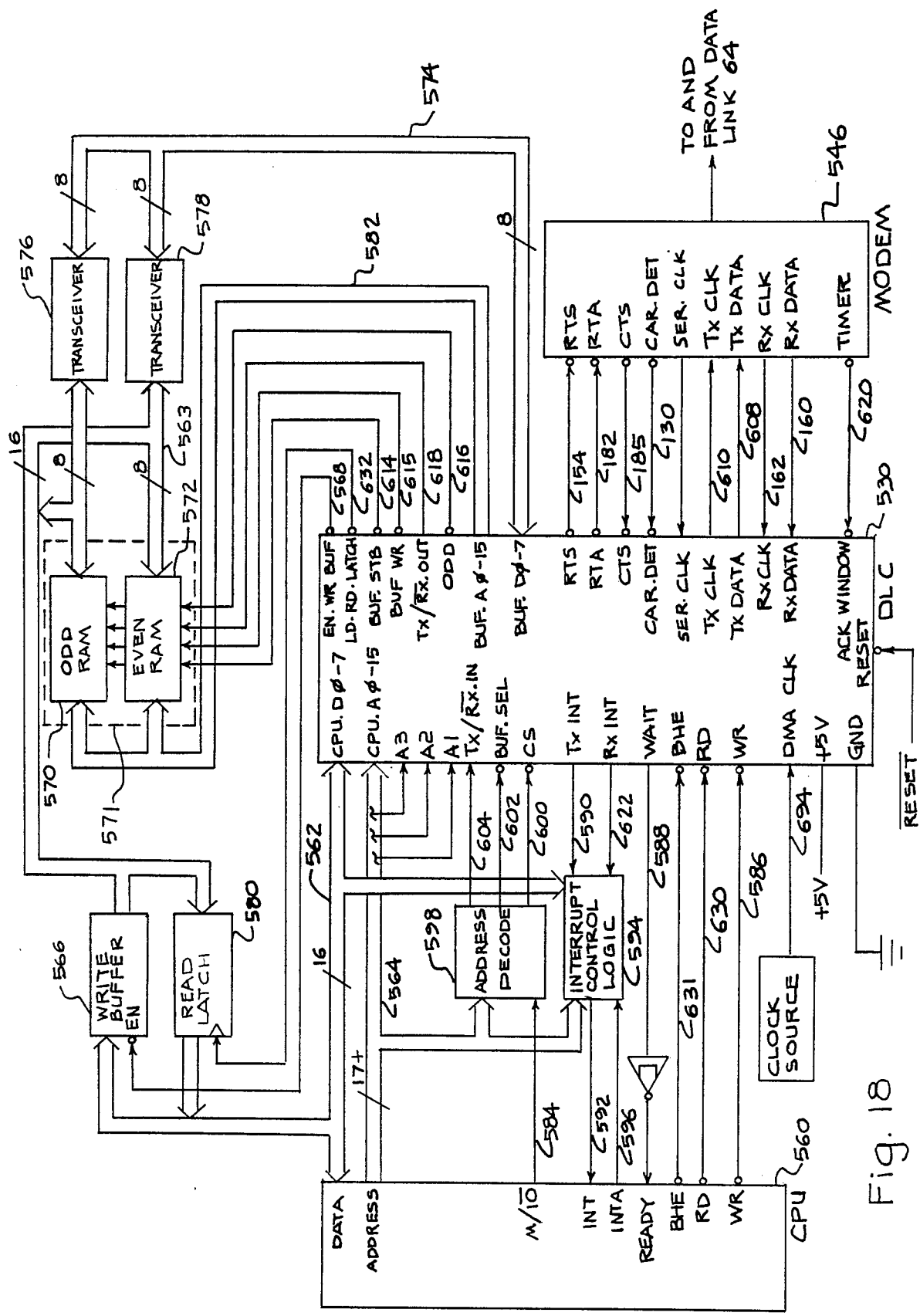
FIG. 18 is a block diagram of the communications interface hardware and bus structure for a 16 bit system.

Referring to FIG. 18 there is shown a block diagram of the communications interface hardware and bus structure for a 16 data bit system. The CPU 560 could be the central processing unit for a disc drive, intelligent terminal, a personal computer or any other type of data processing device desirable for use in a local area data network. Any type of central processing unit 560 which has the necessary interface control signals. In the preferred embodiment, any Intel 8088 or 8086 or a Zilog Z80 or a Motorola 68000 microprocessor could be used.

The CPU 560 is coupled to the data link controller 530 by a 16 bit data bus 562, an address bus 564 and various control signals which will be discussed below. The data link controller 530 has as one function the conversion of data to be transmitted from parallel format to serial format and the conversion of received data from serial format to parallel format. Because the data link controller 530 must service a high speed serial data interface in the modem 536, and because the timing of memory cycles of the CPU 560 may be different from the data rate at which serial data is either received or transmitted by the modem 546, the data link controller 530 must have a buffer memory 571 from which it can recall data packets to be transmitted, i.e., a transmit buffer, and in which it can store incoming data packets, i.e., a receive buffer. The CPU 560 must also have access to the transmit buffer and the receive buffer, but the data link controller must have higher priority access to these buffers because of the need for servicing of the high speed modem 546. If the CPU 560 were to have higher priority in accessing the buffer memory 571, the data link controller 530 could lose data to be transmitted or data coming in because of the lack of access to a temporary storage location in which to keep the data. That is, if the data link controller has no place in which to put the parallel bytes that it generates from the incoming serial data stream because the CPU has the memory 571 tied up, then those bytes will be lost.

The transmit and receive buffers are physically located in the buffer memory 571 comprised of an odd RAM 570 and an even RAM in FIG. 18. The reason that the buffer memory is divided into odd and even portions is that the data link controller 530 has an eight bit data bus whereas the CPU 560 may have a 16 bit data bus although it may also have an 8 bit data bus. The data link controller 530 communicates with the even and odd RAM's through the BUF.D0 through BUF.D7 data lines comprising the bus 574. The bus 574 couples the data link controller data registers to the transceivers 576 and 578. The transceivers allow the 8 bit data from the DLC to be placed on either half of a 16 bit memory data bus 563.

The odd and even RAM's 570 and 572 are coupled by the data bus 563 to a write buffer 566 and read latch 580. The function of these two elements will be explained in terms of a typical transaction.

Transmit Transaction

A typical transmit transaction starts with the CPU 560 loading the odd and even RAM's 570 and 572 with the bytes of the data packet to be transmitted. To do this, the CPU 560 places the first byte of the data to be stored in the transmit buffer on the CPU's data bus 562. The CPU 560 then places the address of the location in the transmit buffer of the first data byte to be stored on the address bus 564. The CPU also sets the M/$\overline{\text{IO}}$ signal 584 to a logic 1 level which indicates to the DLC 530 that the CPU is addressing a memory location.

The M/$\overline{\text{IO}}$ signal line 584 is used by the CPU 560 to indicate whether the CPU is addressing a memory location or an input/output peripheral with the same address.

Next, the CPU 560 drives the signal $\overline{\text{WR}}$ on the line 586 active low, indicating that a write operation is requested. A convention will be used herein to describe signals in terms of their "active" and "inactive" states. The logic level for the $\overline{\text{WR}}$ signal in the active state is the logic 0 level as indicated by the overscore. Overscored signals are active low (logic 0 level) while non-overscored signals are active in the logic 1 level.

When the DLC senses the signal $\overline{\text{WR}}$ on the line 586, the DLC activates the WAIT signal on the line 588. The WAIT signal is used by the DLC to cause the CPU 560 to suspend its current memory cycle until the DLC is ready for the CPU to complete its memory read or write cycle. The DLC must have priority access to the transmit and receive buffers in the odd and even RAM's 570 and 572 so that data to be transmitted and data being received can be retrieved and stored by the DLC without having to wait for access to the RAM. The DLC has internal priority logic which arbitrates requests by the DLC and the CPU for access to the odd and even RAM's and allows the requests in a predetermined priority order. Because the DLC priority is higher than the priority of the CPU 560, the WAIT signal 588 is used to hold the CPU while the DLC finishes its current operations. As soon as the DLC has completed its operation and is ready for the CPU 560 to complete its memory cycle, the WAIT signal on the line 588 will be released, allowing the CPU 560 to finish the memory cycle.

Each byte or word to be written by the CPU 560 into the transmit buffer is treated as a separate cycle. Upon the completion of storage of the first byte or word, the DLC will proceed with its other processing tasks until the CPU 560 again requests the storage of another byte or word. The DLC 530 will then process that request as outlined above.

The TxINT signal on the line 590 is a signal used by the DLC to indicate to the CPU 560, via the line 592 and the interrupt control logic 594, that a transmission of a data packet has been completed regardless of whether or not the transmission has been acknowledged. There is an internal transmit status register in the DLC 530. This transmit status register is updated by the DLC to contain a code which indicates what happened on each attempted transmission of a data packet. The three codes are for "transmission complete and acknowledged", "transmission complete and not acknowledged" and "transmission begun and aborted by the modem 546." The transmission could be aborted by the modem 546 where the modem 546 deactivates the $\overline{\text{CTS}}$ signal on the line 185, while a request for transmission is still active.

The interrupt control logic 594 determines the priority of the pending interrupt requests on the lines 590 and 622 from the DLC 530 and signals the CPU via the line 592 for each interrupt request in the stack. The interrupt control logic 594 can be an Intel 8259 programmable interrupt controller, but any standard programmable interrupt control logic will suffice. The details of the construction of the interrupt control logic 594 will be apparent to those skilled in the art. The signal INTA from the CPU on a line 596 causes the interrupt control logic 594 to release a call instruction to the data bus 562 to vector processing to the correct routine.

The DLC 530 has various internal registers which must be read by or written to by the CPU 560. An address decode circuit 598 is used to inform the DLC 530 when a register in the DLC's address space is being addressed by the CPU 560. Any conventional design for this decoder 598 will be satisfactory. The decoder 598 has three output signals to the DLC 530. The signal $\overline{\text{CS}}$ on the line 600 indicates to the DLC 530 that the CPU 560 is writing to one of the input output addresses assigned to the DLC address space. The signal $\overline{\text{BUF.SEL}}$ on the line 602 indicates to the DLC 530 that the address on the address bus 564 is within the address space assigned to the DLC's buffer memory comprised of the odd and even RAM units 570 and 572. The signal $\text{Tx}/\overline{\text{Rx}}.\text{IN}$ on the line 604 tells the DLC 530 that the CPU 560 is transferring data into either the transmit buffer or the receive buffer in the odd and even RAM memory units 570 and 572.

The individual address bits A1 through A3 are used in addressing the individual data registers in the DLC 530.

After the CPU 560 has loaded the transmit buffer with the data packet to be transmitted, the CPU 560 will address a transmit byte counter register in the DLC and load it with the number of bytes in the data packet stored in the transmit buffer. This byte count tells the DLC how many memory cycles to perform in order to retrieve and transmit the entire data packet via the data bus 574 at the rate of 8 bits per memory access cycle. The CPU will also load a register in the DLC with the beginning address for the first byte in the data packet to be transmitted.

Next, the CPU 560 addresses an internal control register in the DLC 530 and loads it with a particular code which signals the DLC to begin transmitting. In response to this code, the DLC 530 activates the $\overline{\text{RTS}}$ signal on the line 154. The modem 546 then goes through the line acquisition protocol previously outlined, and, if the line is clear, issues the $\overline{\text{CTS}}$ signal on the line 185 to the DLC 530. Upon receipt of the $\overline{\text{CTS}}$ signal, the DLC 530 begins to access the data packet 8 bits at a time using the address for the first byte, which is contained in the transmit address register of the DLC supplied by the CPU 560 on the address bus 564. The data is accessed via the data bus 574, converted to serial format and sent to the modem 546 as the signal TxDATA on the line 608. As will be discussed in more detail later, the DLC also delimits the data packet with unique flag characters and generates error check data in the form of two bytes of CRC appended to the data. The DLC 530 also sends a signal TxCLK on the line 610 to the modem 546. This TxCLK signal is used by the modem 546 in transmitting the data is non-return-to-zero code.

The signal $\overline{\text{EN.WR.BUF}}$ on the line 568 is used by the DLC 530 to enable the write buffer 566 during loading of the transmit buffer in the RAM 571. This unblocks the CPU data bus 562 such that the data thereon can be driven into the odd and even RAMs 570 and 572. The write buffer 566 is used as a gate under the control of the signal on the line 568. The write buffer 566, when disabled, prevents interference between the memory data bus 563 and the CPU data bus 562. That is, when the CPU wishes to write data into the odd and even RAM's 570 and 572, the DLC 530 will enable the write buffer 566 such that the data on the CPU data bus 562 drives the RAM data inputs. When the write buffer 566 is disabled, the data on the data bus 562 will not interfere with the DLC access to the buffer 571 via the DLC data bus 574.

In transmitting the data retrieved, the DLC 530 will locate the address of the first byte in the data packet to be transmitted from an internal register in the DLC which is loaded by the CPU 560. The DLC will then place the address of this first byte of the data packet on its address bus 582 and activate the $\overline{\text{BUF.STB}}$ signal on the line 614. The signal $\overline{\text{BUF.WR}}$ must also be inactive to enable the DLC to read data from the buffer memory. An active $\overline{\text{BUF.STB}}$ signal will cause the odd or even RAM 572, as selected by the $\overline{\text{ODD}}$ signal on the line 616, to place the data in the specified address on the DLC data bus 574. The signal $\text{Tx}/\overline{\text{Rx}}.\text{OUT}$ on the line 618 is used by the DLC to control whether access is made to the transmit buffer or the receive buffer in the RAM 571.

The signal $\overline{\text{ACK.WINDOW}}$ on the line 620 is activated by the modem 546 soon after the carrier on the data link disappears. The $\overline{\text{CAR.DET}}$ signal is caused by the transmission by the DLC 530 of the data packet for which acknowledgment is due and reception of the transmitted signal by the modem's own receiver or by reception of the transmitted signal from another transmitter. The signal $\overline{\text{ACK.WINDOW}}$ on the line 620 will be active low whenever the carrier on the data line disappears indicating that the end of a transmission by any unit connected to the line has occurred. When the DLC 530 has finished transmitting, the signal $\overline{\text{ACK.WINDOW}}$ becomes active low and an internal signal ACK.TIME (not shown) will be generated in the DLC. This ACK.TIME signal is used to control processing in the DLC 530 during the $\overline{\text{ACK.WINDOW}}$ time which lasts for approximately two transmission line delay periods. If the DLC 530 begins receiving data during the time that the $\overline{\text{ACK.WINDOW}}$ signal on the line 620 is low, the DLC will assume that the incoming data is an acknowledgment packet to the data packet that was just transmitted and will place the incoming data in the transmit buffer at a known location relative to the data packet to which it corresponds. The purpose for this mechanism is to place the acknowledgment packet in the transmit buffer at a location where it can be easily found by the CPU 560 when the CPU software makes inquiry regarding whether or not the data packet transmitted was received perfectly or must be retransmitted.

At the end of the $\overline{\text{ACK.WINDOW}}$ signal on the line 620, if an acknowledgment has occurred, an internal status register will be set with a code which indicates that the transmission has been completed and acknowledged satisfactorily. If there has been no acknowledgment at the end of $\overline{\text{ACK.WINDOW}}$, the status code will be set for transmission failure. The various transmission status codes are summarized in the $\overline{\text{TxINT}}$ signal on the line 590 which, by way of the interrupt control logic 594, vectors the CPU 560 to a transmit interrupt routine to read the status register in the DLC 530 and determine what action must be taken based upon the code found.

Receive Transaction

A typical receive cycle by the DLC 530 would occur as follows. The $\overline{\text{CAR.DET}}$ signal on the line 130 from the modem 546 to the DLC will become active low signaling that a carrier is being detected by the modem. When incoming data is detected by the modem 546, the receive clock RxCLK, which is free-running in the modem, will be synchronized with a clock signal derived from the incoming NRZ data as previously described. The resulting NRZ data RxDATA and RxCLK will be transmitted to the DLC on the lines 160 and 162.

The DLC 530 will take the serial format data on the line 160 and convert it to parallel format. No signal is sent to the CPU 560 by the DLC when the data first starts coming in. Indeed, the CPU 560 will not be informed that a data packet has arrived until a complete receive cycle has been completed. At that time, the signal RxINT on the line 622 will be sent to the interrupt control logic 594. There is a receive status register (not shown) in the DLC 530 which is set with a code at the end of the receive cycle which code indicates what happened during the cycle. The code RxDONE indicates that the packet has been received perfectly. If there was a CRC error in the received data packet, the receive status register will be loaded with a CRC error code. If the FIFO receive buffer in the odd and even RAMs 570 and 572 was full prior to the receipt of the incoming data packet, then the receive status register will be loaded with a code which indicates that the FIFO was full. The same FIFO full code would be written where the FIFO buffer overflowed at some point in the midst of receiving the incoming data packet immediately upon the occurrence of this event. The FIFO overflow status code can be masked such that no FIFO overflow interrupt will occur if so desired.

The $\overline{\text{RxINT}}$ signal on the line 622 and the interrupt control logic 594 will vector the CPU 560 to a receive routine which will read the status code in the receive status register. If the status is CRC error, i.e., that an error in the data packet has been detected, an internal counter in the CPU 560 may be incremented for statistical reasons, but no acknowledgment packet will be transmitted by the DLC 530. This lack of acknowledgment for a CRC error is because the CRC data is generated over the destination address and the source address fields as well as the data fields. Therefore, if a CRC error has occurred, there is no way to tell whether it was the destination address field that was incorrect. Therefore, the DLC 530 may have received a packet which was not intended for it, and an acknowledgment packet would be inappropriate. The CPU 560 does not take any affirmative role in the prevention of the transmission of an acknowledgment packet when the DLC has detected a CRC error in the incoming data packet. The prevention of transmission of an acknowledgment packet is caused by the circuitry of the DLC 530.

After 8 bits have been received, as counted internally in the DLC 530, the byte will be latched into an internal DLC latch (not shown). An internal signal will then be generated which causes a request for a DLC memory cycle. This internal signal is called RxREQ and is triggered by an END.BYTE signal which indicates that eight data bits have been received and converted to parallel format. An internal memory cycle controller will take the signal RxREQ and cause a write cycle to be performed by the DLC to the odd or even RAM 570 or 572 as soon as the current cycle in progress is completed. The system requirements for the direct memory access controller which controls the memory cycles of the DLC 530 are such that the DMA controller must be fast enough to insure that incoming data is completely stored away in memory before the next byte is ready to be stored. For this reason, it is necessary that the odd and even RAM buffers 570 and 572 be static RAMs and be fast enough to keep up with the DMA controller. The DMA controller cannot afford to wait for the memory refresh cycles required by dynamic RAMs. In the preferred embodiment, the DMA controller is fast enough to complete two-and-one-half memory cycles before the next byte comes in at the normal data rate of the system.

When the DLC 530 senses the closing flag for the incoming data packet, it will check the CRC code generated on the incoming data packet. If the CRC was correct, the DLC 530 stores an RxDONE code in its internal receive status control register. If the CRC code was incorrect, the CRC error code will be placed in the internal receive status control register.

The RxINT signal vectors the CPU 560 to the receive interrupt routine which will keep track of the number of CRC errors and FIFO overflows for statistical purposes. However, the receive software routine will not read the data from the FIFO receive buffer unless the status code found in the internal receive status control register is RxDONE indicating a perfect reception. Once an RxDONE status code is read, it is up to the software in the CPU 560 to determine what to do next. It may decide to immediately read the incoming data packet to find out what was received, or it may set some bits in memory to say that a packet has been received and continue with other processing tasks. At some later time another routine could come back and read the data out of the FIFO receive buffer.

When the data is to be retrieved from the FIFO receive buffer, the CPU will perform read cycles to retrieve the data from the odd and even RAMs 570 and 572 in similar fashion as these buffers were loaded prior to transmission. The DLC keeps a record of the address for the start of the packet which is the address for the first byte in a particular packet in the FIFO receive buffer.

In the case where several data packets are received by the DLC 530 prior to the CPU 560 retrieving the first of these data packets, there must be some record kept by the CPU 560 as to where to find the start of each data packet. The CPU 560 can determine the start and the end of each packet by reading one of the headers for each packet added by the software of the sending unit. One of these headers will indicate how many bytes are in that data packet. The CPU can use a counter and increment it by the number of bytes indicated by the header to the data packet to determine where the start of the next data packet in the FIFO buffer is. Some data packets are of a fixed length such that by reading a control field in the data packet following the source address which indicates the type of packet, it is possible to determine the number of bytes in the packet.

When a complete data packet has been received and the RxDONE status code has been stored in the receive status control register, the DLC 530 will automatically commence preparing and sending the acknowledgment packet without any intervention by the CPU 560 and without any prompting from the CPU 560.

When the RxDONE status code is set, the DLC 530 activates the RTA signal on the line 182. This signals the modem 546 that the DLC wishes to transmit an acknowledgment packet. When the modem 546 determines that RTA has been activated, the bus is acquired, without the need for arbitration by immediately sending an AGC burst. The modem 546 then activates the CTS signal on the line 185 as discussed above with reference to FIG. 10a. The DLC then prepares and transmits the acknowledgment packet to the modem on the TxCLK and TxDATA lines 610 and 608. When the acknowledgment packet has been transmitted, the modem 546 returns to the listen state 166a in FIG. 10a. Thus, the DLC autonomously prepares and sends the acknowledgment packet when it is satisfied that the incoming data packet has been received perfectly. The lack of the need for intervention by the CPU 560 reduces the system overhead requirements and processing time used in handshaking protocol.

The DLC 530 prepares the acknowledgment packet without assistance or intervention by the CPU 560 or any higher level software by using the destination and source address headers of the incoming data packet and an internal receive status byte. The receive status byte indicates whether the data packet was received perfectly or the FIFO buffer was full or the receiver was off-line. The acknowledgment packet also has a CRC code of its own and is fully delimited by opening and closing flags which are generated by the DLC 530.

No acknowledgment packet is sent, however, if there was a CRC error. That is, there are only two basic conditions for sending an acknowledgment packet and those two conditions are indicated in an ack-type code which is appended by the DLC 530 to its own address in the acknowledgment packet as the sending unit. The first ack-type code indicates that the packet was received perfectly and the other ack-type code indicates that the DLC 530 could not accomodate the incoming data packet and it must be retransmitted. An additional code may be included to indicate that the DLC is temporarily unavailable. The station unavailable and FIFO full ack-type codes could control the amount of delay before a retry by the sending unit that sent the original packet. The details of how the acknowledgment packet is generated by the DLC will be discussed in more detail in connection with the discussion of FIG. 19.

When the CPU 560 wishes to read an incoming data packet that has been stored in the FIFO receive buffer, it will address, the odd and even RAMs 570 and 572 using the address bus 564 and the BUF.A0–A15 lines 582. The CPU will then activate the control signal RD on the line 630 which will cause the DLC 530 to activate the WAIT signal on the line 588. After the DLC has finished all higher priority memory requests, it will supply the address for the first desired data byte to the odd and even RAMs 570 and 572 via the address bus 582. It will then select the receive buffer in the RAM 571 using the Tx/Rx.OUT signal on the line 618. The BUF.STB signal on the line 614 will then be activated by the DLC which will place the data in the desired location on the memory data bus 563. The DLC will then activate LD.RD.Latch signal on the line 632 to clock the data on the bus 563 into the read latch 580. Thereafter, it is available for reading by the CPU 560 such that the DLC 530 can deactivate the WAIT signal on the line 588, allowing the CPU 560 to complete its read cycle. The data at the desired address will then be present on the data bus 562 and can be read by the CPU 560.

After a complete data packet has been read, the space in the FIFO receive buffer formerly occupied by that data packet need not be preserved. Therefore, the CPU addresses an end-of-FIFO address pointer internal to the DLC 530 using the address bus 564 and the address decoder 598. The CPU will then reload this end-of-FIFO pointer register in the DLC 530 with a new pointer location via the data bus 562. This action tells the DLC 530 that the space in the FIFO receive buffer is now available for overwriting with new incoming data.

DLC System Level

Figure 19A:
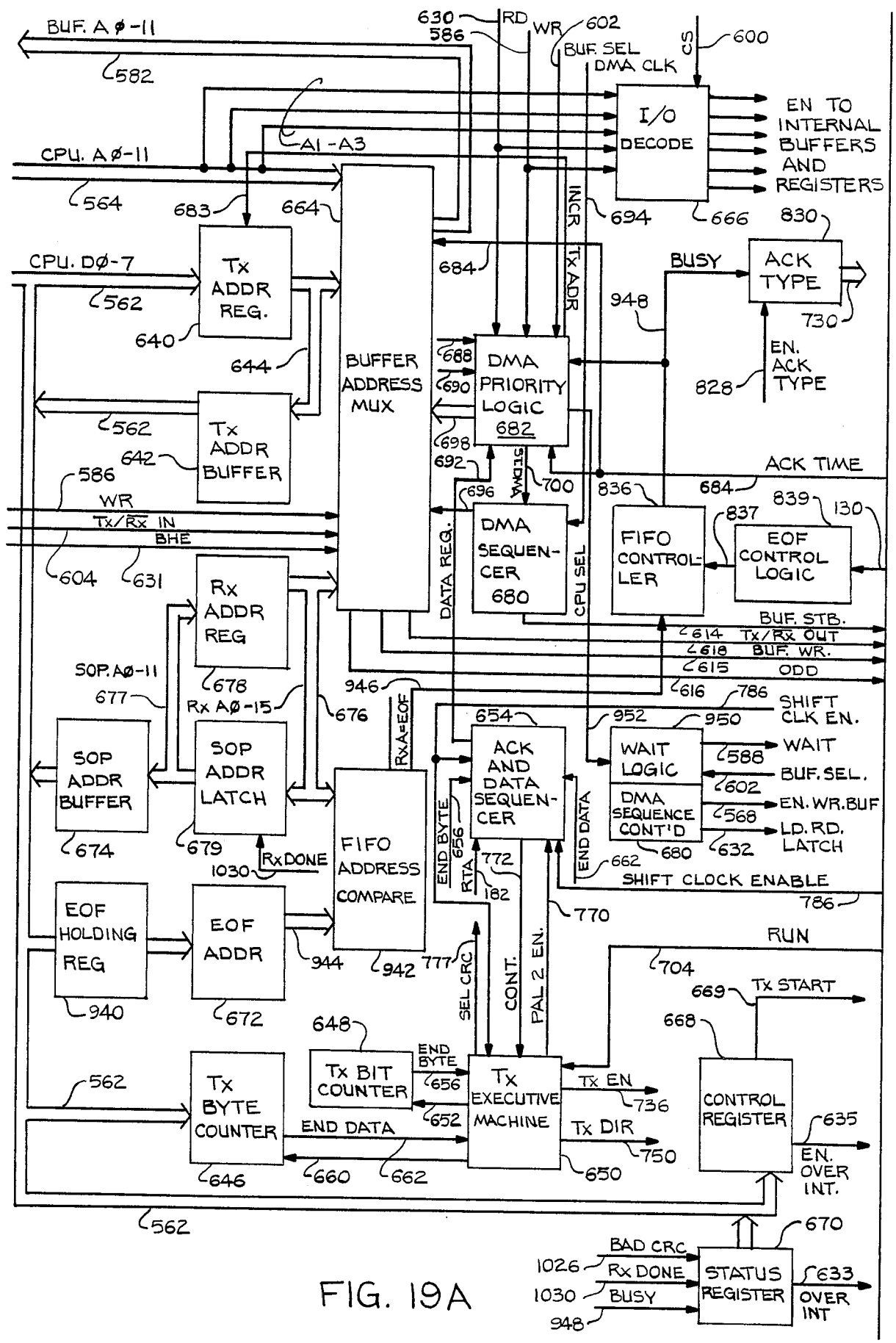
FIGS. 19A and 19B are a block diagram of the data link controller.
Figure 19B:
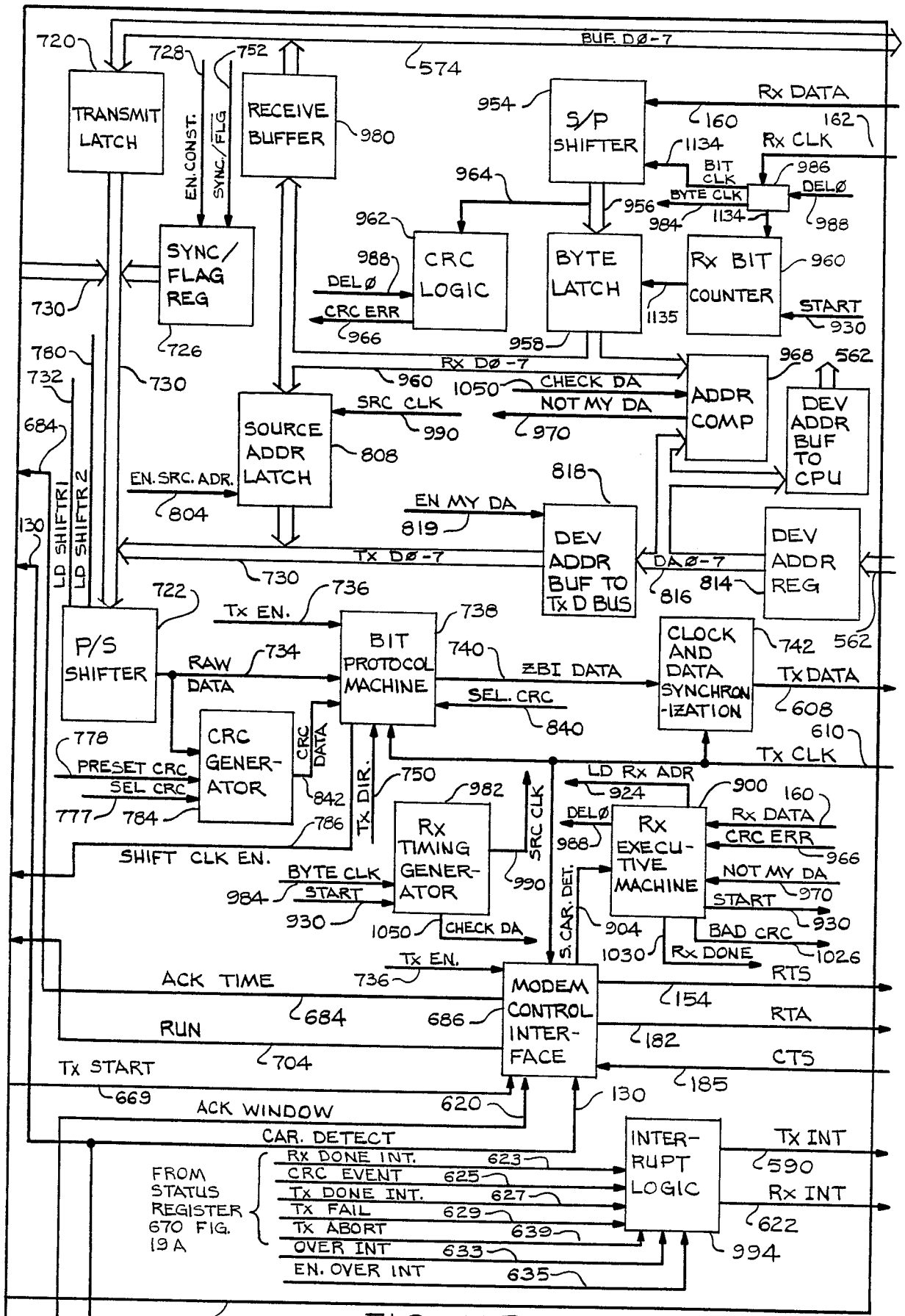

Referring now to FIGS. 19A and 19B, there is shown a block diagram of the data link controller. The reader is urged to assemble the parts of FIG. 19 into an integrated whole for ease in reading. A transmit address register 640 coupled to the CPU data bus 562 serves to receive and hold the address of the byte which is being currently transmitted. That is, when the CPU 560 wishes to transmit a data packet, the address of the first byte of the data packet in the transmit buffer within the odd and even RAMs 570 and 572 is loaded via the CPU data bus 562 into the transmit address register 640. A transmit address buffer 642 is coupled to the transmit address register 640 by a bus 644 and is also coupled to the CPU data bus 562. The purpose of the transmit address buffer 642 is to buffer the current address in the transmit address register 640 such that the CPU 560 can read the transmit address buffer 642 at will to determine the address of the current byte which is being transmitted from the transmit buffer for debug purposes. This does not happen during normal operation.

The transmit address register 640 is a counter which serves as the transmit pointer and is incremented by the INC.TxADDR signal on the line 683 from the DMA priority logic each time a byte is sent by the DLC.

A transmit byte counter 646 is coupled to the CPU data bus 562. The CPU loads the transmit byte counter 646, before commencing transmission of a data packet, with the number of bytes to be transmitted via the data bus 562. A transmit bit counter 648 counts the number of bits transmitted by a transmit executive machine 650. The transmit executive machine 650 and an acknowledgment and data sequencer 654 serve to control the transmission of data packets and acknowledgment packets in a manner which will be explained in more detail later in connection with an explanation of the state diagrams of these sequential machines.

The transmit executive machine 650 and the acknowledgment and data sequencers 654 signal the transmit bit counter 648 via the line 652 each time a byte is loaded to be transmitted. When the transmit bit counter 648 has counted out eight bits, it signals the transmit executive machine 650 and the acknowledgment and data sequencer 654 that the end of a byte has been reached. The acknowledgment and data sequencer 654 and transmit executive machine 650 then signal the transmit byte counter 646 via the line 660 to decrement the byte count by one byte. Therefore, the contents of the transmit byte counter 646 indicate the number of remaining bytes in the data packet yet to be transmitted.

When the count in the transmit byte counter 646 reaches zero, an $\overline{\text{END.DATA}}$ signal on a line 662 is generated indicating to the transmit executive machine 650 and the acknowledgment and data sequencer 654 that the data packet has been completely transmitted.

The CPU 560 loads the transmit address register 640, enables the transmit address buffer 642 and the transmit byte counter 646, utilizing the CPU address bus 564, which is connected to DLC inputs A1 through A3. These address bits are coupled to an I/O decoder 666. The I/O decoder 666 decodes the three address bits into enable signals for the selected register or buffer to be enabled. The $\overline{\text{RD}}$ and $\overline{\text{WR}}$ control signals from the CPU 560 on the line 630 and 586, respectively, are also coupled to the I/O decoder 666 so as to multiplex the three address bits into separate eight-bit address spaces. That is, bits A1 through A3 are decoded in conjunction with the $\overline{\text{RD}}$ signal to enable the selected buffer from which the CPU wishes to read data. Likewise, the three address bits A1 through A3 from the CPU are decoded along with the $\overline{\text{WR}}$ signal, on the line 586 to select the proper register which the CPU wishes to load with data from the CPU data bus 562. For simplicity's sake, the various enable signals are not drawn in on FIG. 19. However, there are enable signals from the I/O decoder 666 which are coupled to a control register 668, a status register 670, the transmit byte counter 646, end-of-FIFO address register 672, the transmit address register 640, the transmit address buffer 642, and a start-of-packet address buffer 674, all on FIG. 19.

A buffer address multiplexer 664 serves to select the address which will be supplied on the DLC address bus 582 to the even and odd RAMs 572 and 570 in FIG. 18. The buffer address multiplexer 664 selects one of three addresses at its three inputs and places those address bits on the output address bus 582. The three input address busses are the CPU's address bus 564, the transmit address bus 644 from the transmit address register 640 and a receive address bus 676 from a receive address register 678 which will be explained in more detail below.

The selection of the address to be output by the buffer address multiplexer 664 is controlled by the DMA priority logic 682. The DMA sequencer 680 controls the memory access cycle to the odd and even RAMs 570 and 572, in the priority order established by a DMA priority logic circuit 682. The DMA priority logic senses the $\overline{\text{RD}}$, $\overline{\text{WR}}$ and $\overline{\text{BUF.SEL}}$ control signals from the CPU on the lines 630, 586 and 602 and the $\overline{\text{ACK-.TIME}}$ signal on the line 684 from a modem control interface circuit 686. The DMA priority logic 682 also senses internal transmit request TxREQ and receive request RxREQ signals symbolized by the lines 690 and 688 generated by the DLC transmitter receiver and receiver.

The function of the DMA priority logic is to arbitrate between four different logical memory cycle requesting entities. Those entities are the CPU write cycle; the CPU read cycle; the DLC transmitter; and the DLC receiver. The DMA priority logic is responsible for ordering these requests in a predetermined scheme of priorities. Since the DLC must have relatively unhindered access to the odd and even RAMs 570 and 572, especially for incoming data, the receive request symbolized by the signal on the line 688 has the highest priority. The next highest priority is the transmit request symbolized by the line 690. The next highest priority is the CPU read cycle as sensed by the DMA priority logic 682 by the $\overline{\text{RD}}$ signal on the line 630. Requests from the DLC transmitter are sensed by monitoring the data request signals from the transmit executive 650 and the acknowledge and data sequencer 654 on the line 692. Requests generated by incoming data to the DLC receiver are sensed by monitoring the BYTECLK signal on the line 984 in FIG. 19B generated by a gating circuit 986 in the DLC receiver. The $\overline{\text{ACK-.TIME}}$ signal on the line 684 to the DMA priority logic also prevents the busy signal on a line 948 from shutting off the receiver during receipt of an acknowledgment packet even if the FIFO receive buffer is full.

Figure 31:
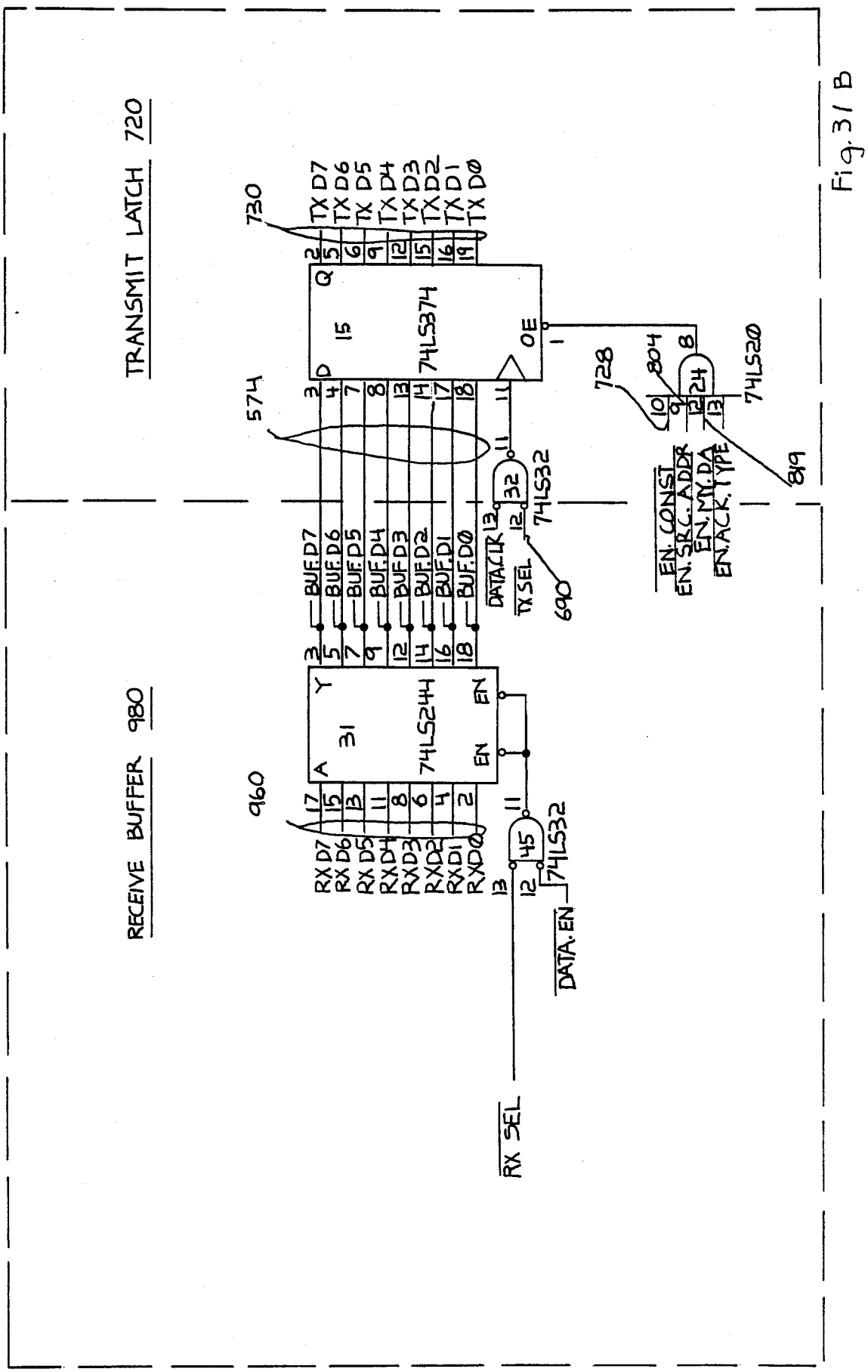

The DMA priority logic 682 signals the buffer address multiplexer 664 as to which address to output on the DLC address bus 582. Part of the function of a buffer control logic circuit in the buffer address multiplexer (shown in more detail in FIG. 31A) is to generate the memory cycle control signals $\overline{\text{ODD}}$ on the line 616, $\overline{\text{BUF.WR}}$ and Tx/$\overline{\text{Rx}}$.OUT on the line 618. These signals are generated from the CPU control signals $\overline{\text{WR}}$ on the line 586, Tx/$\overline{\text{Rx}}$.IN on the line 604 and $\overline{\text{BHE}}$ on the line 631 which are coupled to the control logic in the buffer address multiplexer 664. The $\overline{\text{BUF.STB}}$ signal on the line 614 is generated by the DMA sequencer 680 shown in more detail on FIG. 26B. The DMA sequencer 680 is driven by the DMA CLK on the line 694 which is generated by a clock circuit external to the DLC. The DMA clock rate should be sufficient to allow at least two complete DMA cycles to occur during the time required to receive one byte from the incoming data stream. The minimum rate in the preferred embodiment is two times the data rate.

The DMA priority logic 682 signals the buffer address multiplexer 664 regarding which input address bus should be coupled to the output DLC address bus 582. For example, when the CPU wishes to write a byte into the transmit buffer as part of a data packet, the DMA priority logic 682 will cause the buffer address multiplexer 664 to select the CPU address on the bus 564 and couple it to the address bus 582. The DMA priority logic then signals the DMA sequencer 680 when the DMA cycle is supposed to start by activating the $\overline{\text{START.DMA}}$ signal on a line 700. The DMA sequencer 680 and the buffer address multiplexer control circuitry then carry out the DMA sequence by selecting either the odd or the even RAM 570 or 572 in FIG. 18 using the $\overline{\text{ODD}}$ signal on the line 616. The DMA sequencer then enables the write buffer 566 via the EN.-$\overline{\text{BUF.WR}}$ signal 675, and strobes the address on the bus 582 into either the odd or the even RAM. The buffer control logic selects the transmit or receive buffer using the Tx/$\overline{\text{Rx}}$.OUT signal on the line 618.

After the transmit buffer has been filled with data packets, the CPU 560 can select one data packet for transmission by loading the address of the first byte into the transmit address register 640 and by loading the number of bytes for that data packet into the transmit byte counter 646. The CPU 560 then loads a code into a control register 668 which indicates that transmission is to start as signalled by the $\overline{\text{TxSTART}}$ signal on the line 669. The $\overline{\text{TxSTART}}$ signal causes the $\overline{\text{RTS}}$ signal on the line 154 to be generated which causes the modem to generate the $\overline{\text{CTS}}$ signal on the line 185. The modem control interface 686 then generates the RUN signal on the line 704 when $\overline{\text{CTS}}$ becomes active. This signal causes the transmit executive machine 650 to commence the transmission sequence.

The transmit executive machine 650 and the acknowledgment and data sequencer 654 cause a transmit data request ($\overline{\text{DATA.REQ1}}$ or $\overline{\text{DATA.REQ2}}$) to be issued on the line 692 to the DMA priority logic 682. As soon as the transmit data request can be honored, the DMA priority logic 682 will cause the buffer address multiplexer 664 to select the address on the bus 644 for application to the transmit buffer by the bus 582. The proper control signals are then generated on the lines 616, 615, 614, and 618 as previously discussed. The control signals on the line 616, 615, 614 and 618 cause the first byte of the packet to be transmitted to be brought into a transmit latch 720. The data is held there for conversion to serial format by a parallel-to-serial shifter 722 in FIG. 19B.

Transmit Executive and Ack and Data Sequencer

Figure 20:
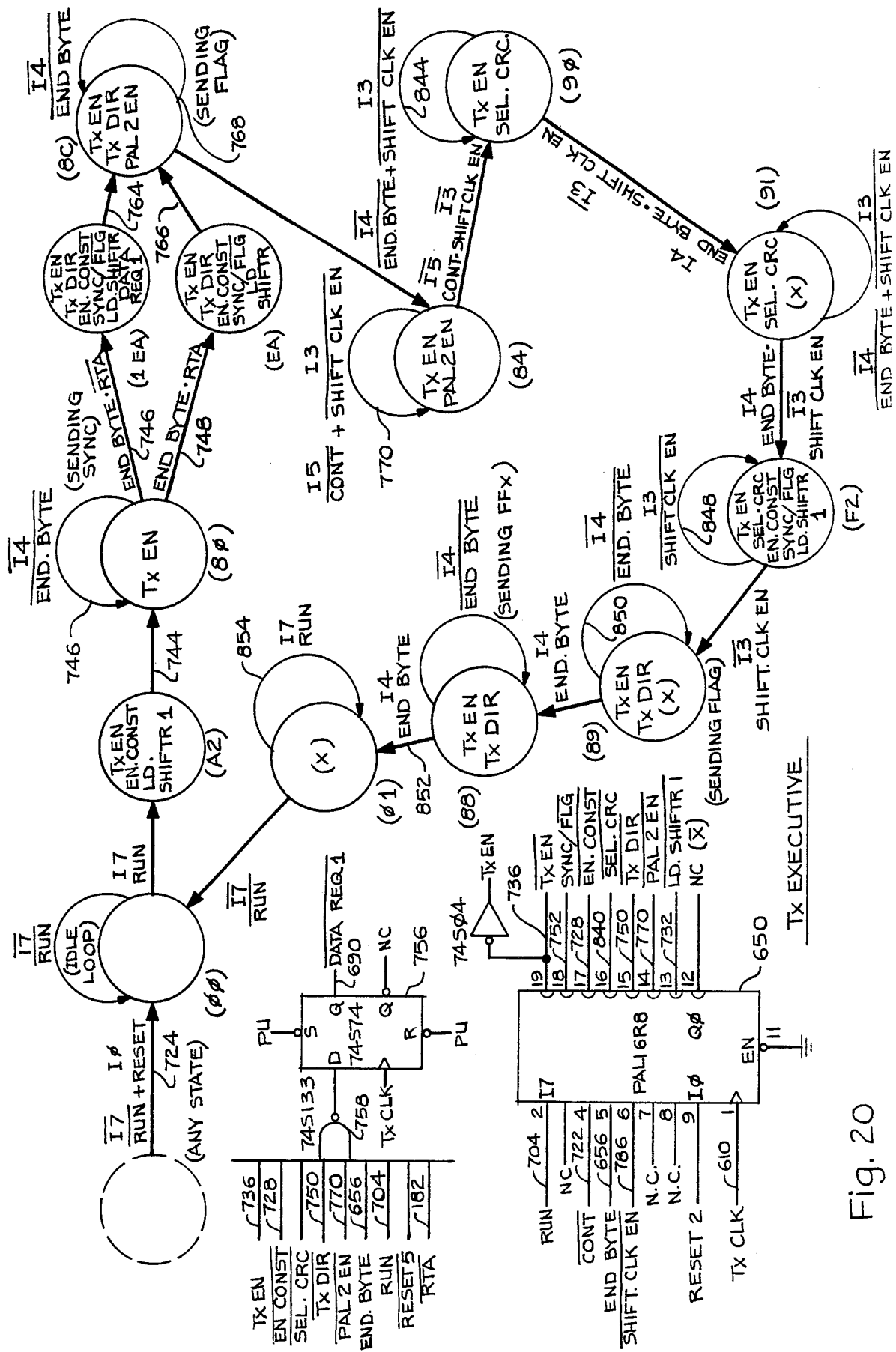
FIG. 20 is a state diagram of the states of the transmit executive machine in FIG. 19A.
Figure 21:
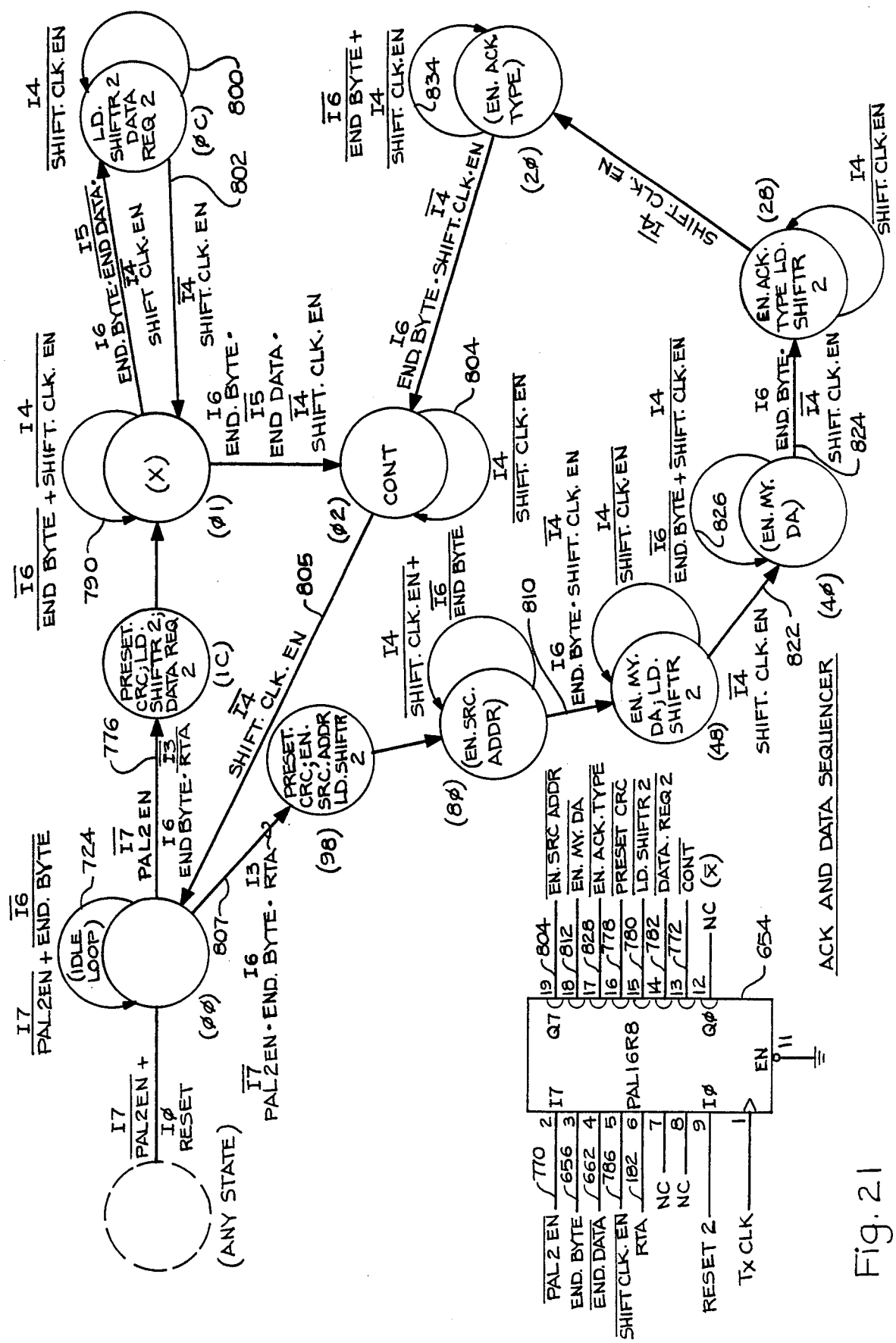
FIG. 21 is a state diagram of the states of the acknowledgment and data sequencer in FIG. 19A.

Referring temporarily to FIGS. 20 and 21, the operation of the DLC transmit executive machine 650 and the acknowledgment and data sequencer 654 in a typical transmit cycle will be explained. FIG. 20 is a state diagram of the states of the transmit executive machine 650 in FIG. 19A. FIG. 21 is a state diagram of the states of the acknowledgment and data sequencer 654 in FIG. 19A. Both the transmit executive machine 650 and the acknowledgment and data sequencer 654 are programmable array logic chips in the preferred embodiment. Both are chip model numbers PAL16R8 as manufactured by AMD, National Semiconductor or Monolithic Memories. The input and output signals for the transmit executive machine 650 are as designated in the lower left hand corner of FIG. 20. The input and output signals for the acknowledgment and data sequencer 654 are as diagrammed in the lower lefthand corner of FIG. 21. The transmit executive machine 650 and the acknowledgment and data sequencer 654 serve to control the sequence of events in the transmission of a data packet and the sequence of events in the transmission of an acknowledgment packet.

Referring to FIG. 20 first, the initial state for the transmit executive machine 650 is state 00 which is an idle loop. The transmit executive machine will transfer to the idle loop state 00 from any state when the signal RUN on the line 704 is inactive or the signal $\overline{\text{RESET}}$ (not shown in FIG. 19A) is active. That is, from any state in the machine, when input I0 is high or input I7 is low to the PAL16R8 transmit executive machine 650 transfer to state 00 will occur. This transition is symbolized by the line 724 in FIG. 20.

The transmit executive will stay in the state 00 until the RUN signal at the input I7 becomes active, at which time it transfers to the state A2. The RUN signal on the line 704 is generated by the modem control interface 686 in FIG. 19B. The RUN signal is generated by combining the $\overline{\text{RTS}}$ signal on the line 154, the $\overline{\text{RTA}}$ signal on the line 182 and the $\overline{\text{CTS}}$ signal on the line 185 to derive the condition when it is permissible to begin transmission. In the state A2, the transmit executive generates the three output signals listed in the A2 state circle in FIG. 20. Those outputs are $\overline{\text{TxEN}}$, $\overline{\text{EN.CONST}}$ and $\overline{\text{LD.SHIFTR1}}$. The state machine diagrams of FIGS. 20, 21, 22 and 24 are drawn such that when a signal name is overscored then the inactive state is required while no overscore indicates the active state is required.

Transmit Cycle Timing

Figure 23:
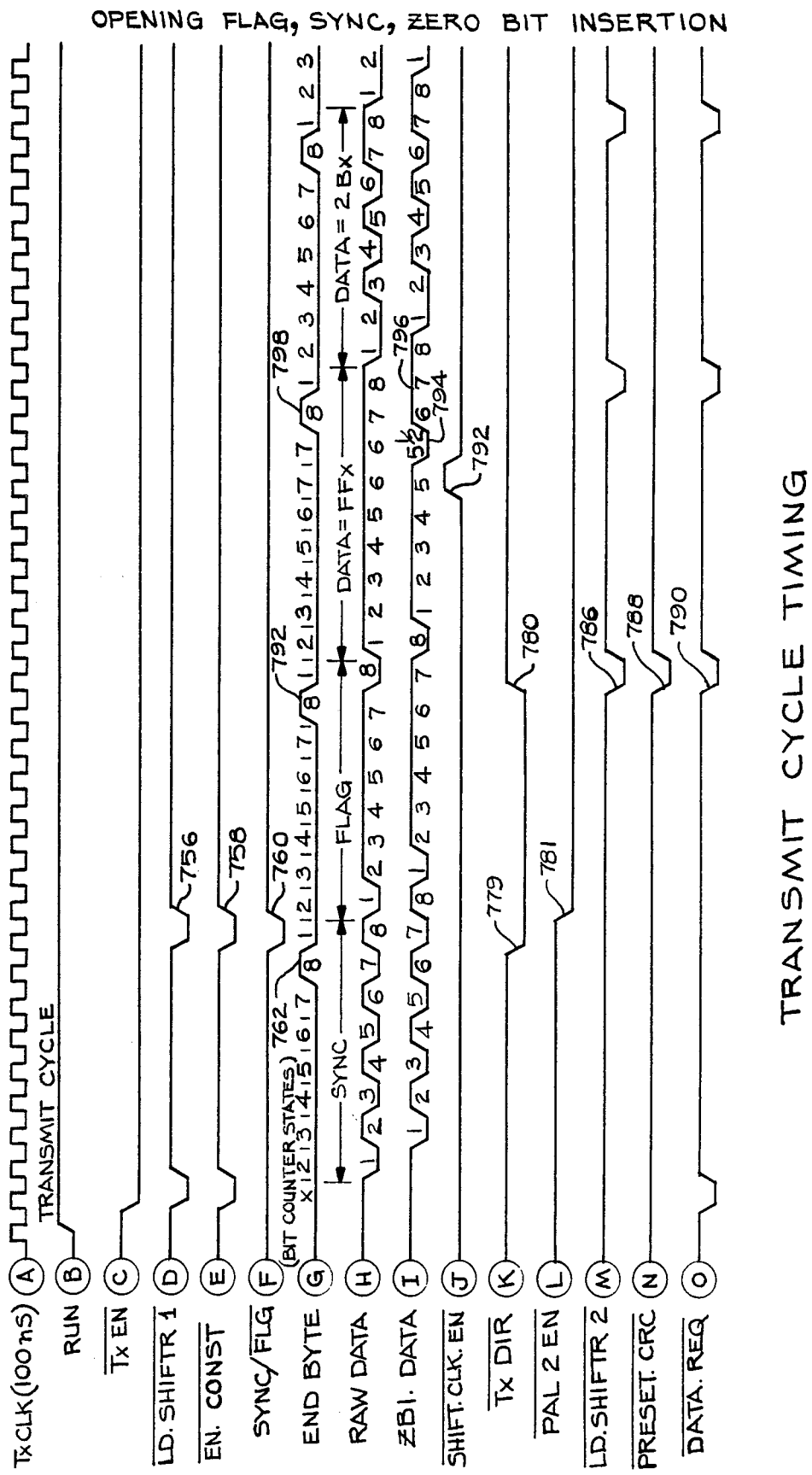
FIG. 23 is a timing diagram for the transmit cycle.

To understand the function of these signals, refer to FIG. 23 which shows a timing diagram of the signals involved in the transmit cycle. The signals depicted in FIG. 23 comprise the inputs and outputs to the transmit executive machine 650 and the acknowledgment and data sequencer 654. The transition from the state 00 to the state A2 in FIG. 20 and the timing of the signal generation caused by this transition is shown on lines B through E of FIG. 23. FIG. 23 shows that signals $\overline{\text{TxEN}}$, $\overline{\text{LD.SHIFTR1}}$ and $\overline{\text{EN.CONST}}$ all become active low in the state A2 shortly after the RUN signal becomes active high. FIG. 20 shows these signals becoming active in the state A2 as indicated by the lack of overscoring. The states shown in FIG. 20 are the internal states of the signals inside the transmit executive machine and there is one inversion before the signals reach the output. For example, when the internal state TxEN is shown as active (TxEN) on FIG. 20 in state A2, it will actually be active low at the output of the transmit executive machine 650. That is, the output notations at the PALs indicate whether the signal is logic 1 or logic 0 when it is active. Likewise, the input notation in the state diagrams indicate whether the condition to change states is active or inactive and not logic 1 or logic 0. The notations at the inputs to the PALs indicate whether a signal is logic 1 or logic 0 when it is active as previously explained.

The $\overline{\text{TxEN}}$ signal is coupled to many of the functional elements throughout the circuitry of the DLC to indicate that the DLC is in the transmit cycle.

The signal $\overline{\text{EN.CONST}}$, activated in the state A2, is coupled to a SYNC/FLG register 726 in FIG. 19B by the line 728. This signal enables the register 726 causing it to place the sync character on a transmit bus 730. The sync constant is an alternating pattern of ones and zeros that is transmitted by any transmitting DLC on the system so that the receiving modem can phase-lock its RxCLK to the proper edge of the data such that the receiver shift register will always sample the data bit in the middle of the bit time to give maximum noise immunity.

The signal $\overline{\text{LD.SHIFTER1}}$ on the line 732 is coupled to the parallel to serial shifter 722 in FIG. 19B causing it to load the sync characters for parallel to serial conversion.

The parallel to serial shifter 722 shifts the flag character out on the line 734 to a bit protocol machine 738 in FIG. 19B. The bit protocol machine 738 is also a programmable array logic with the state diagram given in FIG. 22. The function of the bit protocol machine is to perform zero bit insertion such that a zero bit is inserted after every five consecutive ones such that the arbitrary patterns of the data being transmitted in a data packet can never have a string of ones longer than five. A special case disables the bit protocol machine when opening and closing flags are being transmitted such that a unique flag character having six consecutive ones can be sent. This allows a data packet to be unambiguously delimited by a special flag character comprised of a zero followed by a string of six ones followed by a zero. Whenever this character is encountered, the DLC knows that the incoming data begins immediately after the last zero.

The signal $\overline{\text{TxEN}}$ generated by the transmit executive machine 650 in the state A2 is also coupled to the bit protocol machine to signal it that valid data is coming in to the bit protocol machine and to enable it to function. The bit protocol machine 736 then begins its zero bit insertion procedures as will be discussed in connection with FIG. 22. Thus, as the parallel to serial shifter 722 shifts out the sync characters on the line 734, the bit protocol machine 736 inserts a zero after every consecutive string of five ones. The sync characters leave the bit protocol machine 736 on the line 740 as the ZBI.-DATA signal coupled to the clock and data synchronization circuit 742. The sync characters on the line 740 are synchronized with the TxCLK signal on the line 610 by the clock and data synchronization circuit 742 and are then shifted out as the TxDATA signal on the line 608. These sync characters are used by the receiving modem to get its clock into synchronization with the TxCLK so that the data following in the data packet can be effectively read.

The $\overline{\text{TxEN}}$ signal on the line 736 from the transmit executive machine 650 is also coupled to the modem control interace 686 in FIG. 19B. When the $\overline{\text{TxEN}}$ signal becomes inactive, the modem control interface 686 knows that the end of the data packet or acknowledgment packet has just been transmitted.

Returning to FIG. 20, the transmit executive machine 650 stays in the state A2 only for one transmit clock cycle and then moves to the state 80. Thus, the signals $\overline{\text{LD.SHIFTR1}}$ and $\overline{\text{EN.CONST}}$ on the lines D and E in FIG. 23 are low-going pulses of one clock cycle duration. The transmit executive machine 650 stays in the state 80 while the sync constant is being sent. There are no input conditions for the transfer from the state A2 to the state 80 as symbolized by the line 744 in FIG. 20.

In interpreting the state diagrams of FIGS. 20, 21, 22 and 24, the signal names written on the paths between the circles representing the states represent the input conditions which are required before the transfer represented by that particular path is made. The presence or absence of overscore indicates whether active or inactive is the required condition and not whether the signal must be logic 1 of logic 0.

The transmit executive machine 650 stays in the state 80 for one byte or eight bits. This is symbolized by the line 746 representing the continuing inactive condition of the signal END.BYTE from the bit counter 648 in FIG. 19A. The signal END.BYTE is generated by the transmit bit counter 648 after eight bit times or eight transmit clock cycles have occurred from the time when the signal RUN on line 704 in FIG. 19A becomes active as illustrated at 762 in FIG. 23. The signal END-.BYTE is coupled to the transmit executive machine 650 by the line 656 in FIG. 19A.

There are two paths out of the state 80 for the transmit executive machine 650. The upper path 746 is the path taken if data is being transmitted, whereas the lower path 748 is the path taken if an acknowledgment packet is being transmitted. The path taken depends upon the condition of the signal $\overline{\text{RTA}}$ on the line 182 in FIG. 19B. If data is being transmitted, the transmit executive transfers to the state 1EA, thereby activating several new signals in addition to the transmit enable output signal $\overline{\text{TxEN}}$. A $\overline{\text{TxDIR}}$ signal on the output line 750 is made active as shown on line K of FIG. 23 upon the rising edge of the TxCLK signal shown on line A as illustrated at 779 in FIG. 23. The $\overline{\text{TxDIR}}$ signal on the line 750 is coupled to the bit protocol machine 738 in FIG. 19B, and causes it to cease zero bit insertion. This signal is necessary to the state 1EA and EA in FIG. 20 since these two states represent the transmission of the opening flag character for the ensuing data or acknowledgment packet which requires the transmission of a string of 6 ones uninterrupted by a zero.

Another signal generated in the state EA and IEA in FIG. 20 is $\overline{\text{EN.CONST}}$ on a line 728 as illustrated at 758 in FIG. 23. This signal enables the sync/flag register 726 in FIG. 19B. The transmit executive machine 650 also generates a signal sync/flag on the line 752 as illustrated at 760 in FIG. 23 making it active low. This $\overline{\text{SYNC/FLG}}$ signal is coupled to the sync/flag register 726 in FIG. 19B and causes it to place the flag constant on the transmit data bus 730.

The transmit executive machine 650 also generates the $\overline{\text{LD.SHIFTR1}}$ and $\overline{\text{DATA.REQ1}}$ signals on the lines 732 and 754 in the state IEA but only generates the $\overline{\text{LD.SHIFTR1}}$ signal in the state EA because EA is an acknowledgment state where no data need be retrieved from memory. The $\overline{\text{LD.SHIFTR1}}$ signal, illustrated at 756 in FIG. 23, causes the parallel to serial shifter 722 in FIG. 19B to load the flag character for shifting out through the bit protocol macine 738. Referring to FIG. 20, the $\overline{\text{DATA.REQ1}}$ signal is generated by a flip-flop 756 with its D input coupled to a NAND gate 758. The flip-flop 756 and the NAND gate 758 represent an extension of the transmit executive machine 650 since the particular chip used in the preferred embodiment did not have sufficient capacity to generate the $\overline{\text{DATA.-REQ1}}$ signal. The $\overline{\text{DATA.REQ1}}$ signal on the line 690 is coupled to the DMA priority logic 682 in FIG. 19A and causes this logic to request a DMA memory cycle to retrieve a byte of data from the buffer 571 in FIG. 18 as previously described.

Figure 22:
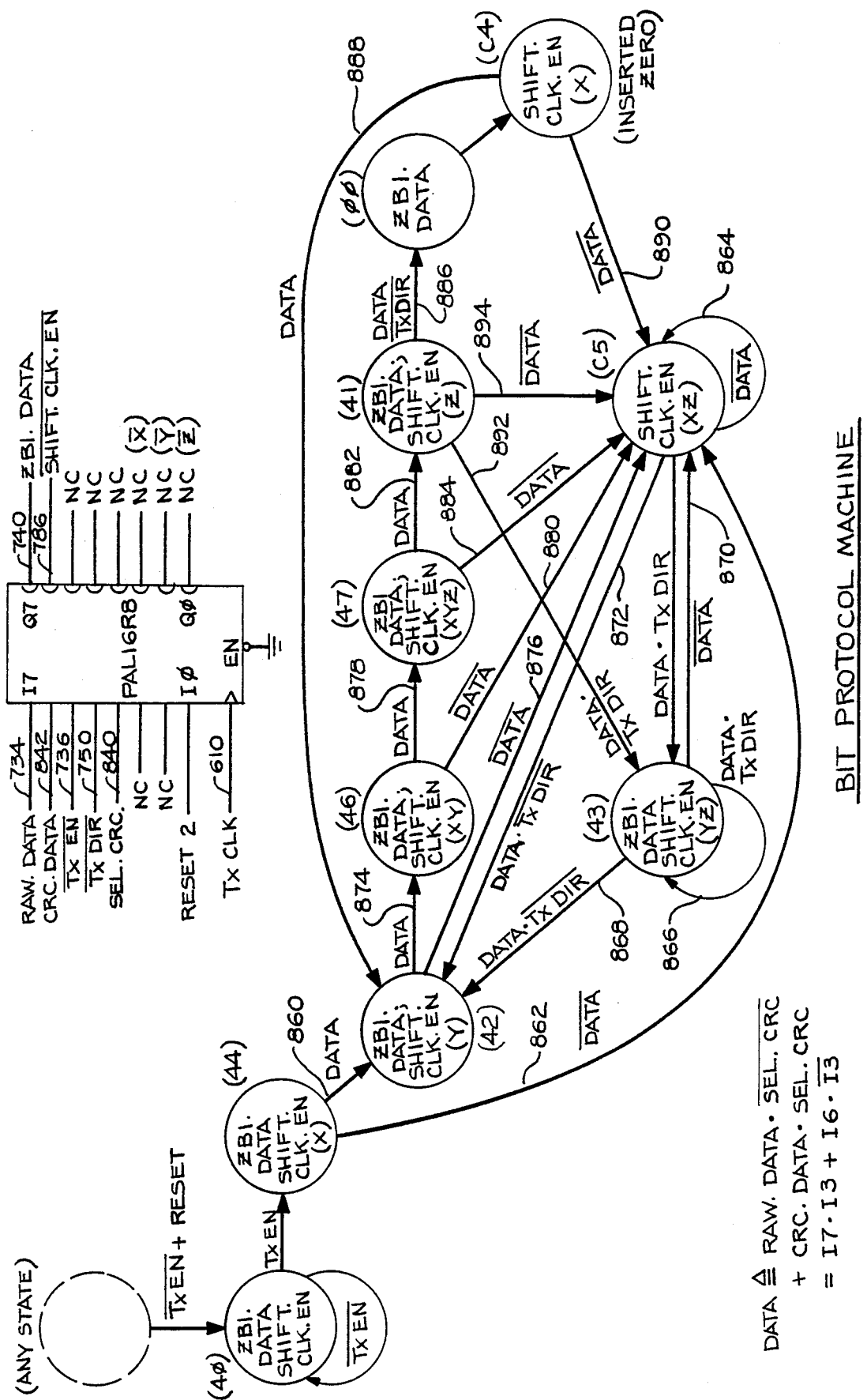
FIG. 22 is a state diagram of the states of the bit protocol machine in FIG. 19B.

If the $\overline{\text{RTA}}$ signal is active, the transmit executive transfers from the state 80 in FIG. 22 to state EA. This transfer indicates that an acknowledgment packet is to be sent which results in the same signals being generated at the output to the transmit executive machine 650 as were generated in the state 1EA except that the signal $\overline{\text{DATA.REQ1}}$ is not made active. Thus, all these same operations are performed by the DLC as in the state 1EA except that a memory cycle is not performed by the DLC since the acknowledgment packet does not include any data which must be retrieved from the buffer 571 in FIG. 18. The states 1EA and EA are represented by the signals at 756, 758 and 760 on the lines D, E and F in FIG. 23 immediately following activation of the END.BYTE signal at 762.

The transmit executive transfers out of the states EA or 1EA one clock pulse later as illustrated in FIG. 23 and transfers by either the path 764 or 766 to the state 8C. The state 8C represents the state during which the flag character is being transmitted. In the state 8C, the $\overline{\text{TxEN}}$ and $\overline{\text{TxDIR}}$ signals are maintained in their active states which prevents the bit protocol machine 738 from inserting a zero during the six consecutive ones of the flag. After the eight bits of the flag have been transmitted, the END.BYTE signal from the transmit bit counter 648 in FIG. 19A is made active, causing the transmit executive to transfer to the state 84. The transmit executive remains in the state 8C for the entire eight bits of the flag character as represented by the path 768.

While in the state 8C, the transmit executive also makes the $\overline{\text{PAL2EN}}$ signal active on the line 770. This signal is coupled to the ack and data sequencer programmable array logic 654 in FIG. 19A and, along with END.BYTE causes acknowledgment and data sequencer 654 to become activated. The transmit executive machine 650 remains in the state 84 while the acknowledgment and data sequencer 654 is activated by the $\overline{\text{PAL2EN}}$ signal as represented by the line 770 in FIG. 20. The $\overline{\text{PAL2EN}}$ signal is depicted on line L in FIG. 23 and it becomes active low at the beginning of the flag byte as shown at 781 in FIG. 23.

Referring to FIG. 21 there is shown the state diagram for the acknowledgment and data sequencer 654. The machine remains in an idle loop state 00 until such time as the input signal $\overline{\text{PAL2EN}}$ and $\overline{\text{END.BYTE}}$ signals are active. This state of affairs is represented by the path 776 wherein either $\overline{\text{PAL2EN}}$ or $\overline{\text{END.BYTE}}$ are inactive.

The acknowledgment and data sequencer 654 has two separate loops, depending upon whether a data packet or an acknowledgment packet is being transmitted. The data loop consists of the states 00, 1C, 01, 0C, 02 and back to 00. The acknowledgment loop is comprised of the states 00, 98, 80, 48, 40, 28, 20, 02 and back to 00. Taking the data loop first, when the conditions for the transfer path 776 are met, the machine transfers to the state 1C where the signals $\overline{\text{PRESET.CRC}}$, $\overline{\text{LD.SHIFTR2}}$ and $\overline{\text{DATA.REQ2}}$ on the lines 778, 780, and 782 at the acknowledgment and data sequencer outputs are activated. The signal $\overline{\text{PRESET.CRC}}$ is coupled to a CRC generator 784 in FIG. 19B, and causes it to be initialized so as to be ready to generate CRC data to be appended to the data packet to be transmitted. The signal $\overline{\text{LD.SHIFTR2}}$ is coupled to the parallel to serial shifter 722 in FIG. 19B and causes it to load the data from the transmit latch 720 on the bus 730. The signal $\overline{\text{DATA.REQ2}}$ is also coupled to the DMA priority logic 682 where it is processed through an OR gate with the signal $\overline{\text{DATA.REQ1}}$ from the transmit executive machine 650 such that either request will signal the desire for a DLC transmitter memory cycle as symbolized by the signal $\overline{\text{DATA.REQ}}$ on a line 692 in FIG. 19A. The three signals generated in the state 1C in FIG. 21 are represented by the pulses at 786, 788 and 790 on the lines M, N and O in FIG. 23 upon the next rising edge of the TxCLK signal after END.BYTE becomes active at 792 on line G. The signal $\overline{\text{TxDIR}}$ on the line K in FIG. 23 becomes inactive at 780 upon the next rising edge of TxCLK after END.BYTE becomes active at 792 indicating that the bit protocol machine 738 in FIG. 19B is now free to insert zeros where necessary.

After staying in the state 1C for one transmit clock cycle, the acknowledgment and data sequencer 654 transfers to the state 01 which is a no-operation state. In this state, the machine waits for certain conditions of certain input signals in order to make a transfer either to the state 0C or 02. As long as the signal END.BYTE from the Transmit Bit Counter 648 in FIG. 19A or the signal SHIFT.CLK.EN from the bit protocol machine 738 in FIG. 19B are inactive, the acknowledgment and data sequencer 654 will remain in the state 01. All the outputs of the acknowledgment and data sequencer 654 are inactive in the state 01. The data is transmitted as the acknowledgment and data sequencer 654 alternates between states 01 and 0C.

The acknowledgment and data sequencer 654 stays in the state 01 while the individual bits of the first byte in the data packet are shifted out of the parallel to serial shifter 722. The SHIFT.CLK.EN signal is used to control zero bit insertion. That is, when the $\overline{\text{SHIFT.CLK.EN}}$ signal becomes inactive, the bit to be shifted out during that clock cycle is not shifted out, and a logic zero is inserted by the bit protocol machine 738. On the next clock cycle, the bit that was held is shifted out. The SHIFT.CLK.EN signal will become inactive whenever five logic ones appear in sequence. The condition in the acknowledgment and data sequencer 654 of staying in the state 01 if either the $\overline{\text{END.BYTE}}$ signal or the $\overline{\text{SHIFT.CLK.EN}}$ signal is inactive is represented by the line 790 in FIG. 21.

Referring again to FIG. 23, the interaction of the SHIFT.CLK.EN signal with the RAW.DATA and END.BYTE signals on the lines G and H respectively is illustrated. At the time 792, the $\overline{\text{SHIFT.CLK.EN}}$ signal becomes inactive because five data bits in the RAW.DATA signal on the line H have just been received at the bit protocol machine 738 in FIG. 19b. This causes bit time 6 to be delayed for one clock cycle and causes a logic 0 to be inserted during the bit time 5½ as illustrated at 794. Thereafter, the remaining three bits in the string of eight ones in the RAW.DATA on line H are transmitted as illustrated during bit times 6, 7 and 8 on line I at 796. As illustrated at 798 on line G, the END.BYTE signal is delayed one bit time because of the loss of the SHIFT.CLK.EN signal at 792. Thus, nine bits are transmitted during this byte including the inserted zero. However, the inserted zero is removed by the hardware of the DLC at the receiving station. Therefore, only eight actual data bits will be transmitted between the END.BYTE signals.

When the END.BYTE signal becomes active and the SHIFT.CLK.EN signal is active but the $\overline{\text{END.DATA}}$ signal on the line 662 is inactive, the acknowledgment and data sequencer 654 will shift to the state 0C. In the state 0C, the output $\overline{\text{LD.SHIFTR2}}$ and $\overline{\text{DATA.REQ2}}$ will be made active, thereby loading the second byte of the packet from the transmit latch 720 in FIG. 19b into the parallel to serial shifter 722 and requesting a third byte via the DMA priority logic 682 in FIG. 19a. The DATA.REQ2 signal is represented by the line 692 in FIG. 19a. This causes the DMA priority logic to bring the third byte in from the buffer 571 in FIG. 18 and store it in the transmit latch 720 in FIG. 19b. If the $\overline{\text{SHIFT.CLK.EN}}$ signal again becomes inactive in the state 0C, another zero bit will be inserted as represented by the line 800 in FIG. 21. On the next clock pulse, if the SHIFT.CLK.EN signal is active, the acknowledgment and data sequencer 654 will shift back to the state 01 as represented by the line 802. This process continues until both the input signals END.BYTE and END.DATA become true and the SHIFT.CLK.EN signal is active. When those input conditions occur, the acknowledgment and data sequencer 654 knows that the last byte of the data packet to be transmitted has been sent.

Transfer is then made to the state 02 which activates the output signal $\overline{\text{CONT}}$ which is sent back to transmit executive machine 650 on the line 772 in FIG. 19a. The signal $\overline{\text{CONT}}$ instructs the transmit executive machine 650 to finish its sequence. The acknowledgment and data sequencer 654 will stay in the state 02 for an additional clock pulse if the $\overline{\text{SHIFT.CLK.EN}}$ signal again becomes inactive while in this state as represented by the line 804. Otherwise, the acknowledgment and data sequencer 654 will transfer back to the idle state 00 on the next clock cycle as symbolized by the path 805.

Acknowledgment Loop

The acknowledgment and data sequencer 654 will go through an acknowledgment sequence if the $\overline{\text{RTA}}$ signal on the line 182 in FIG. 19a is active at the time that the $\overline{\text{PAL2EN}}$ signal on the line 770 becomes true. The acknowledgment loop is comprised of the states 00, 98, 80, 48, 40, 28, 20, 02 and back to 00. The first transfer in this loop is to the state 98 which occurs when the input signals $\overline{\text{PAL2EN}}$, END.BYTE and $\overline{\text{RTA}}$ are all active.

In the state 98, the output signals $\overline{\text{PRESET.CRC}}$, $\overline{\text{EN.SRC.ADDR}}$ and $\overline{\text{LD.SHIFTR2}}$ are made true on the lines 778, 804 and 780 respectively. These output signals are not shown on FIG. 19a but are shown at the units in FIG. 19b to which they are directed.

The purpose of the acknowledgment loop is to assemble an acknowledgment packet from data stored in the DLC without assistance from or intervention by the higher level software of the client data processing unit. The acknowledgment packet is comprised of an opening flag, a destination address, a source address, and an acknowledgment control byte, CRC error check information and a closing flag. The destination address and the source address are derived by reversing the order of the destination and source address bytes in the incoming data packet. That is the source address of the incoming data packet becomes the destination address of the acknowledgment packet and the destination address of the incoming data packet becomes the source address of the acknowledgment packet. The acknowledgment control byte is a code which indicates the status of the transaction. A particular code, when present in this field, indicates that the data packet was received positively and error free. Any other code means that the packet was not properly received because the FIFO receive buffer was full or the receiver was off line.

No acknowledgment packet is sent if the error check performed by the receiving apparatus indicates that there was an error during the reception of the incoming data packet. The reason for this is that a bad CRC check could have resulted because of an error in the destination address or the source address fields in the incoming data packet which are two fields over which the CRC information for the incoming packet is generated. If the error was in the destination address, then the particular DLC preparing the acknowledgment packet may not have been the DLC to which the packet was directed. Further, if there was an error in the source address, the DLC preparing the acknowledgment packet may inadvertently send the ack packet to the wrong receiving station which will send it to its client device as any other normal packet. The client device will then ignore the acknowledgment packet.

The state 98 in FIG. 21 is the first state necessary to begin the preparation of the acknowledgment packet. The output signal $\overline{\text{PRESET.CRC}}$ on the line 778 in this state is coupled to the CRC generator 784 in FIG. 19b and causes it to be initialized so as to begin preparing CRC data on the fields in the acknowledgment packet. The output $\overline{\text{EN.SRC.ADDR}}$ on the line 804 is coupled to a source address latch 808 in FIG. 19b and causes it to place the source address stored therein on the transmit bus 730. The source address stored in the latch 808 was the source address of the incoming data packet on the transmit data bus 730. The third signal generated in the state 98 is $\overline{\text{LD.SHIFTR2}}$ which causes the parallel to serial shifter 722 to load the source address now present on the transmit data bus 730.

On the next clock cycle, the acknowledgment and data sequencer 654 transfers to the state 80 which is a no operation state which waits for the end of the device address byte to be signalled by the occurrence of the END.BYTE signal. The sequencer will remain in the state 80 as long as either the END.BYTE signal is inactive or the $\overline{\text{SHIFT.CLK.EN}}$ signal is inactive. That is, if the END.BYTE signal becomes active but the $\overline{\text{SHIFT.CLK.EN}}$ signal is inactive, one clock pulse delay will occur while a 0 bit is inserted after which the $\overline{\text{SHIFT.CLK.EN}}$ signal will become active and transfer will be made to the state 48 as represented by the path 810 in FIG. 21.

In the state 48, the output signal $\overline{\text{EN.MY.DA}}$ on the line 812 and the $\overline{\text{LD.SHIFTR2}}$ signal on the line 780 are made active. The $\overline{\text{EN.MY.DA}}$ signal is coupled to a device address register 814 in FIG. 19b causing it to place the address of this DLC on the device address bus 816 where it is driven onto the transmit data bus 730 by a device address buffer 818. The signal $\overline{\text{LD.SHIFTR2}}$ on the line 780 then causes the parallel to serial shifter 722 to load the destination address and shift it out onto the line 734 as the source address of the acknowledgment packet.

The acknowledgment and data sequencer 654 will remain in the state 48 for one clock cycle unless the $\overline{\text{SHIFT.CLK.EN}}$ signal becomes inactive. This event will delay transfer to the state 40 by one clock cycle. Thus the acknowledgment and data sequencer will remain in the state 48 for one clock pulse and then transfer to the state 40 providing the $\overline{\text{SHIFT.CLK.EN}}$ signal is active as symbolized by the line 822 in FIG. 21.

In the state 40, the acknowledgment and data sequencer waits for the END.BYTE signal to signify that all bits of the source address have been shifted out whereupon transfer is made to the state 28 as symbolized by the path 824 unless $\overline{\text{SHIFT.CLK.EN}}$ is inactive. As long as either the END.BYTE signal or the $\overline{\text{SHIFT.CLK.EN}}$ signal is inactive, the acknowledgment and data sequencer stays in the state 40 as symbolized by the path 826. Although the $\overline{\text{EN.MY.DA}}$ output is active during the state 40, this is meaningless because state 40 is actually a waiting state as represented by the line 826.

In the state 28, the acknowledgment and data sequencer activates the $\overline{\text{EN.ACK.TYPE}}$ signal on the line 828 and activates the $\overline{\text{LD.SHIFTR2}}$ signal on the line 780. The EN.ACK.TYPE signal is coupled to an acknowledgment type circuit 830 in FIG. 19a. The acknowledgment type cirucit 830 places a code on the transmit data bus 730 which is loaded into the parallel to serial shifter 722. This code indicates whether the type of acknowledgment signifies a good reception or that the DLC is requesting retransmission because either the FIFO receive buffer was full or the receiver was off line. The information to generate the acknowledgment type code comes from a FIFO controller circuit 836 which is coupled to a FIFO Address Comparator logic circuit 942 and an EOF controller. When the FIFO receive buffer is full, the FIFO controller 836 sends a BUSY signal on a line 948 to the acknowledgment type logic 830 to cause it to generate a code which indicates that the FIFO buffer is full and that retransmission is required. This FIFO full acknowledgment code is placed by the acknowledgment type circuit 830 onto the transmit data bus 730 in FIG. 19b. The FIFO controller 836 determines when the FIFO buffer is full by monitoring the $R_xA = EOF$ signal on a line 946 from the FIFO address comparator 942. The FIFO address comparator 942 compares the address of the current byte to the address of the end of FIFO as loaded from the CPU and held in the EOF address register 672 in FIG. 19A. If the FIFO buffer is not full, the ack-type circuit 830 places a code on the transmit data bus 730 which indicates that the transmission was received perfectly.

Figure 33:
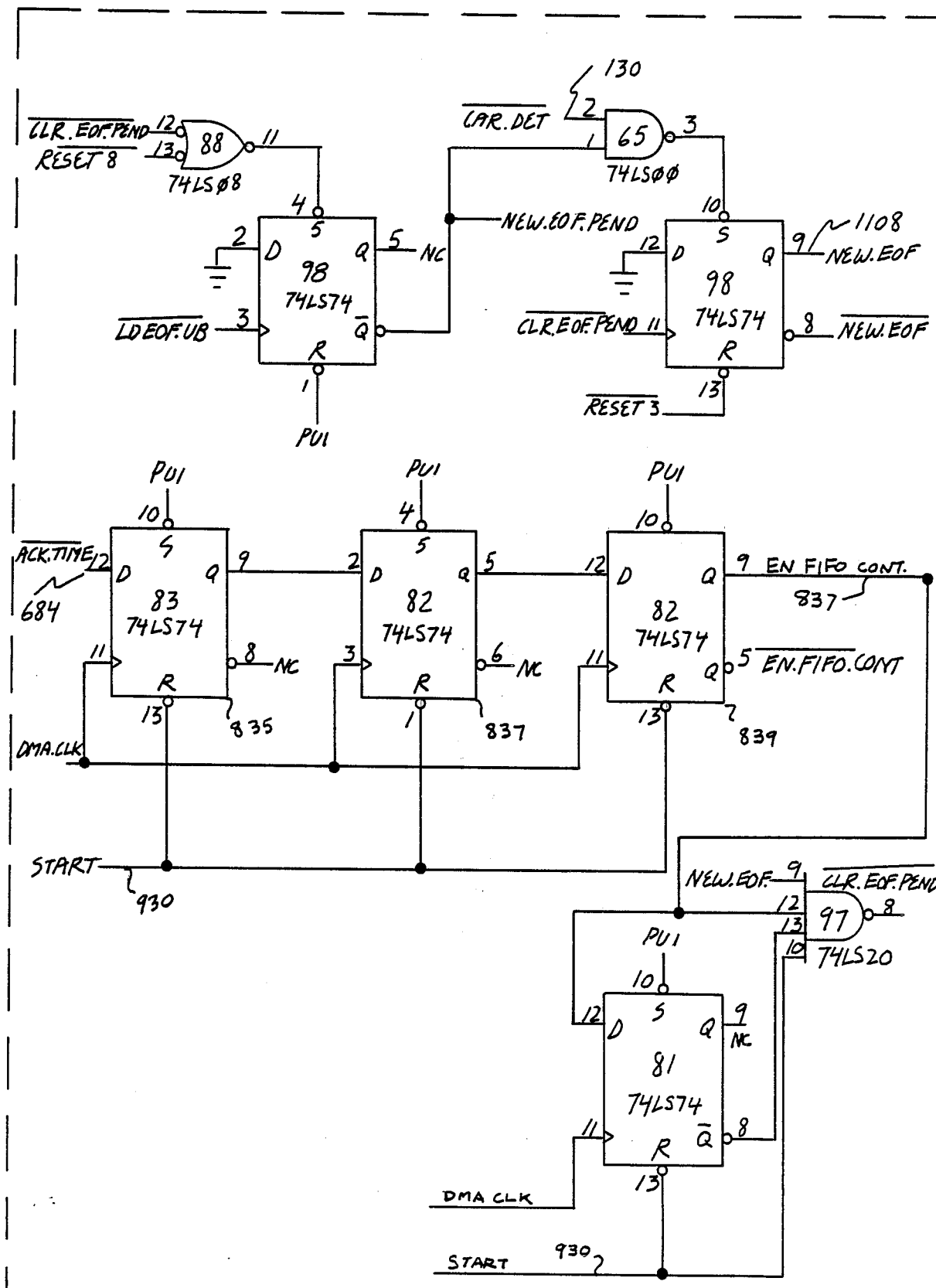

The EOF controller 839 of FIGS. 19A and 33 serves to enable the FIFO controller 836 via a signal $\overline{\text{EN.-FIFO.CONT}}$ on a line 837. This signal is activated three DMA clock periods after the occurence of the $\overline{\text{START}}$ signal, unless an acknowledgment packet is being received as indicated by the $\overline{\text{ACK.TIME}}$ signal on the line 684. If $\overline{\text{ACK.TIME}}$ is active, zeroes are shifted through the flip-flops 835, 837 and 839 in FIG. 33, such that the $\overline{\text{EN.FIFO.CONT}}$ signal is never activated. This happens because there is no need to check the FIFO receive buffer full status during reception of an acknowledgment packet since acknowledgment packets are placed in the transmit buffer instead of the receive buffer.

The acknowledgment and data sequencer 654 will stay in the state 28 for an extra clock cycle if the $\overline{\text{SHIFT.CLK.EN}}$ signal becomes inactive. Otherwise, control will be transferred to a state 20 which is a waiting state wherein the acknowledgment and data sequencer waits for the signal END.BYTE from the transmit bit counter 648 to become active whereupon control is transferred to the state 02. If either the END.BYTE signal or the $\overline{\text{SHIFT.CLK.EN}}$ signal is inactive while in the state 20, the sequencer 654 will remain in state 20 until both are active as symbolized by the line 834 and the line 836.

In the state 02 the output signal $\overline{\text{CONT}}$ on the line 772 is made active, and one clock cycle later, control will be transferred back to the state 00 as symbolized by the line 838 unless the $\overline{\text{SHIFT.CLK.EN}}$ signal become inactive, while in the state 02.

The output signal $\overline{\text{CONT}}$ on the line 772 causes the transmit executive machine 650 to resume operation starting from the state 84 in FIG. 20.

Referring again to FIG. 20, when the $\overline{\text{SHIFT.CLK.EN}}$ signal is active and the $\overline{\text{CONT}}$ signal is active, control will be transferred to the state 90 with the output signal TxEN remaining active on the line 736 and a new output signal DATA/$\overline{\text{CRC}}$ on a line 840 will be made active low. The signal DATA/$\overline{\text{CRC}}$ on the line 840 is coupled to the bit protocol machine 738 in FIG. 19b, and causes the machine to select a CRC byte from the CRC generator 784 on the line 842 while ignoring the data on the line 734. The bit protocol machine 738 then shifts the CRC data out bit by bit on the line 740 for transmission as part of the acknowledgment packet. The transmit executive will remain in the state 90 as long as either the signal END.BYTE or $\overline{\text{SHIFT.CLK.EN}}$ is inactive as symbolized by the line 844 in FIG. 20. When the CRC data has been sent, the signal END.BYTE is activated, and, if $\overline{\text{SHIFT.CLK.EN}}$ is active, control will be transferred to the state 91 which has the same outputs as state 90. State 91 selects the second byte of CRC data and transmits it. The acknowledgment and data sequencer 654 then transfer to a state F2 when both END.BYTE and $\overline{\text{SHIFT.CLK.EN}}$ are active.

In the state F2 the transmit executive has 5 active output signals. They are: TxEN, EN.CONST, SYNC/$\overline{\text{FLG}}$ and LD.SHIFTR1. The signals EN.CONST on the line 728 and SYNC/$\overline{\text{FLG}}$ on the line 752 are coupled to the SYNC/FLG register 726 in FIG. 19b. These two signals cause the sync/flag register to be enabled and the flag character to be selected and placed on the transmit data bus 730. The LD.SHIFTR1 signal on the line 732 causes the parallel to serial shifter 722 to load the closing flag character which is then shifted out onto line 734 through the bit protocol machine 738.

The transmit executive will stay in the state F2 for one clock period unless the $\overline{\text{SHIFT.CLK.EN}}$ signal becomes inactive while in the state F2 whereupon the F2 state will be extended for one additional clock period as symbolized by the line 848.

The transmit executive then transfers to a state 89 wherein the closing flag is transmitted. The TxEN and $\overline{\text{TxDIR}}$ outputs on the lines 736 and 750 are activated during the transmission of the closing flag. The $\overline{\text{TxDIR}}$ signal on the line 750 inhibits the bit protocol machine 738 such that the flag can be transmitted without the zero bit insertion. The transmit executive 650 will remain in the state 89 until the signal END.BYTE becomes active as symbolized by the path 850. Control will then be transferred to a state 88 wherein a string of ones are sent without zero bit insertion as symbolized by the output $\overline{\text{TxDIR}}$ being active. The reason for sending the string of ones after sending the closing flag is to keep the transmission line high for at least eight bits after the flag so as to keep the clock in the receiving DLC in synchronization with the transmitted data. After eight logic ones have been sent, the signal END.BYTE becomes active which causes a transfer to the state 01 as symbolized by the line 852. The state 01 is a waiting state where the transmit executive 650 waits for the disappearance of the RUN signal at its input. This waiting is symbolized by the line 854. When RUN becomes inactive, control is transferred back to the idle loop state 00, at which time the transmission is completed.

Referring to FIG. 22 there is shown a state diagram of the bit protocol machine 738 in FIG. 19b. The bit protocol machine will transfer to the state 40 from any state in the machine when either the TxEN signal becomes inactive or the RESET signal becomes active. The state 40 is a waiting state wherein the SHIFT.CLK.EN signal on the line 786 and the ZBI.DATA signal on the line 740 are active.

The bit protocol machine will stay in the state 40 until the TxEN signal becomes active, at which time control will be transferred to a state 44. That is, the bit protocol machine transfers to the state 44 when the transmit mode is entered. In the transmit mode, the RAW.DATA signal on the line 734 is input to the bit protocol machine 738. A DATA signal is derived from four signals one of which is the RAW.DATA signal as illustrated by the Boolean expression in the lower left corner of FIG. 22. The bit protocol machine states 42, 46, 47, 41 and 00 look for a sequence of five consecutive logic ones of the RAW.DATA line 734 as follows. If the first data bit on the line 734 is a logic one, control is transferred to the state 42 as represented by the line 860. In the state 42 the outputs $\overline{\text{ZBI.DATA}}$ and SHIFT.CLK.EN are still active.

If the first data bit was a zero, then control is transferred to the state C5 as represented by the line 862. In the state C5 the $\overline{\text{SHIFT.CLK.EN}}$ signal will be active, but the ZBI.DATA signal will be inactive or logic zero. The bit protocol machine 738 will remain in the state C5 as long as the incoming data bits are zero as represented by the line 864. Upon the appearance of the first logic one one the RAW. DATA line, control will be transferred either to the state 43 or the state 42 depending upon whether the $\overline{\text{TxDIR}}$ signal on the line 750 is active or inactive.

If the $\overline{\text{TxDIR}}$ signal is active, control will be transferred to the state 43. In state 43, the ZBI.DATA signal is activated and the SHIFT.CLK.EN signal continues to be active. The state 43 represents a state where logic ones are shifted out without zero bit insertion because the $\overline{\text{TxDIR}}$ signal is active. Therefore, as long as the data bits coming in are logic ones and the $\overline{\text{TxDIR}}$ signal is active, the bit protocol machine will stay in state 43 as represented by the line 866.

Upon the occurrence of the first logic one after the $\overline{\text{TxDIR}}$ signal becomes inactive, control is transferred to the state 42 as represented by the line 868. If, while in the state 43 the data signal becomes a logic zero again, control is transferred back to the state C5 as represented by the line 870. If, while in the state C5, a logic one occurs but the $\overline{\text{TxDIR}}$ signal is inactive, control will be transferred to the state 42 as symbolized by the line 872.

The state 42 represents the first state in which the bit protocol machine begins to watch for a sequence of five ones. If the next data bit is a logic one, control will be transferred to the state 46 as symbolized by the line 874. If, however, the next data bit is a logic zero, control will be transferred back to the state C5 as represented by the line 876. From the state C5 processing will continue as previously described.

In state 46, if the next data bit is a logic one, control will be transferred to the state 47 as represented by the line 878. If however the next data bit is logic zero, control will be transferred back to the state C5 as represented by the line 880. In the state 47, the ZBI.DATA and $\overline{\text{SHIFT.CLK.EN}}$ signals are again active signifying that the previous data bit was a logic one. That is, the ZBI.DATA signal follows the data signal by one clock period. If the next data bit which comes in while the bit protocol machine is in the state 47 is a logic one, control will be transferred to the state 41 as symbolized by the line 882. If the incoming data bit is a logic zero, control will be transferred back to the state C5 as symbolized by the line 884.

In the state 41 if the incoming data bit is a logic one and the $\overline{\text{TxDIR}}$ signal is inactive, control will be transferred to the state 00 as symbolized by the line 886. In the state 00, the ZBI.DATA signal is still active but the $\overline{\text{SHIFT.CLK.EN}}$ signal is inactive. This indicates that five successive logic ones have been received on the RAW.DATA line 734 and that a zero bit must be inserted. By rendering the $\overline{\text{SHIFT.CLK.EN}}$ signal inactive, the bit protocol machine can halt activity in the acknowledgment and data sequencer 654 in FIG. 19a for one clock period while a zero bit is inserted.

The zero bit insertion is represented by a transfer to a state C4 wherein the ZBI.DATA output signal is made inactive and the $\overline{\text{SHIFT.CLK.EN}}$ signal is reasserted as active. By making the ZBI.DATA signal inactive, a previously non-existent zero is inserted into the bit stream.

From the state C4, if the next incoming data bit is a logic one, control will be transferred back to the state 42 as represented by the line 888. However, if the next incoming data bit is a logic zero, control will be transferred back to the state C5 as represented by the line 890. Processing will then continue as previously described with respect to state C5.

From the state 41, two additional control paths exist. If while in the state 41, the incoming data bit was a logic one but the $\overline{\text{TxDIR}}$ signal was active, control will be transferred to the state 43 as represented by the line 892. This control path represents the transmission of either an opening or closing flag wherein the acknowledgment and data sequencer 654 causes the $\overline{\text{TxDIR}}$ signal to be asserted true thereby inhibiting the zero bit insertion operation by the bit protocol machine. From the state 43, control is transferred as previously described.

The other path from the state 41 is represented by the control path 894 which represents a logic zero at the input to the bit protocol machine while in the state 41. Control is then transferred to the state C5, and processing continues as previously described.

Thus it can be seen that if a logic zero appears at the input of the bit protocol machine while in any of the states 42, 46, 47 or 41 no zero bit will be inserted and surveillance will begin again upon the appearance of the next logic one at the input where the $\overline{\text{TxDIR}}$ signal is inactive. Anytime the $\overline{\text{TxDIR}}$ signal is asserted active, no zero bit will be inserted.

Receive Cycle

Figure 24:
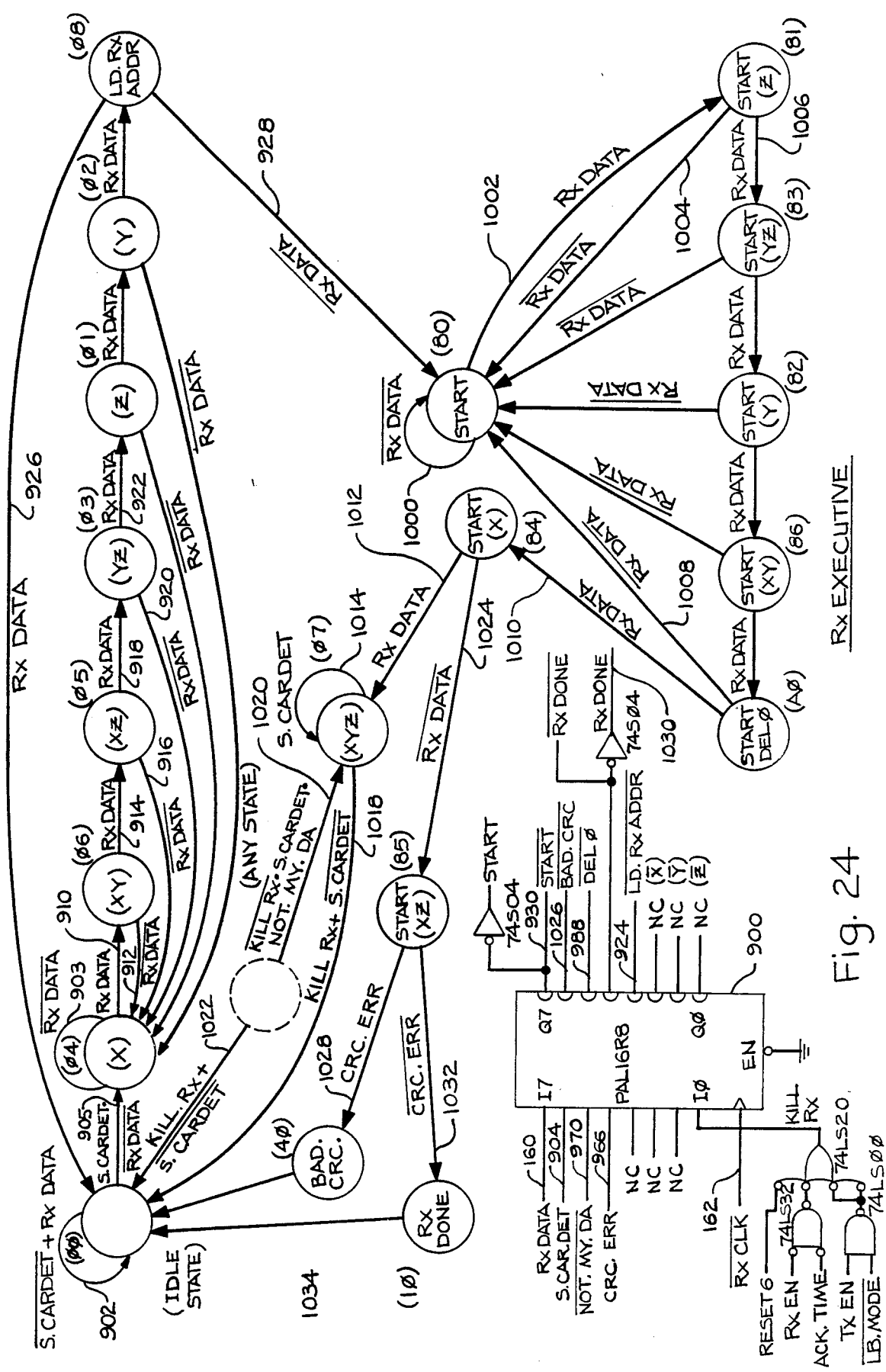
FIG. 24 is a state diagram for the receiver executive machine in FIG. 19B.

Referring to FIG. 24, there is shown a state diagram for the receiver executive machine 900 in FIG. 19b. In FIG. 24, the receiver executive machine 900 normally resides in an idle state 00. It will stay in this state as long as either the input signal S.CAR.DET is inactive or the signal $\overline{\text{RxDATA}}$ is active as symbolized by the line 902. The first task of the receiver executive machine 900 in FIG. 19b is to determine the presence of the opening flag. This function is represented by the states 04, 06, 05, 03, 01, 02 and 08. The receiver executive transfers to the state 04 on the path 905 when the signal S.CAR.DET on the line 904 is active and the signal RxDATA on the line 160 is false, indicating a logic zero has arrived which could be the first bit of the flag character. As long as the serial input data on the line 160 is a logic zero, the receiver executive will stay in the state 04 as symbolized by the line 903.

Upon receipt of the first logic one in the receive data on the line 160, control will be transferred on the path 910 to the state 06. If the next incoming bit is a logic 0, control will be transferred back to the state 04 as symbolized by the line 912. However, if the incoming bit is a logic 1, control will be transferred to the next state 05 on the path 914.

While in the state 05, if the next incoming bit is a logic 0, control will be transferred back to the state 04 as represented by the line 916. If however, the incoming data bit is a logic 1, control will be transferred to the state 03.

While in the state 03, if the next incoming data bit is a logic 0, control will be transferred back to the state 04 as symbolized by the line 920. However, if the next incoming data bit is a logic one, control will be transferred to the state 01 as symbolized by the line 922. The states 01 and 02 function exactly as the states 06, 05 and 03. Upon reaching the state 02, it is known that a logic 0 followed by five successive logic has been received. If the next incoming data bit is a logic one, control is transferred to the state 08. In the state 08, the output LD.RxADDR on a line 924 will be activated. While in the state 08, if the next incoming data bit is a logic 1, control will be transferred back to the idle state 00 as symbolized by the line 926. This transfer would indicate that the opening flag has not been received since only a logic zero while in this state 08 will indicate that the character just received is a flag. If the next incoming data bit is a logic 0, then a flag will have been received, and control will be transferred to the state 80 to start the receiving sequence as symbolized by the line 928.

In the state 80, the $\overline{\text{START}}$ output on the line 930 is activated which signals the rest of the DLC circuitry to begin looking for valid data.

Referring to FIG. 25 there is shown a timing diagram of the receive cycle of the data link controller. The output signal $\overline{\text{LD.RxADDR}}$ generated in the state 08 is shown at 930 on line D of FIG. 25. It is activated in the middle of bit time 7 (referring to line C) of the RxDATA signal and is coupled to the receiver address register in FIG. 19 to cause it to load the address in which to store the first byte of the incoming data packet.

During the receive cycle, operations in the DLC are as follows: The receiver address register 678 in FIG. 19A contains the receiver address pointer which points to the current address in the FIFO receive buffer in which address the incoming data byte is to be stored. The receiver address pointer is initially set to zero upon reset of the DLC. Each time a byte comes in, the receiver address pointer is incremented so that the next byte will be put in the following memory location. At the end of a successful receive cycle, after a complete data packet has been received and the CRC check indicates that the data was received perfectly, the receiver address pointer is transferred into the start-of-packet address latch 679 via the address bus 676. At any time that the CPU 560 in FIG. 18 desires to read the receiver address pointer, the CPU can do so through the start-of-packet address buffer 674.

At the beginning of the next receive cycle, the contents of the start-of-packet address latch are transferred back into the receiver address register 678 so that the next packet will start at the next location after the end of the preceeding packet. If there was some problem in receiving the preceeding packet, such as a CRC error, the receiver address pointer in the receiver address register 678 is not transferred into the start-of-packet address latch 679 such that the next data packet coming in will be written over the defective packet. In this way the integrity of the data in the FIFO receive buffer is maintained.

An end-of-FIFO address register 672 in FIG. 19 contains the address which marks the end of the FIFO receive buffer 571 in FIG. 18. The end-of-FIFO address and all addresses beyond this address are forbidden for loading of incoming data packets. An end-of-FIFO holding register 940 receives the new end-of-FIFO pointer loaded by the CPU. At the appropriate time, the contents of the holding register 940 are transferred into the end-of-FIFO register 672.

A FIFO-address-compare circuit 942 continually compares the receive address pointer on the address bus 676 to the end-of-FIFO address on the bus 944. When there is a match in these two addresses, the FIFO address comparator 942 signals via a signal RxA=EOF to the FIFO controller 836 via the line 946. The RxA=EOF signal is combined with several other signals from the EOF control logic 839 in FIG. 19A in a sequential machine having the state diagram shown at the bottom of FIG. 34A. The purpose of the sequential machine embodied in the logic of the FIFO controller is to generate the BUSY signal on the line 948. The logic of the FIFO controller is shown in FIG. 34A. The BUSY signal indicates that the FIFO buffer is full. When the FIFO receiver buffer is full, the FIFO controller 836 activates the BUSY signal on the line 948 to the ACK.TYPE circuit 830 for inclusion in the acknowledgment packet to indicate that the FIFO receive buffer was full indicating that a later retransmission will be necessary.

The wait logic 950 is active whenever the CPU 560 in FIG. 18 is requesting data from the memory 571. The wait logic is also used when the CPU wishes to place data into the RAM 571 in FIG. 18. When either request is made as signaled by the $\overline{RD}$ or $\overline{WR}$ signals on the lines 630 and 586 and the $\overline{BUF.SEL}$ signal on the line 602 the DMA priority logic 682 signals the wait logic 950 via the line 952, whereupon the wait logic activates the $\overline{WAIT}$ signal on the line 588, causing the CPU 560 to suspend its memory cycle until the DMA priority logic 682 and DMA sequencer 680 complete all higher priority DLC functions having to do with the RAM 571.

The $\overline{LD.RxADDR}$ pulse at 930 in FIG. 25 causes the DLC to prepare to place the first incoming data byte in the proper location in the FIFO receive buffer in the RAM 571. Processing of the incoming serial data proceeds as follows.

Referring to FIG. 19b, a serial to parallel shifter 954 receives the serial receive data on the RxDATA line 160 and the RxCLK signal on the line 162 from the modem. The serial-to-parallel shifter 954 converts the serial data to parallel format for output on the bus 956. The eight-bit byte on the bus 956 is latched into a byte latch 958 which has its outputs coupled to the receive data bus 960. A receive bit counter 960 senses when eight bits have been received by the byte latch 958 and signals the byte latch to place the data on the receive data bus 960.

The CRC logic circuit 962 analyzes the incoming serial data on the line 964, which is one line in the parallel bus 956 and determines whether the data has been received properly. The CRC logic 962 divides the incoming data by a polynomial and checks the remainder. If the remainder is a predetermined constant, then the data has been properly received. In the preferred embodiment, the CRC generator 784 and the CRC logic 962 are Fairchild 9401 TTL Macrologic CRC chips. These chips use standard cyclic redundancy techniques one of which is similar to the procedure described in IBM Technical Paper GA27-3093-1, entitled IBM Synchronous Data Link Control General Information.

If an error has occurred, the output signal CRC.ERR on the line 966 coupled to the receiver executive machine 900 is activated to signal an error. The CRC logic 962 divides all the incoming data plus the two CRC bytes by the polynomial and then compares the remainder from this division to a predetermined constant to determine if the packet has been properly received. The CRC.ERR signal on the line 966 will indicate that the remainder is either equal or not equal to the predetermined constant.

An address comparator 968 compares the destination address portion of the incoming data packet on the receive data bus 960 to the device address of the DLC to determine if there is a match. The device address of the DLC in question is stored in the device address register 814 in FIG. 19B and appears on the data bus 816. The device address register 814 is coupled to the CPU 560 by the CPU data bus 562 such that the CPU can program the DLC with any device address desired by the CPU. The result of the comparison of the device address field of the incoming data packet to the DLC's device address is communicated to the receiver executive machine 900 as the $\overline{NOT.MY.DA}$ signal on the line 970.

The device address buffer 818 serves as a gate under the control of the acknowledgment and data sequencer 654 by way of the $\overline{EN.MY.DA}$ signal on the line 819 to selectively gate the device address stored in the device address buffer 818 onto the transmit data bus 730 as the source address in an acknowledgment packet.

The source address latch 808 is coupled to the receiver data bus 960 and serves to store the source address of the incoming data packet for later use in the outgoing acknowledgment packet under the control of the signal EN.SRC.ADDR on the line 804 from the ack and data sequencer 654. A receive buffer 980 is coupled to the receiver data bus 960 and stores the data bits from the incoming data packet until the DMA sequencer 680 in FIG. 19A causes the data to be stored in the proper address in the FIFO receive buffer 571 in FIG. 18.

A receiver timing generator 982 receives the START signal on the line 930 from the receiver executive 900 in FIG. 19B and a $\overline{\text{BYTE.CLK}}$ signal on a line 984 from a gating circuit 986. The gating circuit 986 is coupled to the receive clock line 162 and the $\overline{\text{DEL0}}$ output signal on the line 988 from the receiver executive machine 900. The receiver timing generator 982 generates a $\overline{\text{SRC.CLK}}$ signal on the line 990 which is coupled to the source address latch 808 causing it to latch in the source address field from the receive data bus 960 at the proper time.

An interrupt logic circuit 994 in FIG. 19B receives several status signals from the status register 670 in FIG. 19A. The interrupt logic 994 processes the status signals to generate the $\overline{\text{TxINT}}$ signal on the line 590 and the $\overline{\text{RxINT}}$ signal on the line 622. The $\overline{\text{RxINT}}$ signal on the line 622 will be generated if either the $\overline{\text{RxDONE.INT}}$ signal on a line 623 or the $\overline{\text{CRC.EVENT}}$ signal on a line 625 are active. The $\overline{\text{TxINT}}$ on the line 590 will be generated if any of the signals $\overline{\text{TxDONE.INT}}$ on a line 627, $\overline{\text{TxFAIL}}$ on a line 629 or $\overline{\text{TxABORT}}$ on a line 631 are active.

Referring to FIG. 19A, a control register 668 coupled to the CPU data bus 562 receives data from the CPU and decodes it to generate several control signals which are used in the system and which will be apparent from a study of the detailed logic diagrams of the DLC included herewith. The signals which contribute to the generation of TxINT and RxINT include: $\overline{\text{RxDONE.INT}}$, $\overline{\text{CRC.EVENT}}$, $\overline{\text{TxDONE}}$, $\overline{\text{TxFAIL}}$, $\overline{\text{TxABORT}}$, OVER.INT, and EN.OVER.INT. These signals are coupled to the interrupt logic 994 in FIG. 19B. The signal $\overline{\text{RxDONE.INT}}$ indicates that the receive transaction is completed. The $\overline{\text{CRC.EVENT}}$ signal indicates that a CRC error has occurred during the receive transaction. The signal $\overline{\text{TxDONE}}$ indicates that the transmit transaction is complete. The signal $\overline{\text{TxFAIL}}$ indicates that there was a problem in transmission of the data packet indicated by a lack of acknowledgement. The signal $\overline{\text{TxABORT}}$ indicates that the transmission was not completed because the signal $\overline{\text{CTS}}$ was deactivated by the modem prior to completion of the transmission. The signal OVER.INT on the line 633 in FIG. 19B is generated by the status register 670 in FIG. 19A and indicates that the receive buffer overflowed prior to completion of the reception. The signal EN.OVER.INT on the line 635 in FIG. 19B is generated by the control register 668 in FIG. 19A and allows the overflow interrupt mechanism, activated by the signal OVER.INT to be disabled by the CPU.

When the data packet coming in is an acknowledgment packet, the signals $\overline{\text{ACK.WINDOW}}$ on the line 620 and $\overline{\text{CAR.DET}}$ on the line 130 in FIG. 19B will be active. This causes the modem control interface 686 to generate the $\overline{\text{ACK.TIME}}$ signal on the line 684. The $\overline{\text{ACK.TIME}}$ signal on the line 684 is coupled to the buffer address multiplexer 664 in FIG. 19A. During the time when the receiver is active, the $\overline{\text{RxREQ}}$ signal on the line 688 will be active, causing the DMA priority logic 682 to activate the $\overline{\text{RxSEL}}$ signal in the bus 698, coupled to the buffer address multiplexer 664. When the buffer address multiplexer sees both the $\overline{\text{RxSEL}}$ signal and the $\overline{\text{ACK.TIME}}$ signal active concurrently, it will select the transmit address pointer in the transmit address register 640 as the address in which to start storing the incoming acknowledgement packet bytes. Therefore, when a data packet has been transmitted by a particular DLC, and the acknowledgement packet for that data packet comes back to the DLC, the DLC stores the acknowledgement in the transmit buffer from which the outgoing data packet was taken in a known position relative to the data packet for which it is an acknowledgment.

Returning to FIG. 24, the rest of the receive cycle will be described. After the receiver executive machine 900 has transferred to the state 80, and the output signal START on the line 930 has been activated, the receiver executive machine 900 begins looking for a closing flag indicating the end of the incoming packet. This function is embodied in the states 80, 81, 83, 82, 86 A0, 84, and 85. Since the flag character is a zero followed by six ones followed by a zero, the receiver executive will stay in the state 80 as long as the incoming data is a logic zero as symbolized by the line 1000. When the first logic one comes in on the RxDATA line, control is transferred to the state 81 as symbolized by the line 1002. If, while in the state 81, a logic zero is the next bit, control will be transferred back to the state 80 as symbolized by the line 1004. If the next bit coming in is a logic one however, control will be transferred from the state 81 to the state 83 as symbolized by the line 1006. Likewise, while in the state 83, if the next bit is a logic zero, control will be transferred back to the state 80, whereas if the next bit is a logic one, control will be transferred to the state 82. The same is true for states 82, 86, and A0.

When the state A0 is reached, a new output is generated by the receiver executive machine in addition to the START signal on the line 930. That output is the DEL∅ signal on the line 988. Having reached the state A0, the receiver executive 900 knows that five successive ones have just been received. Therefore, a zero bit will be present which has been inserted by the transmitting DLC, but which is not really part of the actual data if the incoming data is data and not a closing flag. The receiver executive will generate the signal $\overline{\text{DEL}\emptyset}$ at this time to cause this inserted zero data bit to be ignored by the receiving apparatus so as to restore the data to its original state. The $\overline{\text{DEL}\emptyset}$ signal on the line 988 is coupled to the gate circuit 986 in FIG. 19 and disables the RxCLK signal 162 such that one clock cycle is omitted and no shifting occurs by the serial to parallel shifter 954 during the omitted clock cycle. The $\overline{\text{DEL}\emptyset}$ signal on the line 988 is also coupled to the CRC logic 962 to prevent the RxCLK signal from reaching the CRC logic so as to track the operations of the serial to parallel shifter 954.

Once the state 84 is reached, the receiver executive 900 knows that six logic ones have arrived in sequence and that there is a possibility that a closing flag is arriving.

If the incoming data bits are part of a data packet, then the inserted zero will be deleted and the inserted zero on the RxDATA line 160 will cause the receiver executive 900 to transfer from the state A0 to the state 80 via the path 1008. The receiver executive will then continue to look for a closing flag using the states 80 through A0 as previously described. However, if the incoming data bit is a 1 while the receiver executive is in the state A0 then transfer to the state 84 will be made as represented by the path 1010. In the state 84, six consecutive logic one bits will have been received which should only occur during the reception of a closing flag.

Once the receiver executive reaches the state 84, it is assumed that if the next incoming data is not a logic zero then there is something wrong. Therefore the receiver executive transfer to the state 07 if the incoming data bit is logic one as represented by the path 1012. The state 07 is intended to shut the DLC down because the DLC does not reach 07 unless there is something wrong. The path 1014 symbolizes the fact that the receiver executive will stay in the state 07 as long as the S.CAR.DET signal is active. The state 07 is also reached from any state in the machine when the input signal $\overline{\text{NOT.MY.DA}}$ is active and the signal KILL.Rx is inactive and the signal S.CAR.DET is active as the line symbolized by the path 1020. From the state 07 the receiver executive will make the transition to the idle state 00 if either the KILL.Rx signal becomes active or the S.CAR.DET signal becomes inactive as symbolized by the path 1018. The idle state 00 will also be reached from any state in the machine if either the KILL.Rx signal becomes active or the S.CAR.DET signal becomes inactive as symbolized by the path 1022.

Returning to the state 84, if the incoming data bit is a logic zero then a closing flag will have been received and transferred to the state 85 will be made as symbolized by the path 1024. When a state 85 is reached, the receiver executive will make a transition to either the state 40 or the state 10 depending upon the condition of the CRC.ERR signal on the input line 966. If there has been an error in the received data, then CRC.ERR will be active and transition will be made to the state 40 as symbolized by the path 1028. In the state 40, the receiver executive makes the signal $\overline{\text{BAD.CRC}}$ on the line 1026 active. The signal $\overline{\text{BAD.CRC}}$ goes to the status register 670 in FIG. 19 where it is latched and can be read by the client data processing unit.

If there was no CRC error then transition will be made to the state 10 as symbolized by the path 1032 in FIG. 24. In the state 10, the output signal $\overline{\text{RxDONE}}$ on the line 1030 is made active. The signal $\overline{\text{RxDONE}}$ is coupled to the status register 670 in FIG. 19 where it sets a flag which can be read by the client data processing unit. $\overline{\text{RxDONE}}$ is also coupled to the start of packet address latch 679 in FIG. 19 to signal it to store the receiver address pointer such that the first byte of the next incoming data packet can be stored in succeeding address in the received buffer. The state 10 indicates that a packet has been received and there has been no error. One clock cycle later the receiver executive transfers to the idle state 00 as symbolized by the path 1034.

Referring to FIG. 25, there is shown a timing diagram of the receive cycle. The receive cycle starts at the end of the opening flag as illustrated on line C with the signal $\overline{\text{LD.RxADDR}}$ on line D becoming active as illustrated at 930. This occurs in the middle of bit 7 of the opening flag. The $\overline{\text{LD.RxADDR}}$ signal on the line 924 causes the DLC to begin preparation for receiving the data packet by loading the receiver at the address pointer to the receiver address register 678 in FIG. 19, initializing the CRC logic 962 and enabling the end of FIFO address circuit 672 so that the FIFO address comparator 942 can monitor the filing of the FIFO receive buffer.

One bit later, the $\overline{\text{START}}$ signal on line E in FIG. 25 becomes active on the line 930 in FIG. 24. The $\overline{\text{START}}$ signal is coupled to the enable input of the receiver address register 678 to cause it to start counting bytes for purposes of keeping track of the receive address pointer.

Following the opening flag, the destination address data is received. To illustrate the zero bit deletion aspect of the invention, assume that five logic ones are received during the destination address field reception. The $\overline{\text{DEL}\emptyset}$ signal on the line F becomes active upon reception of the fifth consecutive logic one as illustrated at 1040 in FIG. 25. The $\overline{\text{DEL}\emptyset}$ signal causes one cycle of the BIT.CLK signal illustrated on line G of FIG. 25 to be omitted as illustrated at 1042. The BIT.CLK signal is derived from the RxCLK signal 162 in FIG. 19b after passing through the gate circuit 986. The clock signal on a line 1134 drives the serial to parallel shifter 954. The omission of one clock cycle in the BIT.CLK signal causes the serial to-parallel shifter 954 to make no shift during the omitted cycle thereby deleting the inserted zero bit as illustrated at 1044 on line C of FIG. 25.

During the eighth bit, the signal $\overline{\text{BYTE.CLK.EN}}$ on the line H of FIG. 25 becomes active as illustrated at 1046. The $\overline{\text{BYTE.CLK.EN}}$ signal is generated by the receiver bit counter 960 in FIG. 19b which was enabled to count the bit times of the $\overline{\text{BIT.TIME}}$ signal on line 1134 upon reception of the START signal on the line 930. After eight bit times have passed after the change of state of the START signal, the $\overline{\text{BYTE.CLK.EN}}$ signal on a line 1135 is generated. The $\overline{\text{BYTE.CLK}}$ signal enables the byte latch 958 causing it to receive and store the first eight bits of received data. The gate circuit 986 in FIG. 19b receives the $\overline{\text{BYTE.CLK.EN}}$ signal and generates the $\overline{\text{BYTE.CLK}}$ signal on the line 984. The $\overline{\text{BYTE.CLK}}$ signal is coupled to the receiver timing generator 982 and causes the $\overline{\text{SRC.CLK}}$ signal on the line 990 to be generated. The $\overline{\text{BYTE.CLK}}$ signal illustrated on line I of FIG. 25 is generated during the $\overline{\text{BYTE.CLK.EN}}$ signal as illustrated at 1048.

The signal $\overline{\text{CHECK.DA}}$ on the line J of FIG. 25 becomes active after the first eight bits have been received following the opening flag as illustrated at 1052. The signal $\overline{\text{CHECK.DA}}$ is generated by the receiver timing generator 982 on a line 1050 and is coupled to the address comparator 968 in FIG. 19 to cause it to compare the destination address on the receiver data bus 960 to the device address held in the device address register 814. This comparison determines whether the incoming data packet is intended for this particular DLC. If the destination address matches the device address in the device address register 814, the signal $\overline{\text{MY.DA}}$ illustrated on the line M of FIG. 25 will remain active. The signal $\overline{\text{NOT.MY.DA}}$ may become active shortly after the signal $\overline{\text{CHECK.DA}}$ becomes active.

After the destination address field in the incoming data packet is completely received, the source field of eight bits is received. After the eight bits of the source field have been received, the signal $\overline{\text{BYTE.CLK.EN}}$ once again becomes active as illustrated at 1060 in FIG. 25. The $\overline{\text{BYTE.CLK}}$ signal then becomes active as illustrated at 1062. When the $\overline{\text{BYTE.CLK}}$ signal becomes active as at 1062, the receiver timing generator 982 in FIG. 19 causes the signal $\overline{\text{CHECK.DA}}$ to become true as illustrated at 1064. The concurrence of $\overline{\text{CHECK.DA}}$ becoming active at 1064 and $\overline{\text{BYTE.CLK}}$ becoming inactive at 1062 causes the receiver timing generator 982 to cause the $\overline{\text{SRC.CLK}}$ signal on the line 990 in FIG. 19 to become active as illustrated at 1066 in FIG. 25. The source address latch 808 in FIG. 19 latches in the eight bits of the source address field on the receiver data bus 960 upon the rising edge of $\overline{\text{SRC.CLK}}$. This source address will later be used as the destination address of an acknowledgment packet if an acknowledgment packet is sent. Upon the third occurrence of the $\overline{\text{BYTE.CLK}}$ pulse at 1063 in FIG. 25, the $\overline{\text{SRC.CLK}}$ signal once again becomes inactive as illustrated at 1067.

After the source address field has been received, an eight bit "type" field is received which indicates the type of data packet which follows. The end of the type field is designated at 1070 in FIG. 25.

Following the type field, a number of eight bit data bytes follow with each data byte marked at its end by an occurrence of the $\overline{\text{BYTE.CLK.EN}}$ signal and the $\overline{\text{BYTE.CLK}}$ signal as shown at 1071 and 1073 respectively.

Following the last data byte, two eight bit CRC bytes are transmitted. The end of the second CRC byte is illustrated at 1072 in FIG. 25.

An eight bit flag follows the end of the CRC byte. Upon the occurrence of the last bit of the eight bit flag, the $\overline{\text{START}}$ signal becomes inactive as illustrated at 1075. The downward transition at 1076 of the $\overline{\text{RxCLK}}$ signal illustrated at line A of FIG. 25 marks the reception of the eighth bit of the closing flag. One bit later, the signal CRC.ERR, illustrated on line N, becomes true or false depending upon whether an error has been detected in the incoming data packet as illustrated at 1074.

Figure 26A:
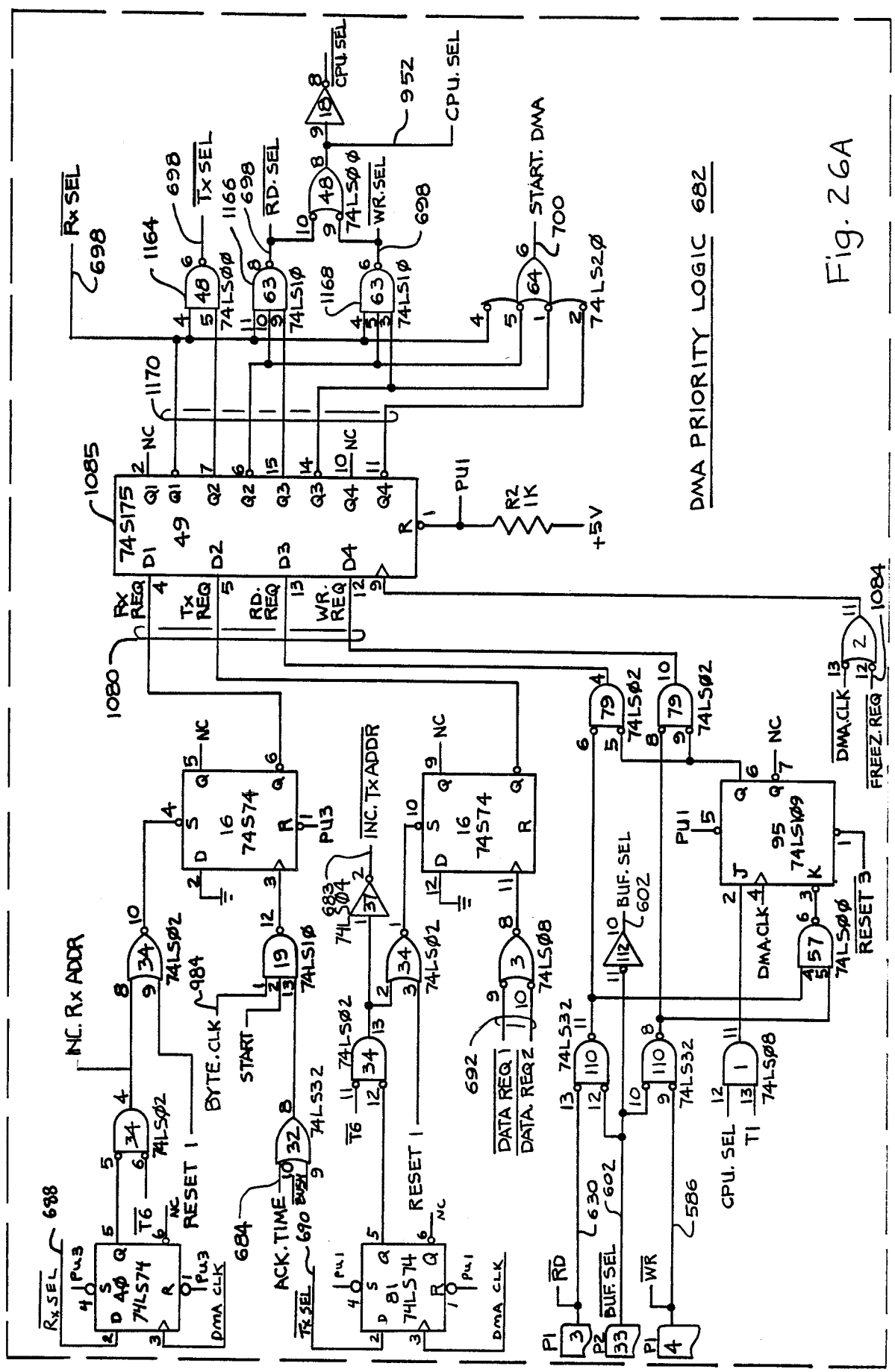
Figure 26B:
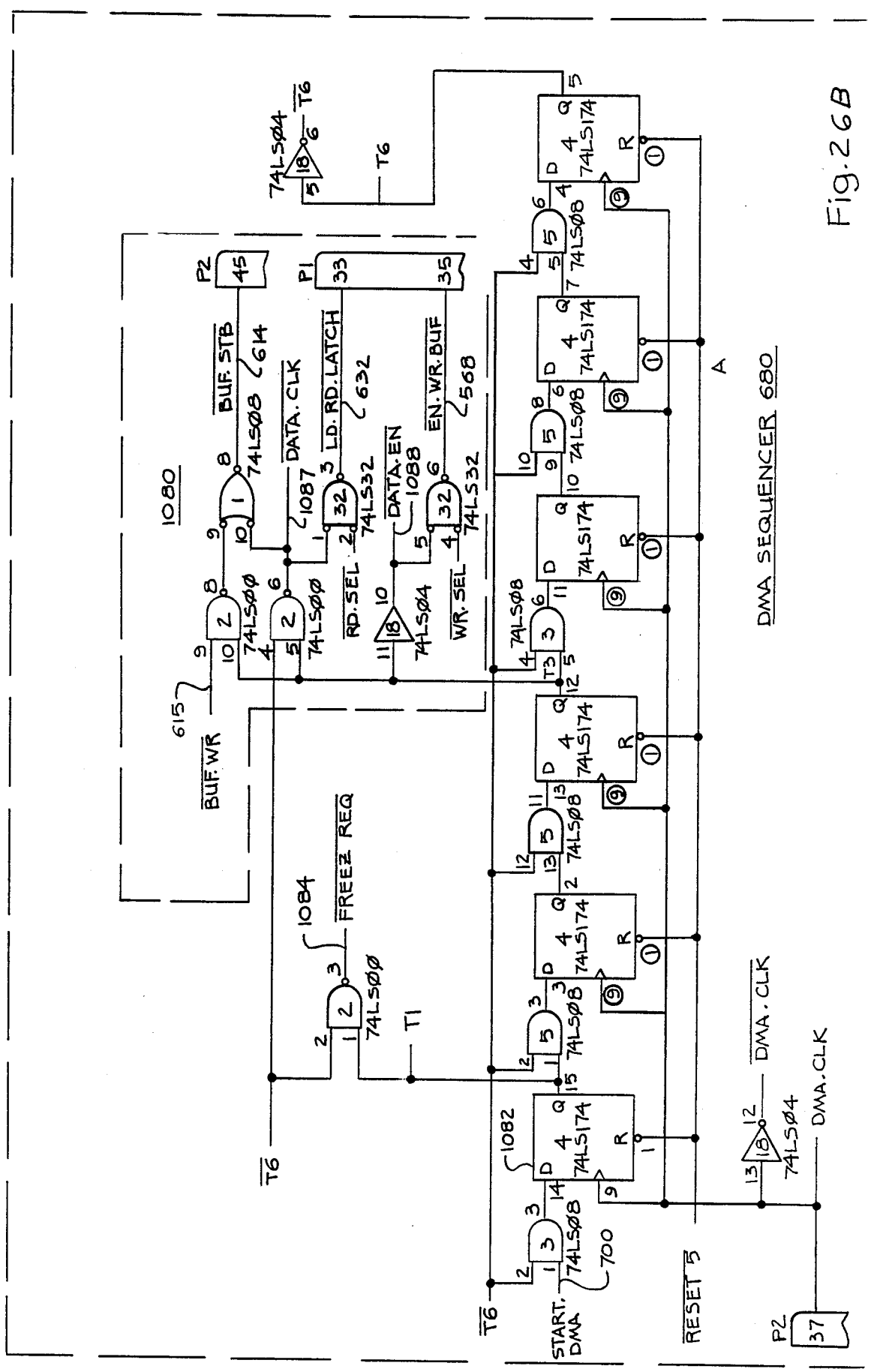

Referring now to FIGS. 26 through 41 there is shown a detailed logic diagram for the hardware of the data link controller system illustrated in FIG. 19. FIG. 26A shows the details of the DMA priority logic 682 in FIG. 19. The combinational logic feeding the quadruple D type flip-flop circuit 1085 combines the various requests for memory access into a set of four memory requests on the bus 1080. The logic to the right of the flip-flops 1085 converts the outputs of the flip-flops into a prioritized collection of memory address selection signals which are transmitted to the buffer address multiplexer 664 in FIG. 19 to control which of its three address bus inputs are coupled to the DLC address bus 582. The signal START.DMA on the line 700 is a combination signal derived from the four select signals on the bus 1170. The START.DMA signal is coupled to the DMA sequencer 680, the details of which are shown in FIG. 26(B).

The DNA sequencer 680 is essentially a shift register which shifts the START.DMA signal through to the output of each flip-flop upon each cycle of each DMA.CLK signal. The DMA.CLK signal is a variable rate signal which must be at least two times the data rate. The purpose of the DMA sequencer is to establish a sequence of timing signals which are used to control the DMA memory cycle for obtaining data from the RAM 571 in FIG. 18. Upon the occurrence of the first DMA.CLK cycle, the flip-flop 1082 shifts the START.DMA signal on line 700 through to its Q output which is designated the signal T1. Likewise, the signal from the Q output of each of the following flip-flops is designated a timing signal T2, T3 etc.

Figure 42:
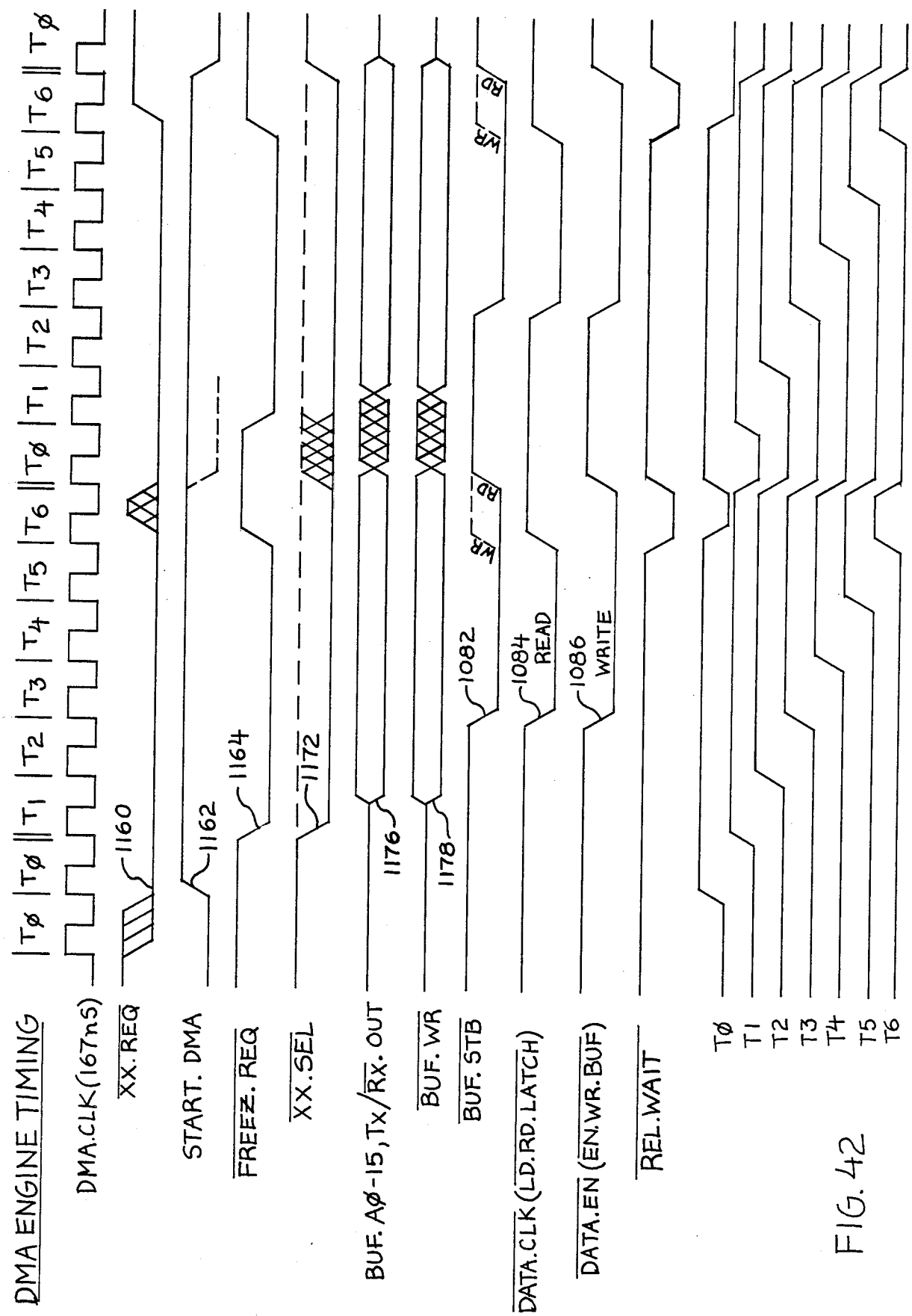
FIG. 42 is a timing diagram of the relationship of various signals involved in direct memory access operations by the DLC.

The operation of the DMA sequencer is best understood by referring to FIG. 42 which is a timing diagram of the DMA engine timing. The assertion of a request for access to the RAM 571 is illustrated at 1160. This request causes the signal START.DMA to be asserted true as illustrated at 1162. Shortly after START.DMA becomes active, the signal $\overline{\text{FREEZ.REQ}}$ is asserted at approximately the onset of the timing period T1 as illustrated at 1164. In FIG. 26B, the signal $\overline{\text{FREEZ.REQ}}$ on the line 1084 is generated by a gate having one input coupled to the T1 timing signal and the other input coupled to the T6 timing signal generated from the output of the last flip-flop in the DMA sequencer. The relative timing of the timing signals T0 through T6 is illustrated at the bottom of FIG. 42.

The signal $\overline{\text{FREEZ.REQ}}$ is coupled to a NAND gate in FIG. 26A the other input of which is coupled to the DMA.CLK signal and the output of which is coupled to the clock input of the quad flip-flop circuit 1085. The $\overline{\text{FREEZ.REQ}}$ signal serves to freeze out all other requests from being passed through the quad flip-flop circuit 1085 by blocking the DMA.CLK signal from being passed through to the clock input of the circuit 1085 when $\overline{\text{FREEZ.REQ}}$ is asserted. This prevents the priority gates to the right of the latch 1085 from changing the select signal in the case that a higher priority request comes in.

Returning to FIG. 42, after $\overline{\text{FREEZ.REQ}}$ is asserted, the specific select signal corresponding to the highest priority request is isolated by the gates 1164, 1166 and 1168. After the designated select signal is asserted during time T1, the selected address is placed by the buffer address multiplexer on the BUF.A0 through BUF.A15 lines of the DLC address bus 582, and the signal Tx/$\overline{\text{Rx}}$.OUT is asserted as illustrated at 1176. At approximately the same time, the signal $\overline{\text{BUF.WR}}$ on the line 615 is asserted either high or low depending on whether the DMA cycle is a read or a write cycle as illustrated at 1178.

During the time T3 the signals $\overline{\text{BUF.STB}}$ and LD.RD.LATCH, or EN.WR.BUF are asserted as illustrated at 1082, 1084 and 1086 respectively to carry out the DMA cycle.

Figure 27:
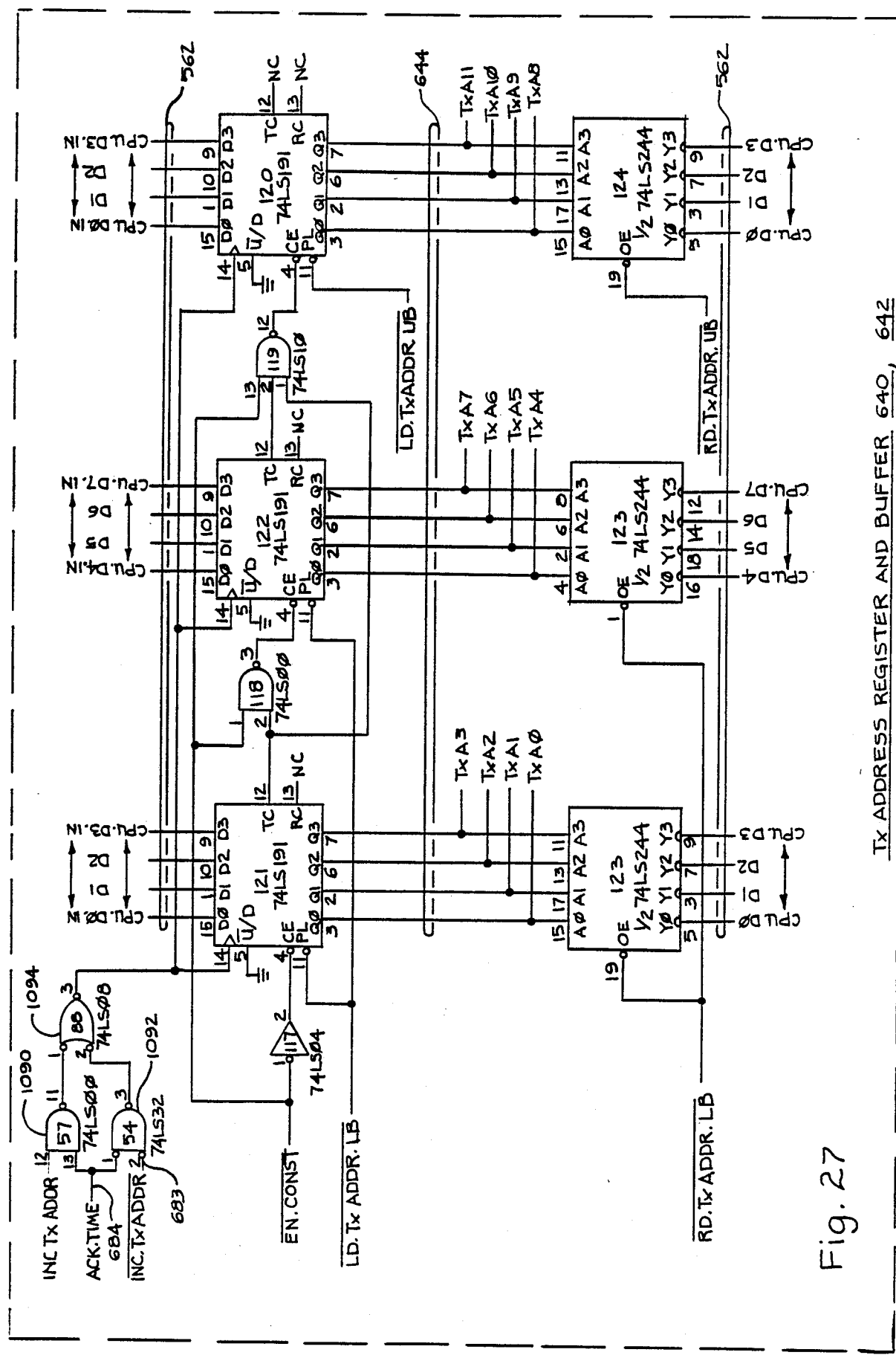

Referring to FIG. 27 there is shown a logic diagram of the transmit address register and buffer circuits 640 and 642 in FIG. 19. The gates 1090, 1092 and 1094 serve to combine the $\overline{\text{RxDATA.EN}}$, $\overline{\text{ACK.TIME}}$ and $\overline{\text{INC.TxADDR}}$ signals so as to increment the transmit address register pointer during acknowledgment time so that incoming acknowledgment packet will be placed in the transmit buffer immediately adjacent the data packet for which the ack packet is an acknowledgment.

Figure 28:
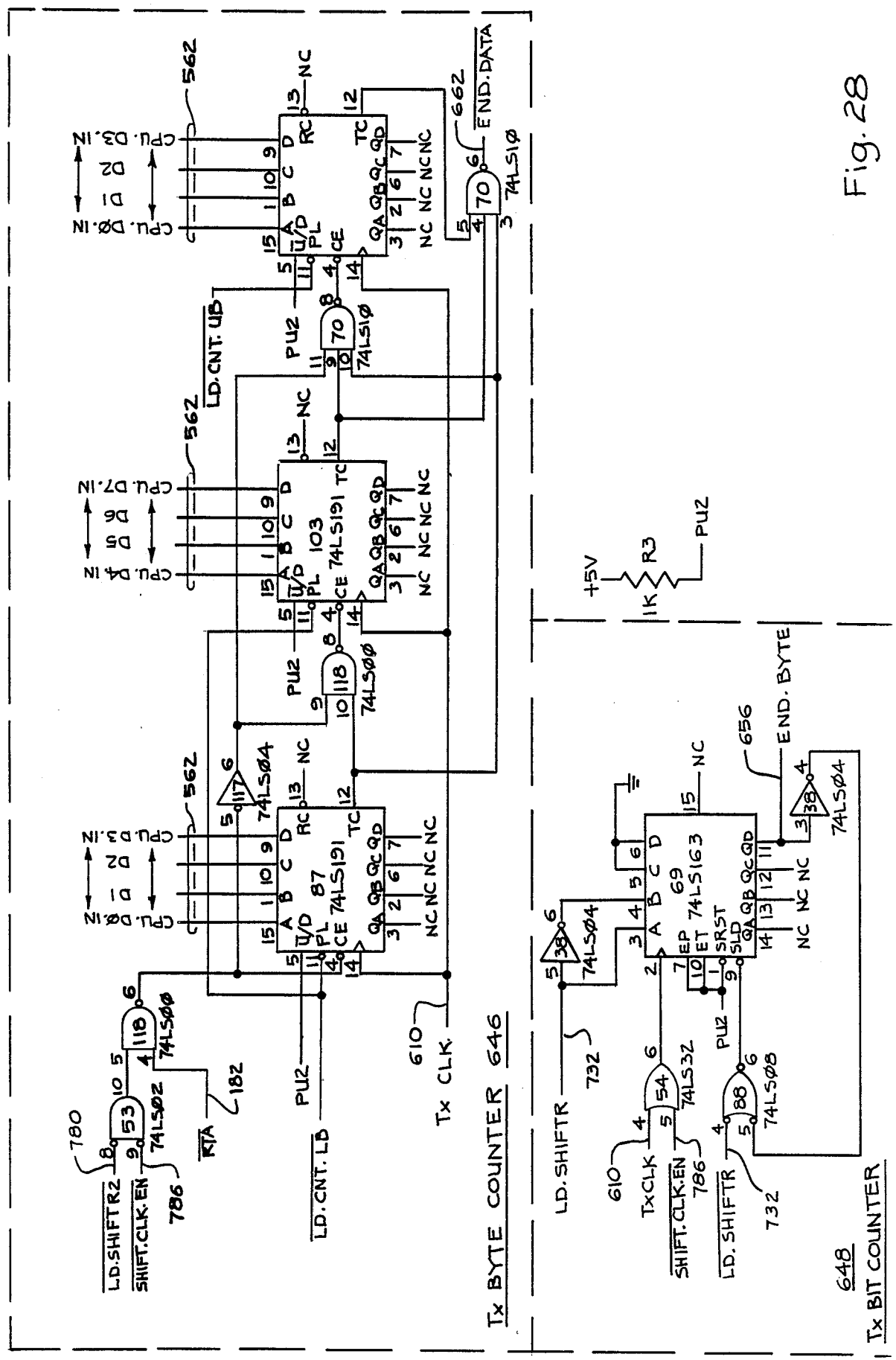

Referring to FIG. 28 there is shown the logic for the transmit byte counter 646 and the transmit bit counter 648. The function of these two counters will be apparent to those skilled in the art upon inspection of FIG. 28 in light of the discussion of FIG. 19 herein.

Figure 29A:
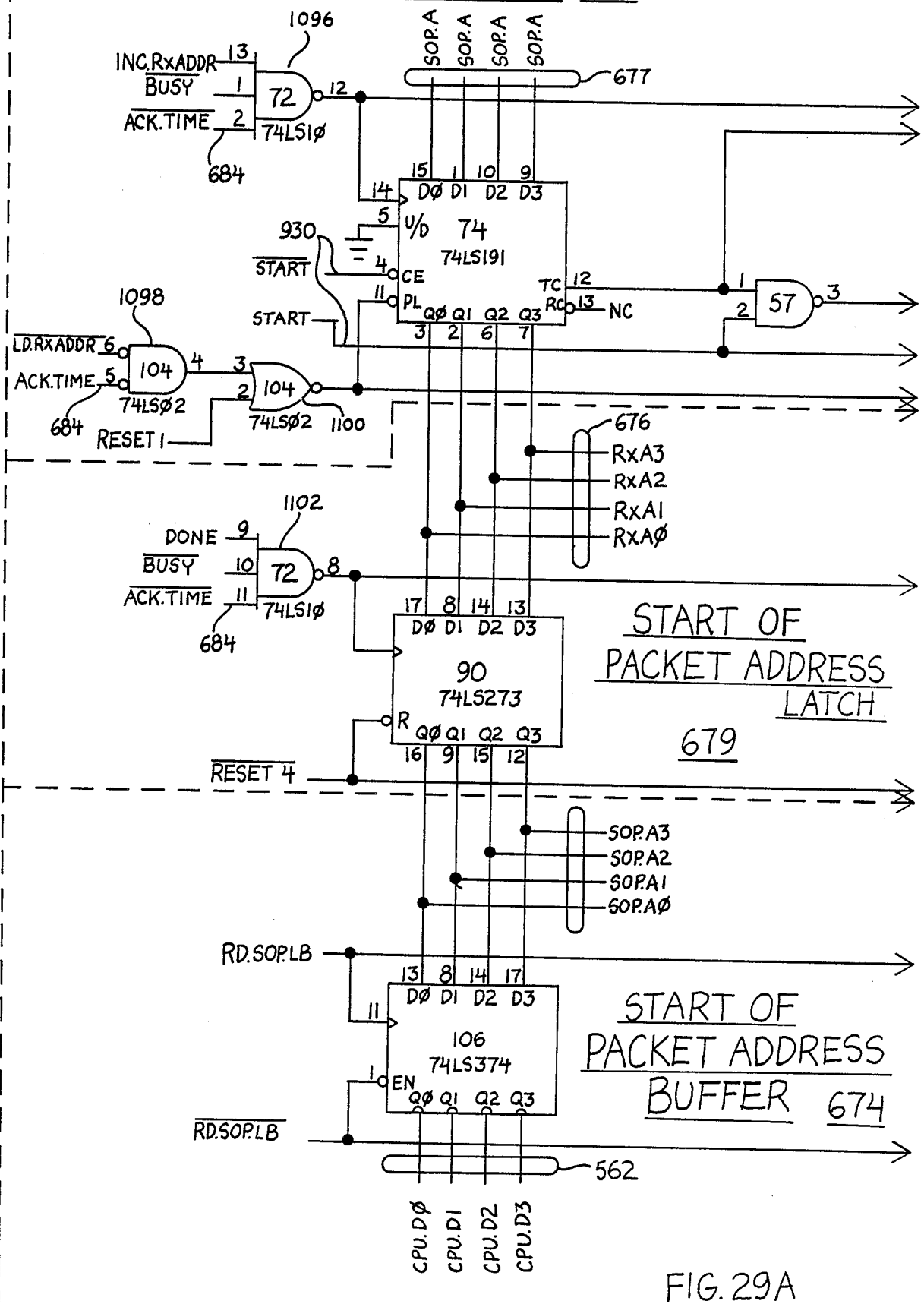
Figure 29B:
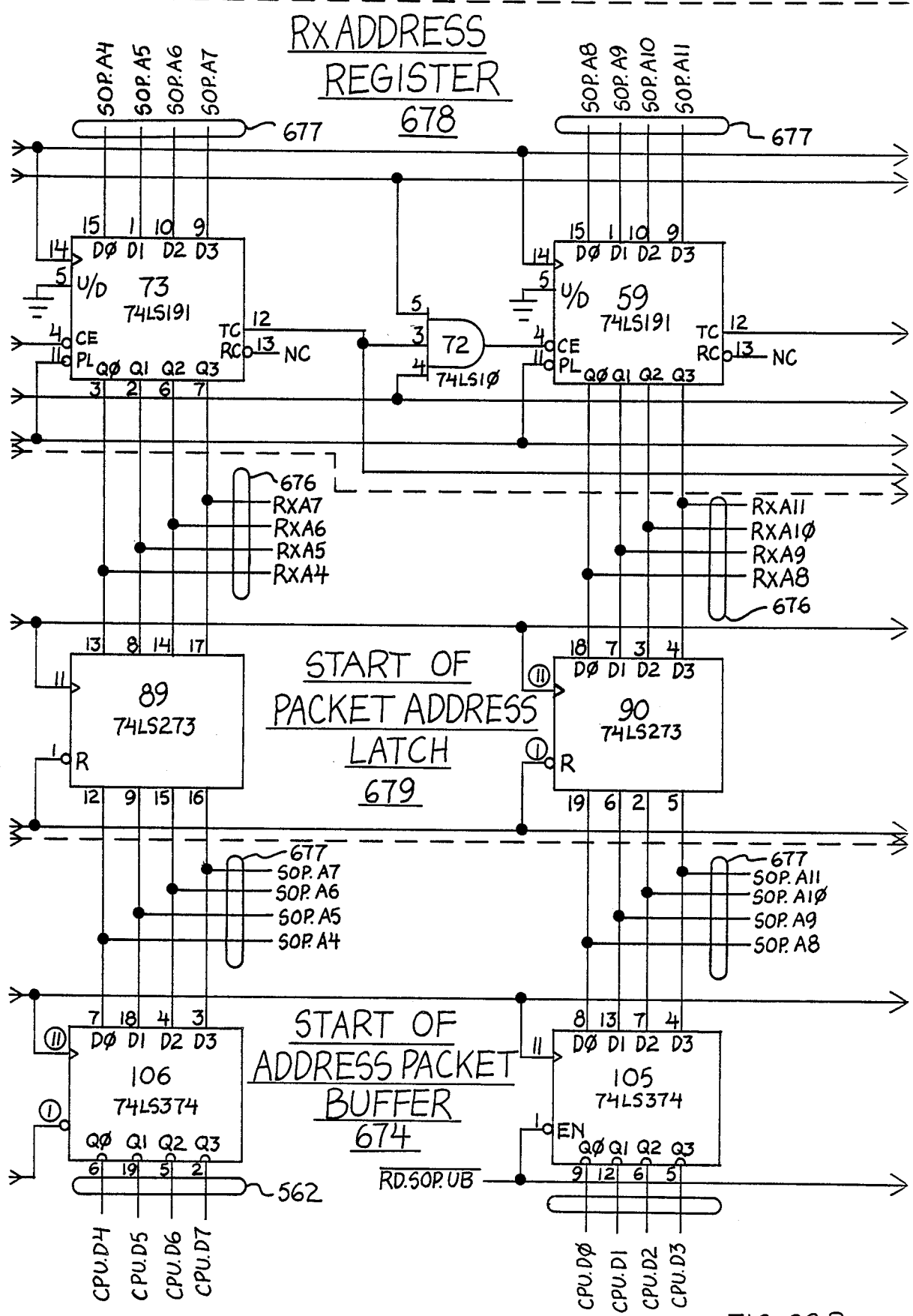
Figure 29C:
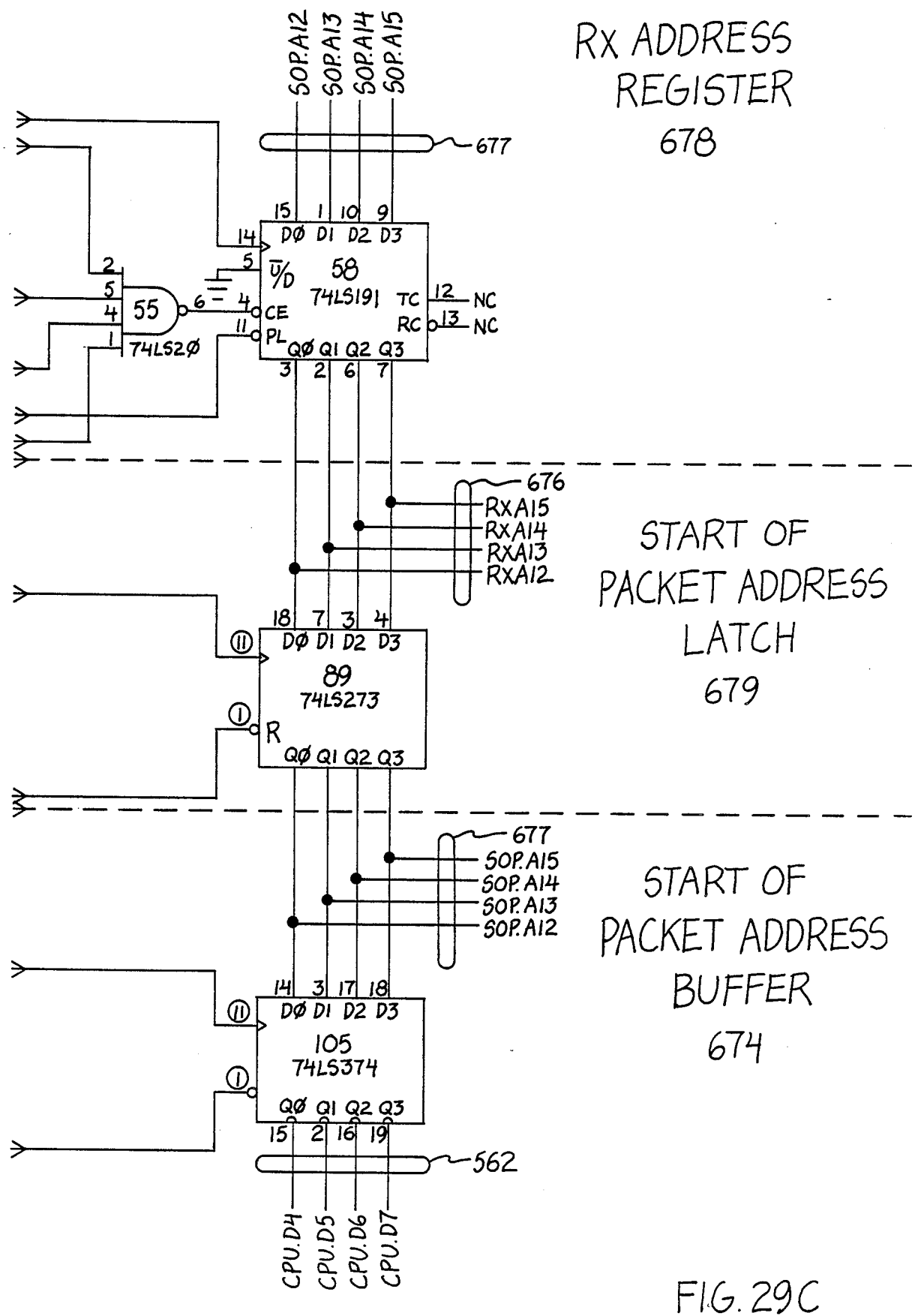

FIGS. 29A, B and C are the logic for the receiver address register 678, the start of packet address 679 and the starter packet address buffer 674. The reader is urged to assemble FIGS. 29A, B and C to make a complete logic diagram of the functional blocks in FIG. 29. The receiver address register 678 is normally incremented by the receiver executive machine 900 in FIG. 19. However during acknowledgement time, incrementation is inhibited by the action of gates 1098 and 1100 in FIG. 29A. During acknowledgment time, the transmit address register is incremented since the acknowledgment packet goes into the transmit buffer instead of the receive buffer.

The start of packet address latch 679 normally loads the receiver address register with the receive address pointer. However, this loading is inhibited during acknowledgment time by the action of the gate 1102 in FIG. 29A so that the incrementing to a new address for the receiver pointer which is normally done at the end of reception of a good packet is inhibited during acknowledgment time so that the start of packet address will not be updated by receipt of a good acknowledgment packet. This is necessary because the acknowledgment packet is placed in the transmit buffer and it is not desired to change the receive address pointer after an acknowledgment packet comes in.

Figure 30A:
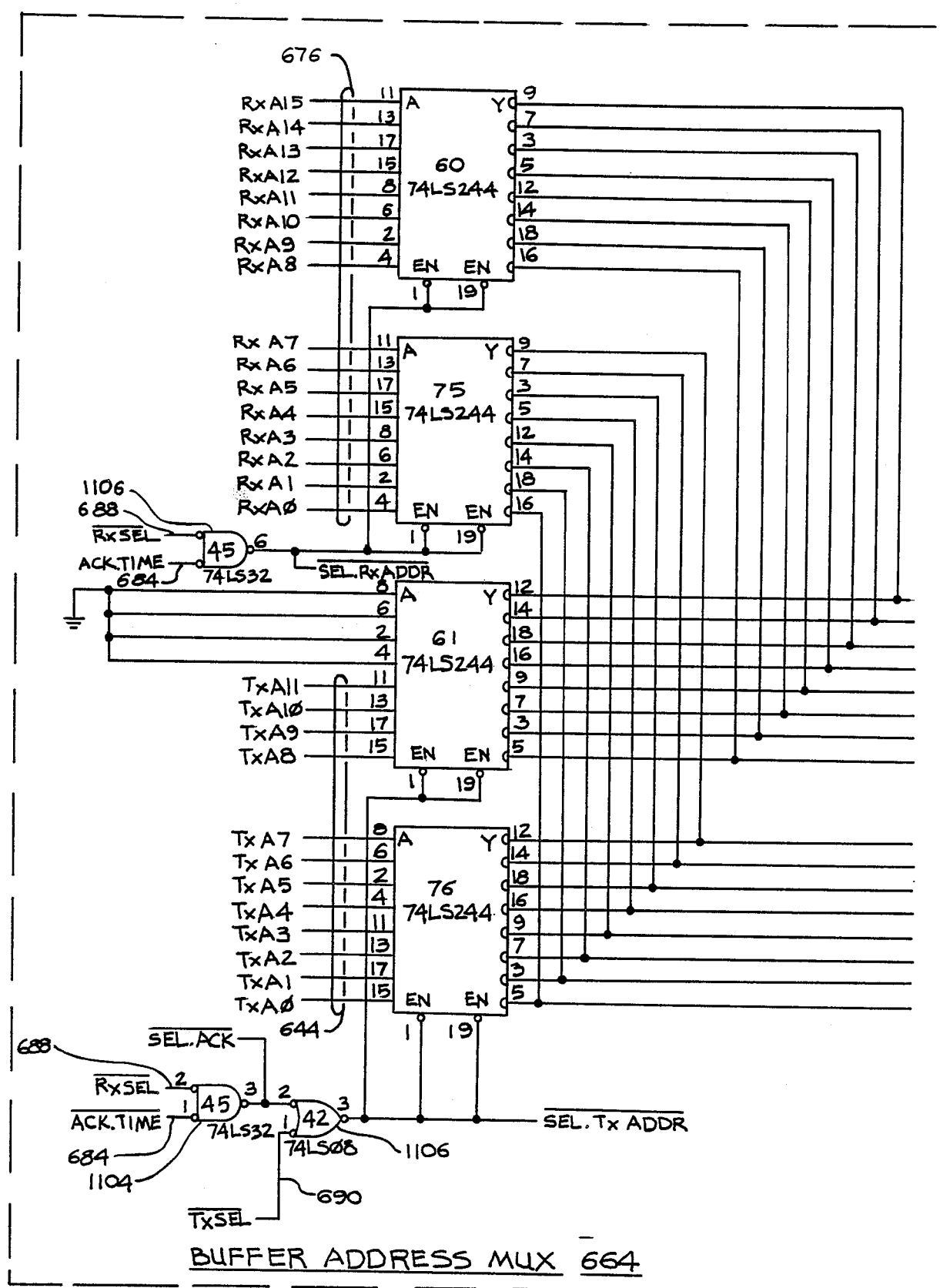
Figure 30B:
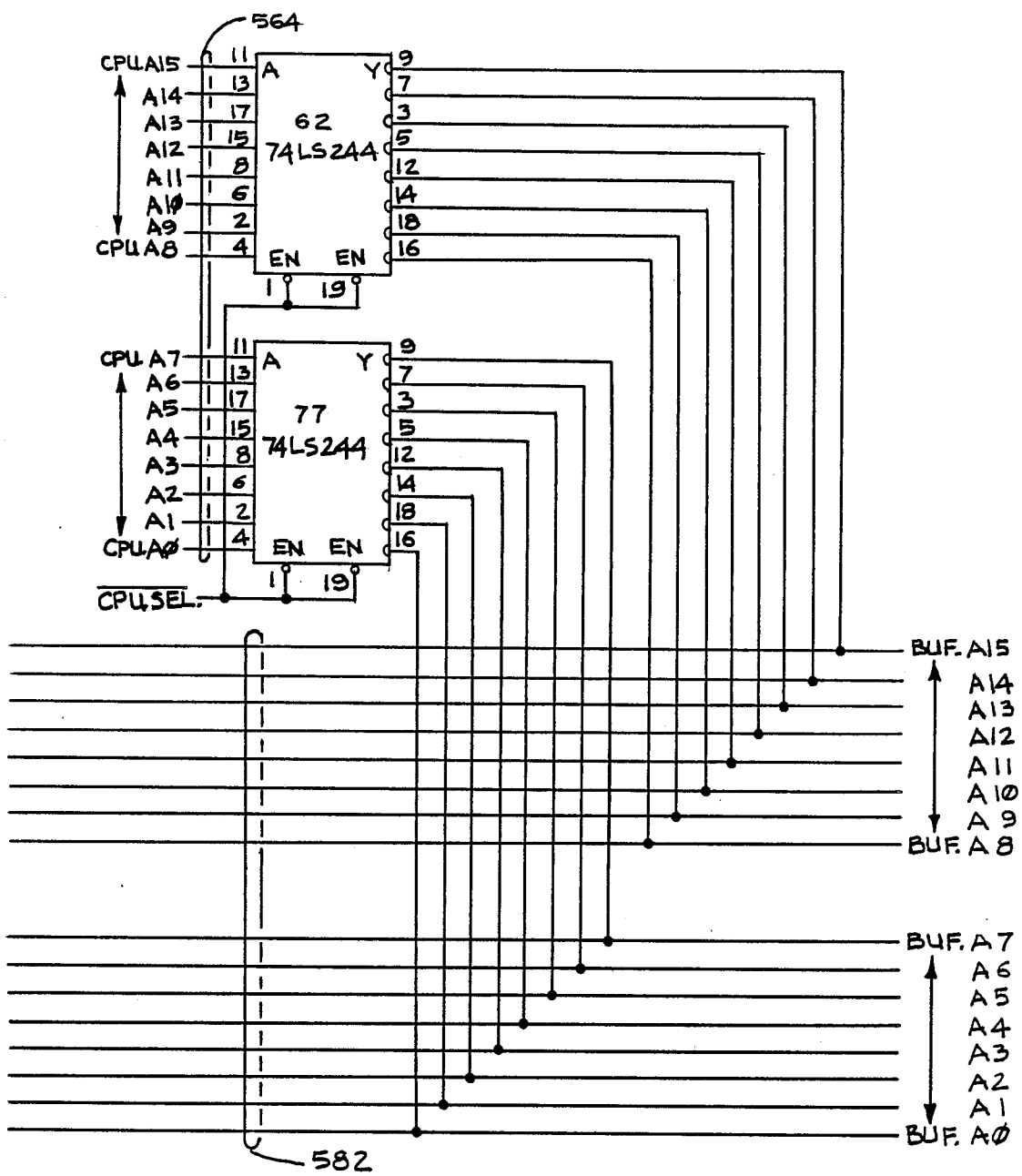

FIGS. 30A and 30B show the address selection portion of the buffer address multiplexer circuitry 664 in FIG. 19. The $\overline{ACK.TIME}$ signal on the line 684 is combined with the $\overline{RxSEL}$ signal on the line 688 in a gate 1106 to cause the transmit address pointer to be used during reception of an acknowledgment packet such that the acknowledgment packet is placed in the transmit buffer instead of the receive buffer.

FIG. 31A details the logic for the buffer control logic in the buffer address multiplexer 664 and the CPU wait logic 950. The details of operation of these two logic circuits will be apparent to those skilled in the art given the functional description of them in FIG. 19.

FIG. 31B details the logic of the receive buffer 980 and the transmit latch 720. The details of operation of these two circuits will be apparent to those skilled in the art.

Figure 32:
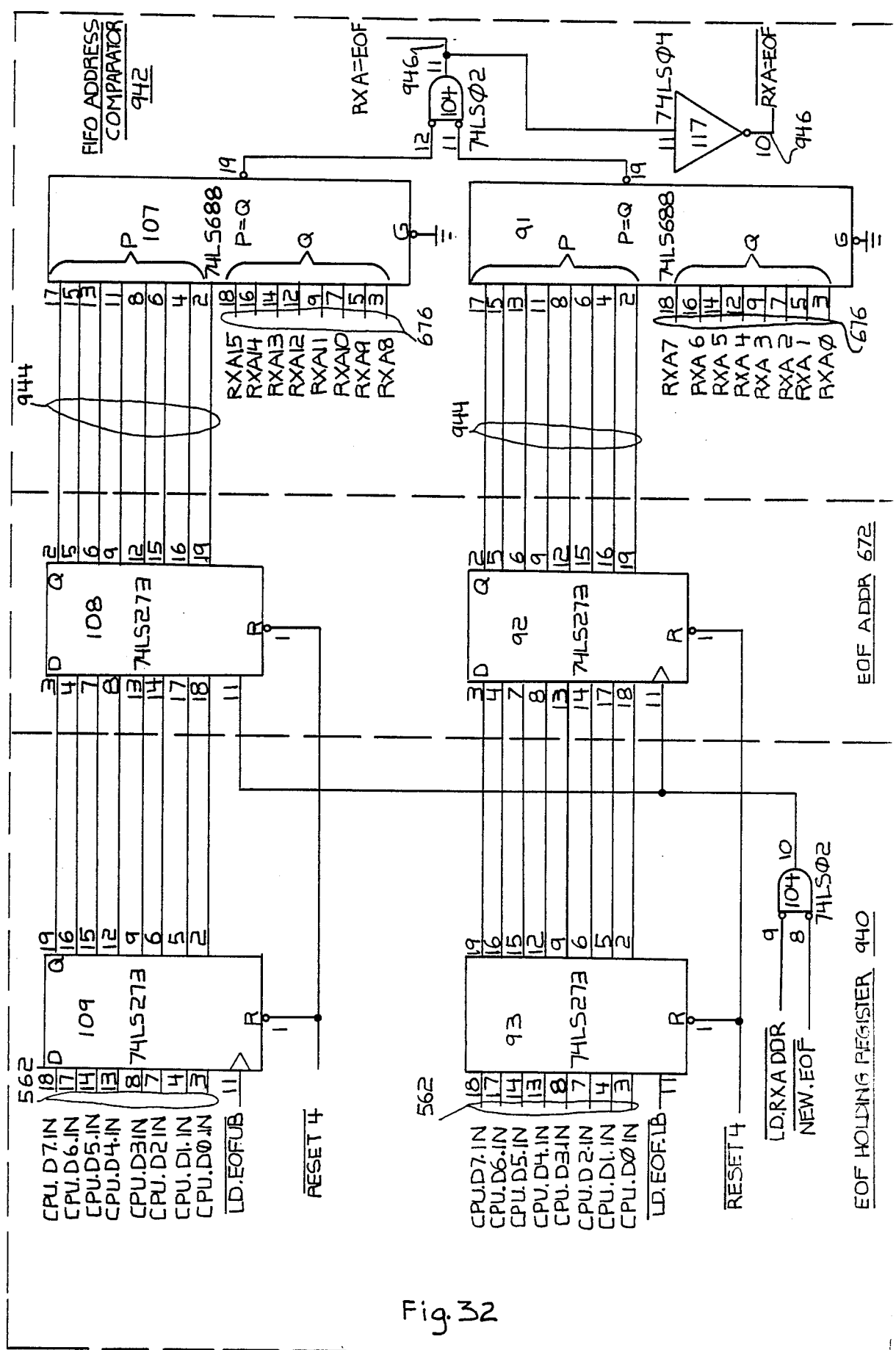

Referring to FIG. 32, there is shown the details of the end of FIFO holding register 940, the end of FIFO address register 672 and the FIFO address comparator 942. The details of operation of these circuits will be apparent to those skilled in the art given the functional description of them in FIG. 19 and the details of the circuit of topology given in FIG. 32.

Referring to FIG. 33, there is shown the detail of the logic for the end of FIFO control logic 839 in FIG. 19A. The details of operation of this logic circuit will be apparent to those skilled in the art.

Referring to FIG. 34A, there is shown the logic circuitry for the FIFO controller 836. This circuit constitutes a sequential machine the state diagram of which is shown at the bottom of FIG. 34A. The details of operation will be apparent to those skilled in the art.

Referring to FIG. 34B, there is shown the logic circuitry for the acknowledgment type circuit 830 in FIG. 19A and the receiver status register 670. The acknowledgment type circuit 830 generates a byte on a transmit data bus 730 which varies in accordance with the status of the busy signal on the line 948 from the busy logic 832. The receiver status register 670 stores the status of the busy signal for reading by the CPU when necessary.

Figure 35B:
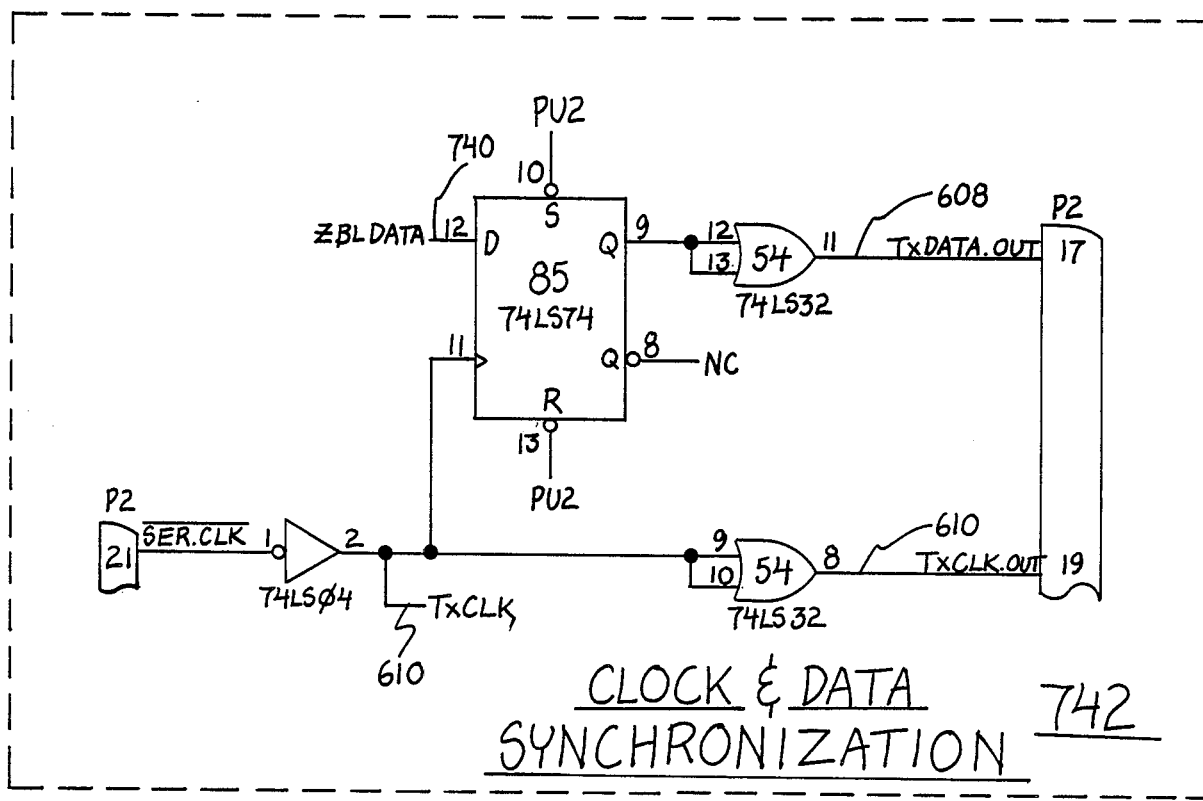

Referring to FIG. 35A, there is shown the logic circuitry for the sync/flag register 726, the parallel to serial shifter register 722 and the CRC generator 784. FIG. 35B shows the logic of the clock and data synchronization circuit 742. The details of operation on these circuits will be apparent to those skilled in the art given the functional description of their operation made in connection with the discussion of FIG. 19.

Figure 36A:
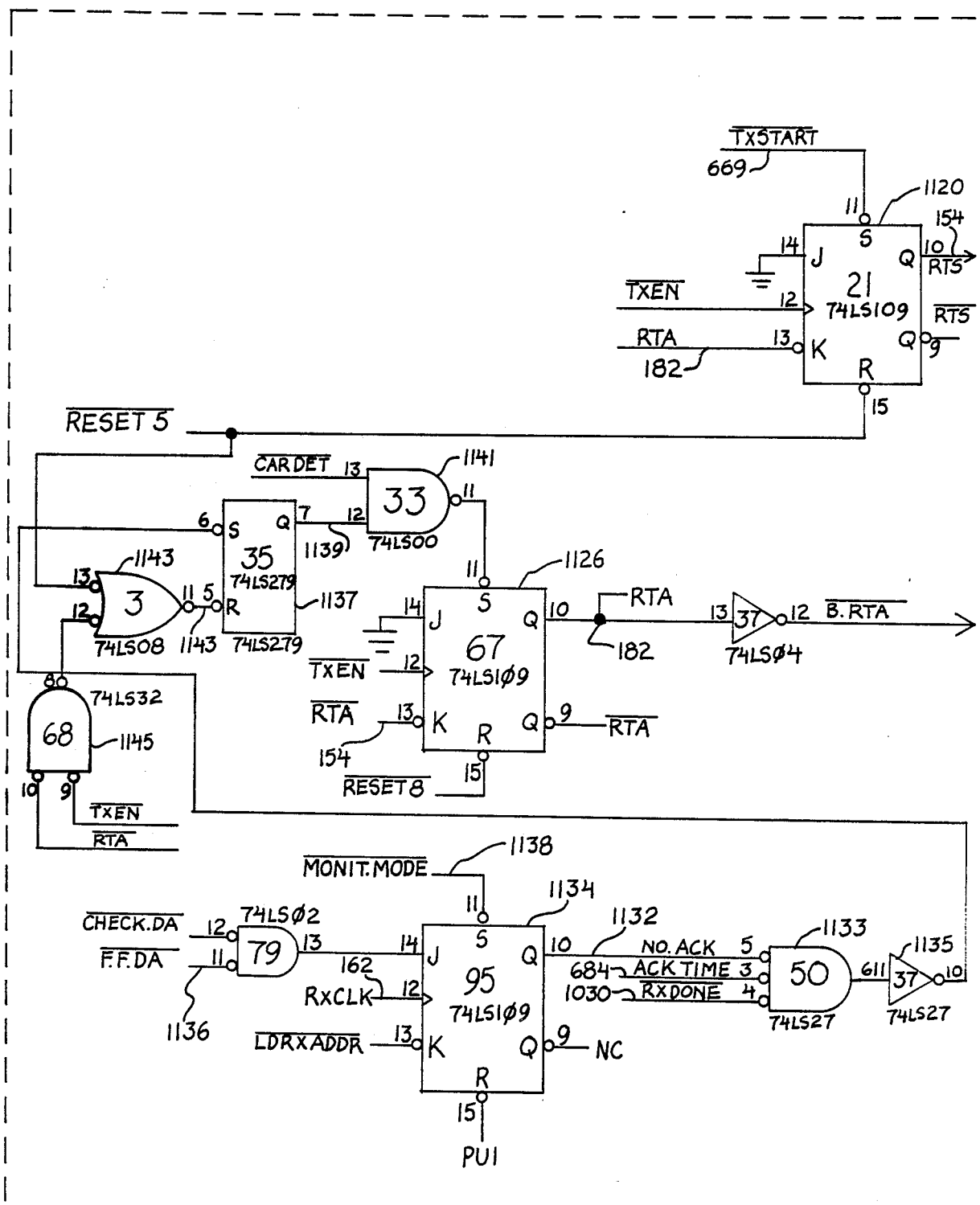
Figure 36B:
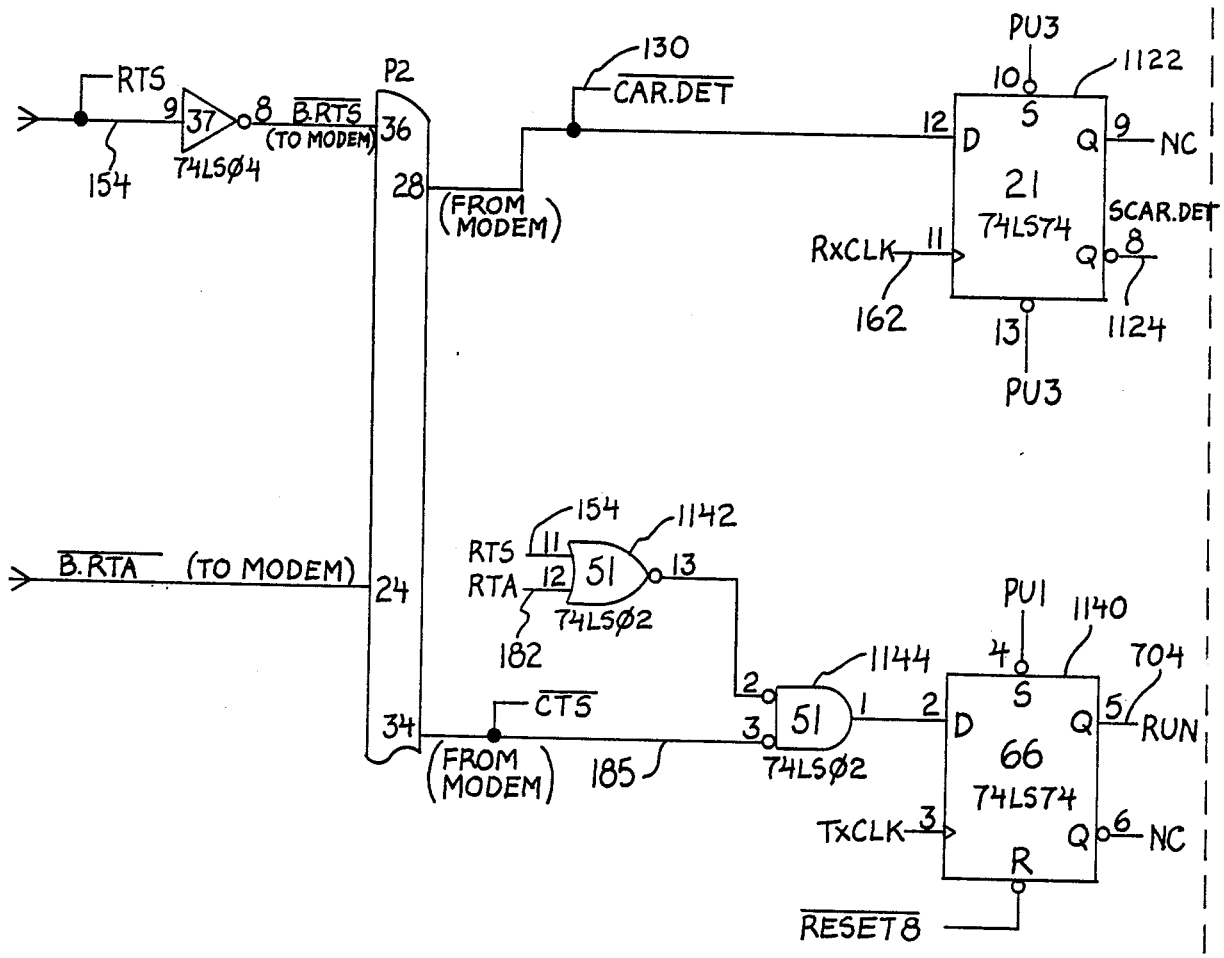

Referring now to FIGS. 36A and 36B, there is shown the logic circuitry for the control interface circuit 686 in FIG. 19B. The flip-flop 1120 is used to generate the $\overline{RTS}$ signal on the line 154. The chain of events to generate the $\overline{RTS}$ signal is initiated when the $\overline{TxSTART}$ signal on the line 669 is activated under the control of the CPU 516 in FIG. 18 via the control register 668. The $\overline{TxSTART}$ signal on the line 669 is applied to the set input of the flip-flop 1120. The $\overline{TxSTART}$ signal is a low-going pulse from the CPU which sets the flip-flop 1120, thereby activating the $\overline{RTS}$ signal on the line 154, which is sent to the modem. The $\overline{RTA}$ signal on the line 182 is normally low and will not prevent the setting of the flip-flop 1120 to assert $\overline{RTS}$. The $\overline{RTA}$. The $\overline{RTS}$ signal, when active, merely locks out the reset toggling of the flip-flop 1120 by the $\overline{TxEN}$ signal. The $\overline{TxEN}$ signal is made active after the RUN signal is activated and serves to indicate that a packet is being transmitted when $\overline{TxEN}$ is active low and marks the end of a packet transmission when it returns to the inactive or high state. The RUN signal is asserted by the flip-flop 1140 in FIG. 36B, as will be explained below in more detail.

Briefly, the RUN signal is activated by the flip-flop 1140 after the $\overline{RTS}$ signal is sent to the modem and the modem returns with the $\overline{CTS}$ signal on the line 185. After the data packet has been sent, the transmit executive machine 650 deactivates the $\overline{TxEN}$ signal, which causes the flip-flop 1120 to be reset, which deactivates the $\overline{RTS}$ signal. The reason the $\overline{RTA}$ signal is applied to the $\overline{K}$ output of the flip-flop 1120 is to prevent the $\overline{RTS}$ signal from being asserted during transmission of an acknowledgment packet which might otherwise happen if the CPU signaled a desire to send another data packet via the $\overline{TxSTART}$ signal.

The $\overline{RTA}$ signal is asserted by the flip-flop 1126 when the DLC has received a good data packet and it is acknowledgment time. A further condition is that the data packet must not be part of a "broadcast" packet to which no acknowledgment is expected. These conditions are implemented by a three inverter input AND gate 1133. The gate 1133 is coupled through an inverter 1135 to the S input of an SR flip-flop 1137. When all the inputs to the gate 1133 are zero, the flip-flop 1137 will be set which makes the line 1139 high to the input of the NAND gate 1141. The NAND gate 1141 will cause the flip-flop 1126 to be set when the $\overline{CAR.DET}$ signal becomes inactive, indicating that the line has quieted down after the receipt of the incoming data packet.

The three prerequisite conditions implemented by the gate 1133 are indicated by the signals $\overline{RxDONE}$, ACK.TIME and NO.ACK $\overline{RxDONE}$ when active on the line 1030, indicates that a data packet has been perfectly received. ACK.TIME indicates, when it is active, that the time is immediately following the reception of a properly addressed data packet. NO.ACK indicates, when it is inactive, that the packet just received was not part of a broadcast packet requiring no acknowledgment. When all three of these signals are logic zero, the output of the gate 1133 will be a logic one and the inverter 1135 will drive the S input of the flip-flop 1137 low. Because the R input 1143 is high, the flip-flop 1137 will set, thereby asserting the signal $\overline{RTA}$ when the line is quiet, such that $\overline{CAR.DET}$ becomes inactive.

The reset input of the flip-flop 1137 is coupled through an inverted input NOR gate 1143 and an inverted input NAND gate 1145 to the signals $\overline{RESET5}$, $\overline{TxEN}$ and $\overline{RTA}$. The gates 1145 and 1143 combine to implement the logical expression $(\overline{TxEn} \cdot \overline{RTA}) + \overline{RESET5}$ such that when a data packet is not being transmitted, i.e., $\overline{TxEN}$ is inactive high and $\overline{RTA}$ is inactive high, meaning a no acknowledgment cycle has been entered, the R input 1143 of the flip-flop 1137 is high, allowing it to be set by the conditions monitored by the gate 1133.

When $\overline{\text{RTA}}$ on the line 182 is asserted, the modem will respond with the $\overline{\text{CTS}}$ signal on the line 185 and the RUN signal on the line 704 will again be set by the flip-flop 1140 in FIG. 36B. The RUN signal causes the transmit executive 650 to activate $\overline{\text{TxEN}}$ and, since $\overline{\text{RTA}}$ is active, the flip-flop 1137 will be rest thereby deactivating the $\overline{\text{RTA}}$ signal after the acknowledgment cycle has been entered.

The flip-flop 1122 in FIG. 36B is used to synchronize the incoming $\overline{\text{CAR.DET}}$ signal on the line 130 with the RxCLK signal on the line 162 to generate the S.CAR.-DET signal on the line 1124.

There are some cases where no acknowledgment packets are to be sent. To prevent the $\overline{\text{RTA}}$ signals from being asserted in such cases, the NO.ACK signal on the line 1132 is generated. A flip-flop 1134 generates this NO.ACK signal based upon the condition of certain input signals. The NO.ACK signal is generated in two cases. If the device address field in the packet just received is hexadecimal FF, then that packet is a "broadcast" packet which was intended for every DLC on the link. In such a case, no DLC is to acknowledge the broadcast data packet. The signal $\overline{\text{FFDA}}$ on the line 1136 will be active when a broadcast packet has arrived and will cause the NO.ACK signal on the line 1132 to be asserted. The second case is the monitor mode. The $\overline{\text{MONITODE/}}$ signal on the line 1138 will cause the DLC to receive every packet on the line regardless of its destination address and place it in the receive buffer. This mode is used for debugging purposes, and no acknowledgment packet is desired. The $\overline{\text{MONIT.MODE}}$ signal will cause the NO.ACK signal on the line 1132 to be active, thereby inhibiting the transmission of the $\overline{\text{RxDONE}}$ pulse on the line 1030 through the NAND gate 1128.

The RUN signal on the line 704 in FIG. 36B is generated by a flip-flop 1140. The flip-flop 1140 is set when the $\overline{\text{CTS}}$ signal on the line 185 from the modem indicates that the line is clear. However the $\overline{\text{CTS}}$ signal is meaningless to the data link controller unless the DLC is issuing either a $\overline{\text{RTS}}$ or a $\overline{\text{RTA}}$ signal because a $\overline{\text{CTS}}$ signal with no $\overline{\text{RTS}}$ or $\overline{\text{RTA}}$ signal is meaningless. A gate 1142 is used to combine the RTS signal on the line 154 and the RTA signal on the line 182 with the $\overline{\text{CTS}}$ signal on the line 185 in a gate 1144 such that the RUN signal will be active only when both $\overline{\text{CTS}}$ and either RTSA or RTA are asserted.

Figure 37B:
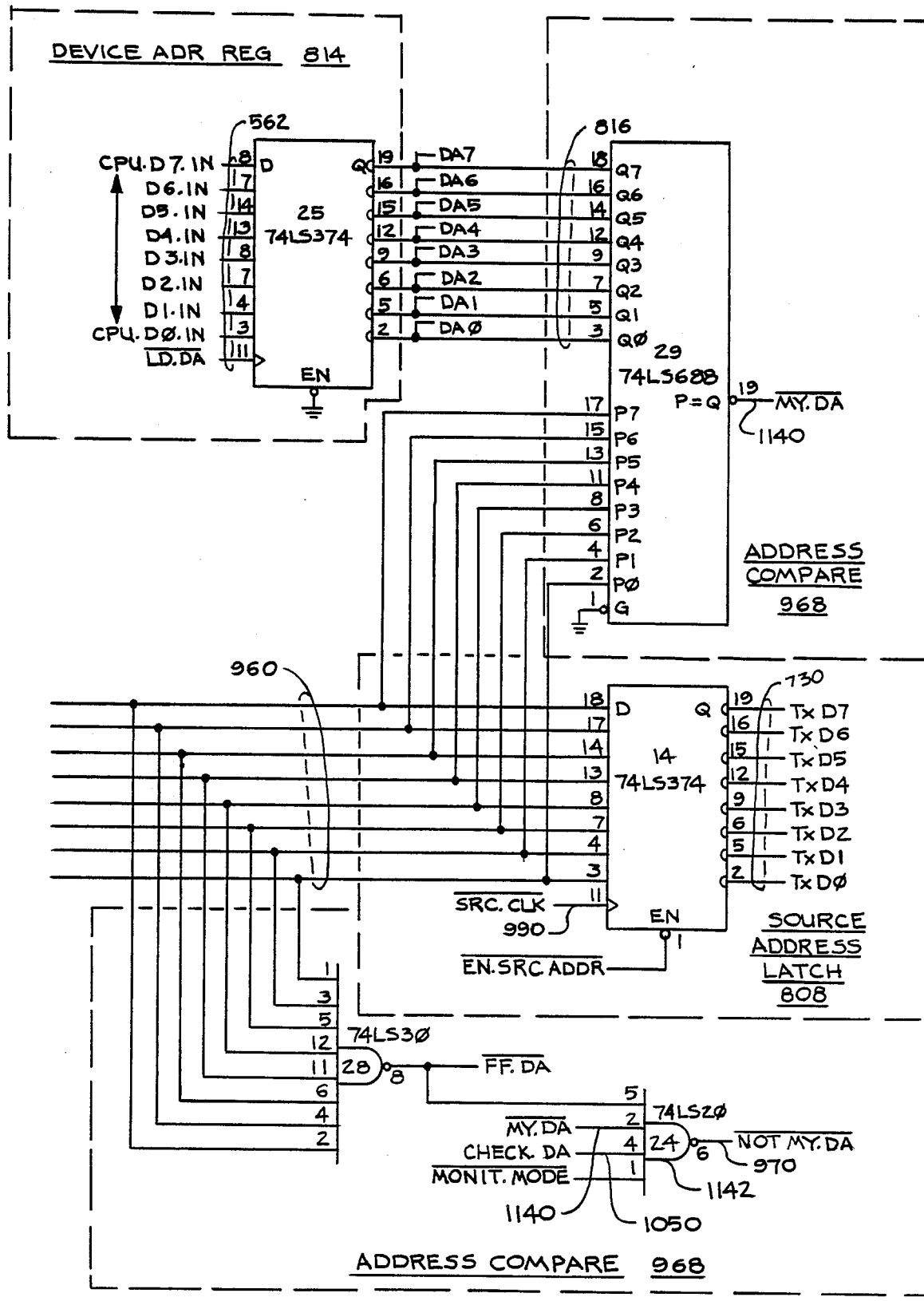

Referring to FIGS. 37A and B there is shown the logic for the CRC logic circuit 962, the device address register 814, the serial to parallel shifter 954, the byte latch 958, the receive bit counter 960, the address comparator 968 and the source address latch 808. The CRC.ERR signal on the line 966 is generated by the CRC logic 962 which loads the serial data from the output line 964 of the serial to parallel shifter 954. During the delete zero cycle, the gate 1130 inhibits the action of the RxCLK signal on the line 162 under the influence of the $\overline{\text{DEL}\emptyset}$ signal on the line 988 to prevent shifting during one clock cycle of the inserted zero thereby maintaining the integrity of the field of data upon which the CRC.ERR signal is generated.

Likewise, a gate circuit 986 utilizes a gate 1132 to inhibit passage of the RxCLK signal on the line 162 to the clock input of the serial to parallel shifter. This inhibits the shifting of the serial to parallel shifter 954 during the clock cycle of the RxCLK signal on line 162 during which the inserted zero is being deleted.

The BIT.CLK signal on a line 1134 is derived from the RxCLK signal after it passes through the gate 1132 to designate bit times. The BIT.CLK signal is counted by the receiver bit counter 960 and the output of the receiver bit counter 960 is combined with the BIT.CLK signal in a gate 1136 to generate the $\overline{\text{BYTE.CLK}}$ pulse every eight bit times.

The serial to parallel shifter 954 receives the incoming data on the line 160 and converts it to parallel form for output to the byte latch 958 on the bus 956. The receiver bit counter 960 signals when eight bit times have passed by generating the $\overline{\text{BYTE.CLK.EN}}$ signal on a line 1137 which signal is combined by a gate 1136 to generate the $\overline{\text{BYTE.CLK}}$ signal on the line 984.

The source address latch 808 latches in the source address field on the receiver data bus 960 when the $\overline{\text{SRC.CLK}}$ signal on the line 990 from the receiver timing generator is asserted.

The address comparator 968 compares the address in the device address register 814 from the CPU to the device address field on the receiver data bus 960. The comparator outputs a signal called $\overline{\text{MY.DA}}$ on the line 1140 which is combined with a number of other signals in a gate 1142 to generate the signal $\overline{\text{NOT.MY.DA}}$ on a line 970.

The byte latch 958 latches in the eight bit parallel output of the serial to parallel shifter upon the occurrence of the $\overline{\text{BYTE.CLK}}$ signal on the line 1135.

Figure 38A:
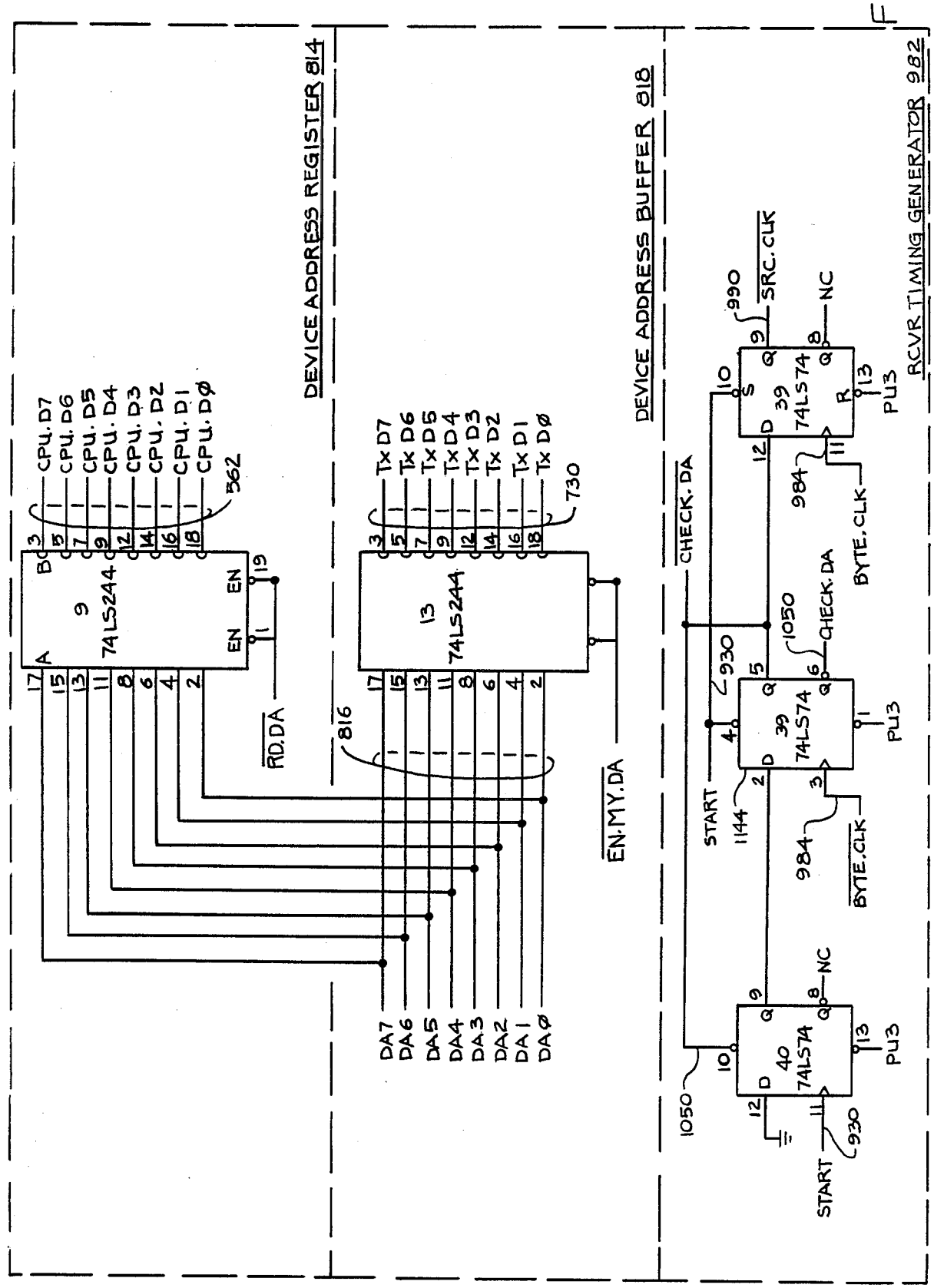
Figure 38B:
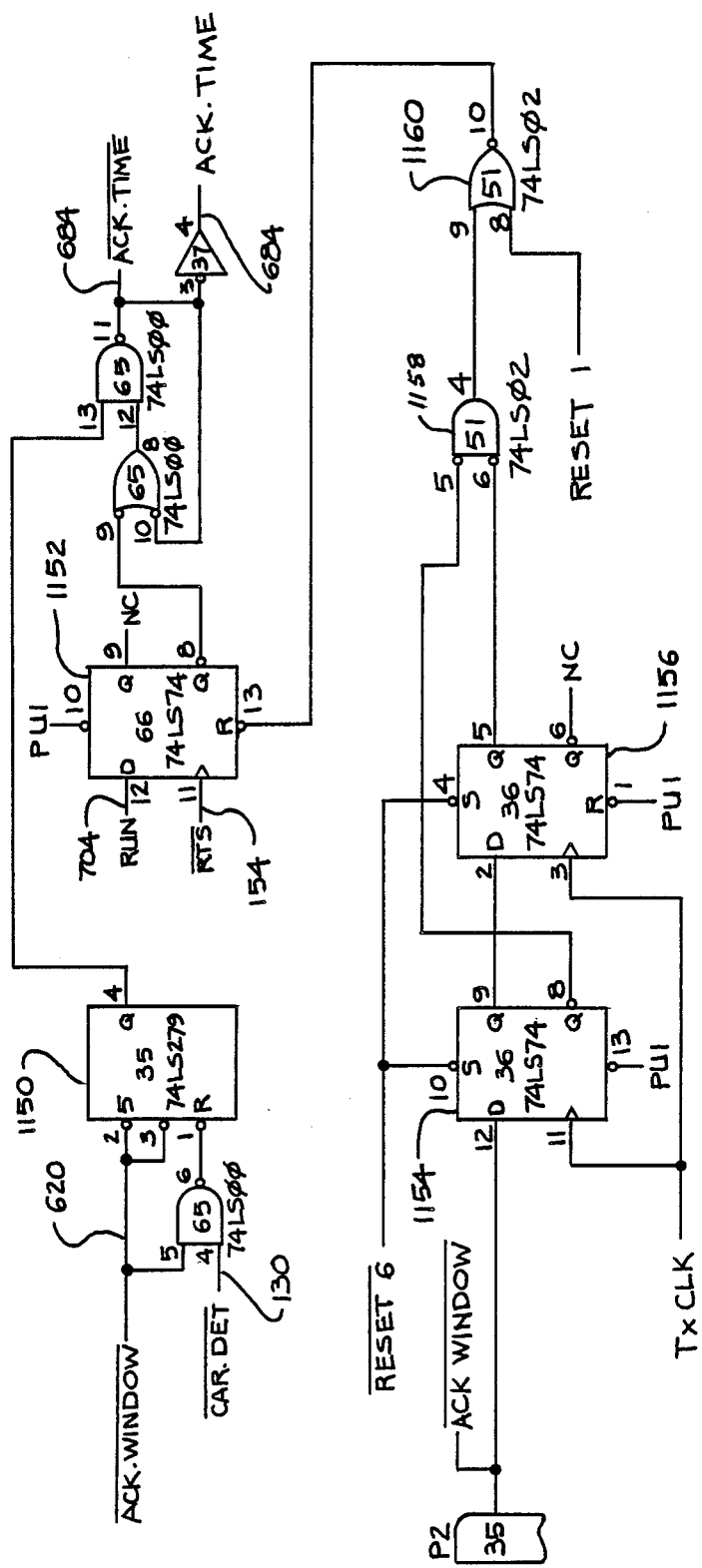

Referring to FIGS. 38A and 38B there is shown the logic for the device address register 814, the device address buffer 818, a portion of the modem control interface 686, and the receiver timing generator 982. The receiver timing generator 982 is a sequential machine which commences operation upon the activation of the START signal on the line 930. The signal $\overline{\text{CHECK.DA}}$ on the line 1050 is generated upon the occurrence of $\overline{\text{BYTE.CLK}}$ signal on line 984 following the occurrence of the START signal on the line 930. After $\overline{\text{CHECK.DA}}$ is generated, when the $\overline{\text{BYTE.CLK}}$ signal on the line 984 again occurs, the $\overline{\text{SRC.CLK}}$ signal on the line 990 is generated which causes loading of the source field into the source address latch 808.

The signal $\overline{\text{ACK.TIME}}$ on the line 684 is generated by the circuitry in the portion of the modem control interface 686 shown in FIG. 38B. The occurrence of the $\overline{\text{ACK.WINDOW}}$ signal on the line 620 from the modem sets a flip-flop 1150. This flip-flop is reset upon the disappearance of the $\overline{\text{ACK.WINDOW}}$ signal on the line 620 and the disappearance of the $\overline{\text{CAR.DET}}$ signal on the line 130 from the modem. Upon the assertion of the RUN signal on the line 704 from FIG. 36B and a low-to-high transition of the $\overline{\text{RTS}}$ signal on the line 154, the flip-flop 1152 is set. When both the flip-flops 1150 and 1152 are set, the $\overline{\text{ACK.TIME}}$ signal on the line 684 will be asserted. Any packet that comes in while $\overline{\text{ACK.WINDOW}}$ is active will keep the $\overline{\text{ACK.TIME}}$ signal asserted until the carries goes away. Otherwise, the $\overline{\text{ACK.TIME}}$ signal will become inactive when $\overline{\text{ACK.WINDOW}}$ becomes inactive. The flip-flops 1154 and 1156 in conjunction with gates 1158 and 1160 serve as a pulse generator to clear the flip-flop 1152 when the signal $\overline{\text{ACK.WINDOW}}$ becomes inactive.

Figure 39B:
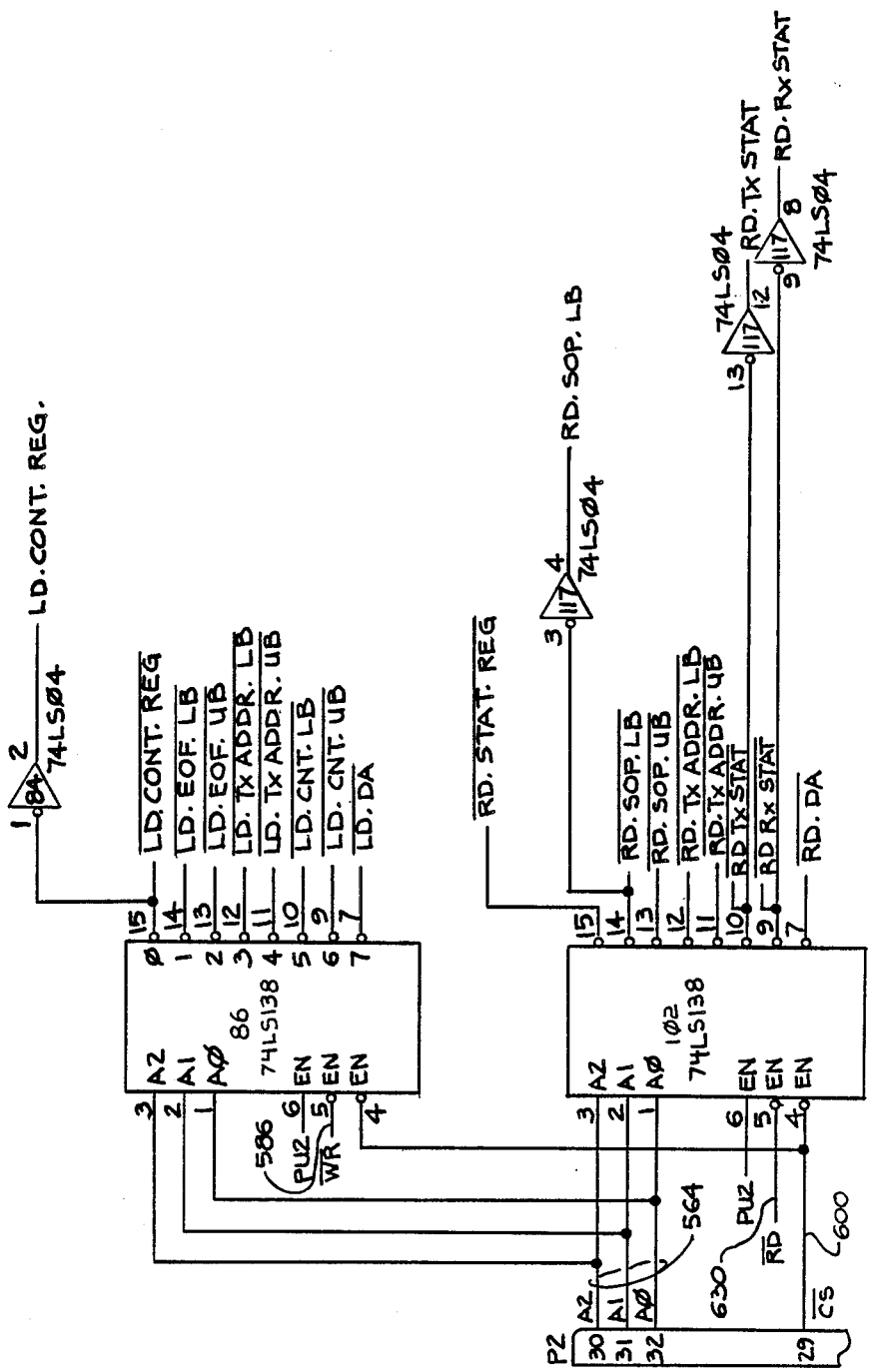

Referring to FIGS. 39A and B there is shown a logic diagram of the control register 668 and the input-output function decoder 666. The control register 668 latches the $\overline{\text{TxSTART}}$ signal on the line 669 when the CPU signals by bit six of the CPU data bus that it desires a data packet to be sent. The CPU can also control the generation of the $\overline{\text{MONIT.MODE}}$ signal by writing to the latch 1162.

The input-output function decoder 666 is under the control of the DLC inputs A1 through A3 from the bus 564 and the $\overline{\text{RD}}$ and $\overline{\text{WR}}$ signals from the CPU on the lines 630 and 586 respectively. The $\overline{\text{CS}}$ signal on the line 600 from the CPU causes the I/O function decoder to decode the address bits on the A1 through A3 inputs to generate the control signals at the outputs of these decoders. These output signals cause various events in various buffers and latches in the DLC system.

Figure 41:
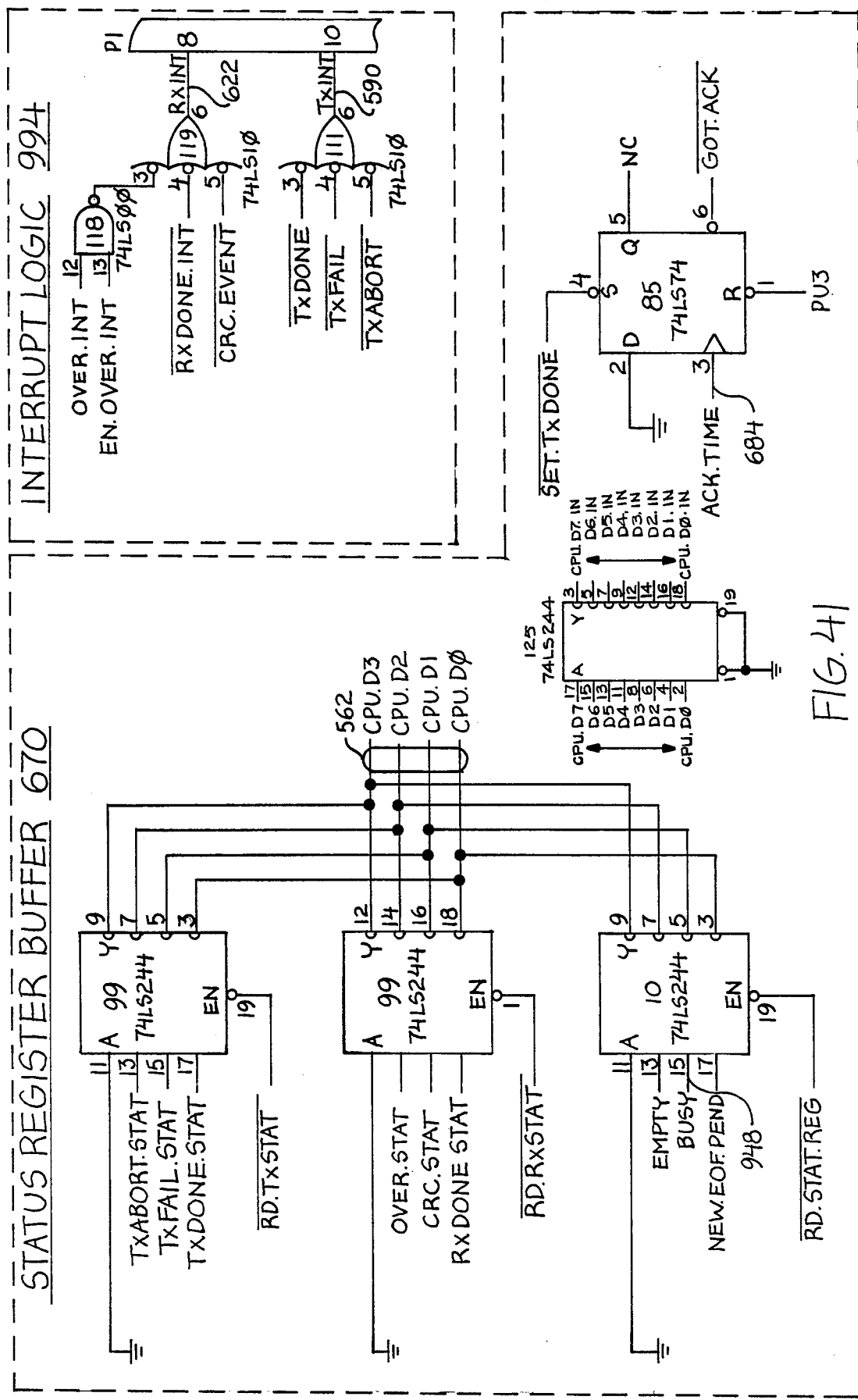

Referring to FIGS. 40 and 41 there is shown a logic diagram of the status register 670 and the interrupt logic 996. The status register stores various status signal such as Rx.DONE.STAT indicating a good reception, CRC.STAT indicating a CRC error and TxDONE.STAT indicating that a transmission has been completed. Other status signals are TxFAIL.STAT and TxABORT.STAT which indicates that the $\overline{\text{CTS}}$ signal on the line 154 disappeared before the transmission was completed.

The interrupt logic 994 accepts various inputs from the status register in FIGS. 40 and 41 and combines them in two gates to generate the RxINT signal on the line 622 or the TxINT signal on the line 590.

Figure 43:
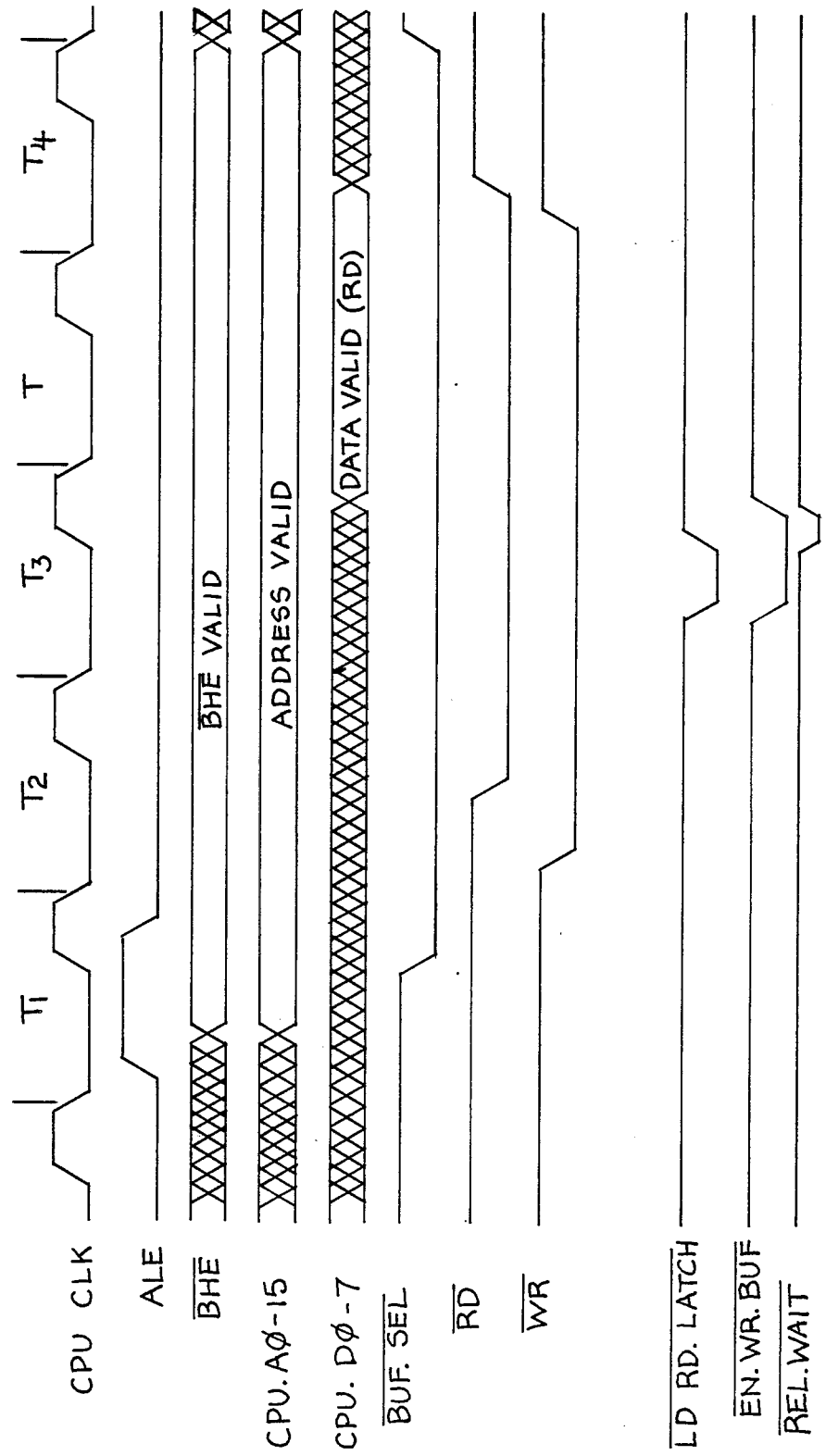
FIG. 43 is a timing diagram for the signals at the interface between the CPU and the data link controller.

Referring to FIG. 43 there is shown a timing diagram for the relationship for the various signals on the interface between the CPU and the data link controller illustrated in FIG. 18. Consideration of FIG. 43 in conjunction with FIG. 18 will completely define the interaction between the CPU and the data link controller in accessing the buffer memory 571.

Figure 44:
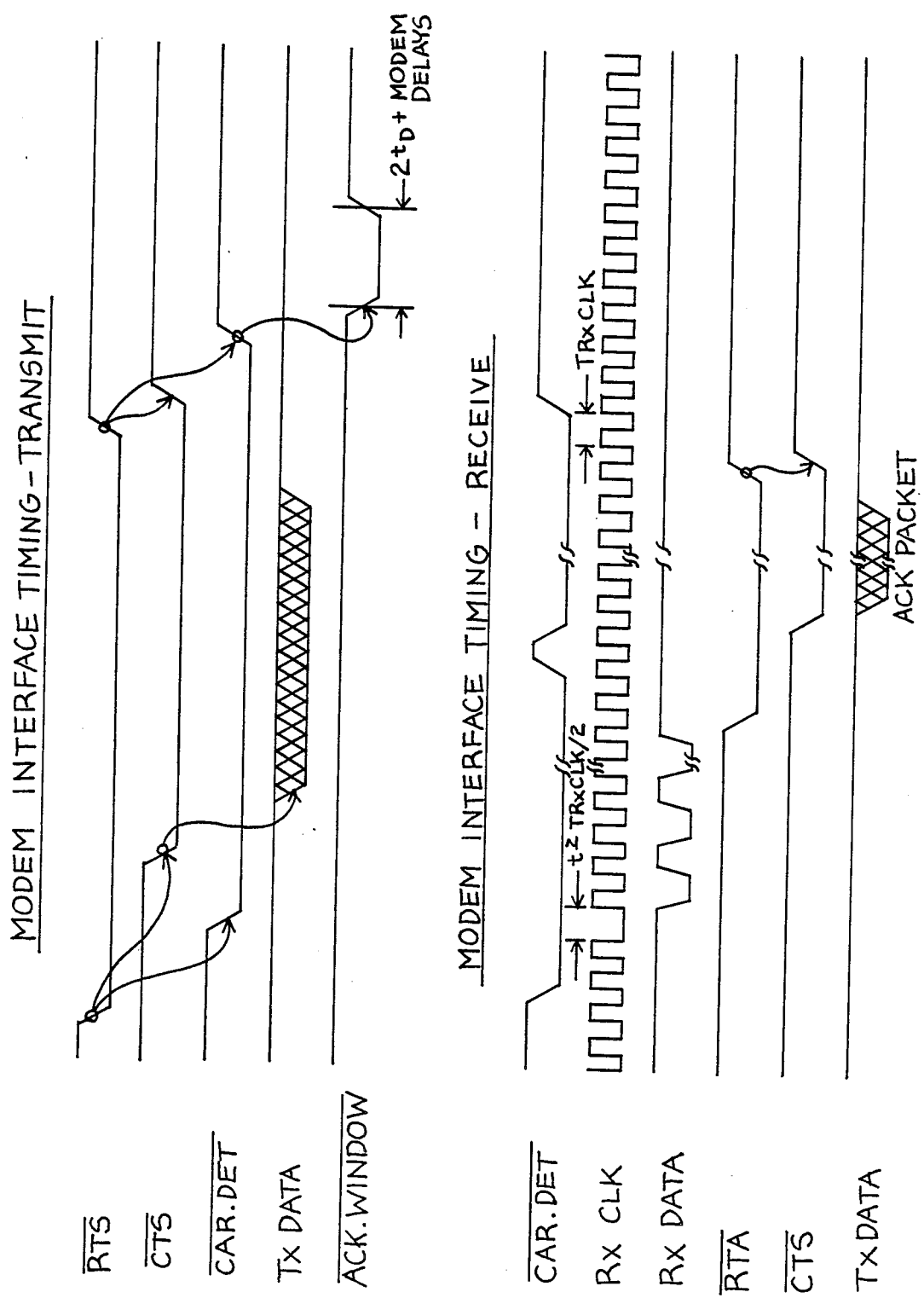
FIG. 44 is a timing diagram of the relationship of the signals at the interface between the DLC and the modem.

Referring to FIG. 44 there is shown a timing diagram specifying the relationships between the signals at the interface between the data link controller and the modem during both transmission and receive sequences. Consideration of FIG. 44 in conjunction with the description of the modem included herewith and in conjunction with FIGS. 26 through 41 will completely define the interaction between the modem and the data link controller in accessing the line to transmit data packets and to receive incoming data packets and acknowledge their reception.

Referring to FIG. 45 there is shown a timing diagram illustrating the relationship between selected signals at a transmitting modem and the same signals at the receiving modem. Consideration of FIG. 48 along with the description of the modem included herewith will completely specify the details of the relationships between the selected signals.

Although the invention has been described in terms of the preferred embodiment disclosed herein, various modifications and alternatives will be apparent to those skilled in the art. All such modifications and alternative constructions are intended to be included within the scope of the claims appended hereto.

| Signal Name | Source FIG. | Destination FIG. |
|---|---|---|
| ACK.TIME | 38 | 26, 27, 29, 30, 36, 41, 24 |
| ACK.TIME- | 38 | 29, 29, 30, 32, 40, 40, 40 |
| ACK.WINDOW- | 38 | 38 |
| BAD.CRC- | 24 | 40 |
| BIT.CLK | 37 | 37 |
| BUF.A0 | 30 | 41 |
| BUF.A1 | 30 | 41 |
| BUF.A2 | 30 | 41 |
| BUF.A3 | 30 | 41 |
| BUF.A4 | 30 | 41 |
| BUF.A5 | 30 | 41 |
| BUF.A6 | 30 | 41 |
| BUF.A7 | 30 | 41 |
| BUF.A8 | 30 | 41 |
| BUF.A9 | 30 | 41 |
| BUF.A10 | 30 | 41 |
| BUF.A11 | 30 | 41 |
| BUF.A12 | 30 | 41 |
| BUF.A13 | 30 | 41 |
| BUF.A14 | 30 | 41 |
| BUF.A15 | 30 | 41 |
| BUF.D0 | 31 | 41 |
| BUF.D1 | 31 | 41 |
| BUF.D2 | 31 | 41 |
| BUF.D3 | 31 | 41 |
| BUF.D4 | 31 | 41 |
| BUF.D5 | 31 | 41 |
| BUF.D6 | 31 | 41 |
| BUF.D7 | 31 | 41 |
| BUF.SEL | 26 | 31 |
| BUF.SEL- | 26 | |
| BUF.WR- | 26 | 31, 34, 41 |
| BUSY | 34 | 26 |
| BUSY- | 34 | 29, 29, 40 |
| BYTE.CLK | 37 | 38, 26 |
| BYTE.CLK- | 37 | 38 |
| CPU.SEL | ·26 | 26, 31 |
| CPU.SEL- | 26 | 30, 31 |
| CAR.DET- | 36 | 33, 38, 36 |
| CHECK.DA- | 38 | 36 |
| CHECK.ACK | 40 | 40 |
| CHECK.DA. | 38 | 37 |
| CLR.EOF.PEND- | 33 | 33, 33 |
| CONT- | 21 | 20 |
| CRC.ERR | 37 | 24 |
| CRC.EVENT- | 40 | 41 |
| CRC.STAT | 40 | 41 |
| CTS- | 36 | 40 |
| CRC.DATA | 35 | 22 |
| CPU.A0- | 41 | 30 |
| CPU.A1 | 41 | 30 |
| CPU.A2 | 41 | 30 |
| CPU.A3 | 41 | 30 |
| CPU.A4 | 41 | 30 |
| CPU.A5 | 41 | 30 |
| CPU.A6 | 41 | 30 |
| CPU.A7 | 41 | 30 |
| CPU.A8 | 41 | 30 |
| CPU.A9 | 41 | 30 |
| CPU.A10 | 41 | 30 |
| CPU.A11 | 41 | 30 |
| CPU.A12 | 41 | 30 |
| CPU.A13 | 41 | 30 |
| CPU.A14 | 41 | 30 |
| CPU.A15 | 41 | 30 |
| CPU.D0 | 38, 41, 41 | 27, 29, 27, 29, 41 |
| CPU.D1 | 38, 41, 41 | 27, 29, 27, 29, 41 |
| CPU.D2 | 38, 41, 41 | 27, 29, 27, 29, 41 |
| CPU.D3 | 38, 41, 41 | 27, 29, 27, 29, 41 |
| CPU.D4 | 38, 41 | 27, 29, 29, 41 |
| CPU.D5 | 38, 41 | 27, 29, 29, 41 |
| CPU.D6 | 38, 41 | 27, 29, 29, 41 |
| CPU.D7 | 38, 41 | 27, 29, 29, 41 |
| CPU.D0.IN | 27, 41 | 27, 28, 32, 28, 32, 37, 39 |
| CPU.D1.IN | 27, 41 | 27, 28, 28, 32, 32, 37, 39 |
| CPU.D2.IN | 27 | 27, 28, 27, 32, 32, 37, 39 |

-continued

| Signal Name | Source FIG. | Destination FIG. |
|---|---|---|
| CPU.D3.IN | 41 27 41 | 27, 28, 28, 32, 32, 37, 39 |
| CPU.D4.IN | 27 41 | 28, 32, 32, 37, 39 |
| CPU.D5.IN | 27 41 | 28, 32, 32, 37, 39 |
| CPU.D6.IN | 27 41 | 28, 32, 32, 37, 39 |
| CPU.D7.IN | 27 41 | 28, 32, 32, 37, 39 |
| DA0 | 37 | 38 |
| DA1 | 37 | 38 |
| DA2 | 37 | 38 |
| DA3 | 37 | 38 |
| DA3 | 37 | 38 |
| DA4 | 37 | 38 |
| DA5 | 37 | 38 |
| DA6 | 37 | 38 |
| DA7 | 37 | 38 |
| DATA.CLK- | 26 | 31, 31 |
| DATA.EN- | 26 | |
| DATA.REQ1- | 20 | 26 |
| DATA.REQ2- | 21 | 26 |
| DEL0- | 24 | 37, 37 |
| DMA.CLK- | 26 | 26, 26 |
| DMA.CLK | 26 | 31, 33, 33, 33, 34 |
| EMPTY | 34 | 41 |
| EN.CONST- | 20 | 27, 31, 35, 20 |
| END.DATA- | 29 | 21 |
| END.BYTE | 28 | 20, 20, 21 |
| EN.ACK.TYPE- | 21 | 34, 31 |
| EN.FIFO.CONT | 33 | 34, 34 |
| EN.FIFO.CONT- | 33 | 34, 34 |
| EN.MY.DA- | 21 | 31, 38 |
| EN.OVER.INT | 39 | 41 |
| EN.SRC.ADDR- | 21 | 31, 37 |
| EN.WR.BUF- | 26 | |
| FF.DA- | 37 | 36 |
| FREEZ.REQ- | 26 | 26 |
| GOT.ACK- | 41 | 40 |
| INC.TxADDR- | 26 | 27 |
| LD.TxAADR.LB- | 39 | 27 |
| LD.TxAADR.UB- | 39 | 27 |
| LD.SHIFTR2- | 21 | 28, 35 |
| LD.CNT.LB- | 39 | 28 |
| LD.CNT.UB- | 39 | 28 |
| LD.SHIFTR- | 35 | 28, 28 |
| LD.RxADDR- | 29 24 | 32, 36, 37 |
| LD.EOF.LB- | 39 | 32 |
| LD.EOF.UB- | 39 | 32, 33 |
| LD.SHIFTR1- | 20 | 35 |
| LD.DA | 39 | 37 |
| LD.CONT.REG- | 39 | 39 |
| LB.MODE- | 39 | 24 |
| LD.CONT.REG | 39 | 39 |
| MONIT.MODE- | 39 | 36, 37 |
| MY.DA- | 37 | 37 |
| NOT.MY.DA- | 37 | 24 |
| NEW.EOF- | 33 | 32, 34, 34 |
| NEW.EOF | 33 | 33 |
| NEW.EOF.PEND | 33 | 41 |
| NO.ACK | 36 | 36 |
| OVER.STAT | 34 | 41 |
| OVER.INT | 34 | 41 |
| PRESENT.CRC- | 21 | 35 |
| PAL2EN- | 20 | 20, 21 |
| RD- | 26 | 39 |
| RD.SEL- | 26 | 26 |
| RD.TxADDR.LB- | 38 | 27 |
| RD.TxADDR.UB- | 39 | 27 |
| RD.SOP.LB | 39 | 29 |
| RD.SOP.LB- | 39 | 29 |
| RESET1 | 39 | 26, 26, 29, 38 |
| RESET2 | 39 | 20, 21, 22 |
| RESET3- | 39 | 26, 34, 34 |
| RESET4- | 39 | 29, 32, 32 |
| RESET5- | 39 | 31, 26, 33, 36, 20 |
| RESET6- | 39 | 24, 38, 40 |
| RESET7- | 39 | 40, 40, 37 |
| RESET8- | 39 | 33, 36, 36, 39, 39 |
| RESET9- | 39 | 40, 40 |
| RTA- | 36 | 28, 36, 20 |
| RxSEL- | 26 | 26, 30, 30, 31 |
| RxDATA.EN | 31 | 27, 29 |
| RxA0 | 29 | 30, 31, 32 |
| RxA1 | 29 | 30, 32 |
| RXA2 | 29 | 30, 32 |
| RxA3 | 29 | 31, 32 |
| RxA4 | 29 | 30, 32 |
| RxA5 | 29 | 30, 32 |
| RxA6 | 29 | 30, 32 |
| RxA7 | 29 | 30, 32 |
| RxA8 | 29 | 30, 32 |
| RxA9 | 29 | 30, 32 |
| RxA10 | 29 | 30, 32 |
| RxA11 | 29 | 30, 32 |
| RxA12 | 29 | 30, 32 |
| RxA13 | 29 | 30, 32 |
| RxA14 | 29 | 30, 32 |
| RxA15 | 29 | 30, 32 |
| RxD0 | 37 | 31 |
| RxD1 | 37 | 31 |
| RxD2 | 37 | 31 |
| RxD3 | 37 | 31 |
| RxD4 | 37 | 31 |
| RxD5 | 37 | 31 |
| RxD6 | 37 | 31 |
| RxD7 | 37 | 31 |
| RxA=EOF | 32 | 34, 34 |
| RxDONESTAT | 40 | 41, 24 |
| RxDONE.INT- | 40 | 41, 24 |
| RxA=EOF- | 31 | 34 |
| RD.RxSTAT- | 39 | 34, 40, 40, 41 |
| RD.RxSTAT | 39 | 34, 40, 40 |
| RAW.DATA | 35 | 22 |
| RTA | 36 | 36, 21 |
| RxDONE- | 24 | 36, 40 |
| RxDONE | 24 | 40, 29 |
| RTS | 36 | 36, 36, 40 |
| RTS- | 36 | 38 |
| RUN | 36 | 38, 40, 20, 20 |
| RxCLK | 37 | 36, 36, 37 |
| RxDATA | 37 | 24 |
| RxCLK- | 37 | 24 |
| RD.STAT.REG- | 39 | 41 |
| RxEN | 39 | 24 |
| RD.TxSTAT | 39 | 40, 40, 40, 41 |
| RD.DA- | 39 | 38 |
| RD.TxSTAT- | 39 | 40, 40, 40 |
| SEL.ACK- | 30 | 31 |
| SEL.CRC- | 20 | 35, 22 |
| SEL.RxADDR- | 30 | 31 |
| SEL.TxADDR- | 30 | 31 |
| SET.TxDONE- | 40 | 41 |
| SHIFT.CLK.EN- | 26 | 28, 25, 35, 20, 21, 28 |
| S.CAR.DET | 36 | 24 |
| SOP.A0 | 29 | 29 |
| SOP.A1 | 29 | 29 |
| SOP.A2 | 29 | 29 |
| SOP.A3 | 29 | 29 |
| SOP.A4 | 29 | 29 |
| SOP.A5 | 29 | 29 |
| SOP.A6 | 29 | 29 |
| SOP.A7 | 29 | 29 |
| SOP.A8 | 29 | 29 |
| SOP.A9 | 29 | 29 |
| SOP.A10 | 29 | 29 |
| SOP.A11 | 29 | 29 |
| SOP.A12 | 29 | 29 |
| SOP.A13 | 29 | 29 |
| SOP.A14 | 29 | 29 |
| SOP.A15 | 29 | 29 |
| SRC.CLK- | 38 | 37 |
| START- | 24 | 29 |
| START | 24 | 26, 29, 37, 38, 38 |
| START.DMA | 26 | 26, 33, 33 |
| SYNC/FLG | 20 | 35 |
| T1 | 26 | 26 |

-continued

| Signal Name | Source FIG. | Destination FIG. |
|---|---|---|
| T6 | 26 | 26, 31 |
| T6- | 26 | 26, 26, 26, 26 |
| TxSEL- | 26 | 26, 30, 31 |
| TxA3 | 27 | 30 |
| TxA2 | 27 | 30 |
| TxA1 | 27 | 30 |
| TxA0 | 27 | 30, 32 |
| TxA4 | 27 | 30 |
| TxA5 | 27 | 30 |
| TxA6 | 27 | 30 |
| TxA7 | 27 | 30, 30 |
| TxA8 | 27 | 30 |
| TxA9 | 27 | 30 |
| TxA10 | 27 | 30 |
| TxA11 | 27 | 30 |
| TxCLK | 34 | 28, 28, 35, 35, 36, 38, 40, 20, 20, 21, 22 |
| TxD0 | 31, 37, 38 | 34, 35 |
| TxD1 | 31, 37, 38 | 34, 35 |
| TxD2 | 31, 37, 38 | 34, 35 |
| TxD3 | 31, 37 | 34, 35 |
| TxD4 | 31, 37, 38 | 34, 35 |
| TxD5 | 31, 37, 38 | 34, 35 |
| TxD6 | 31, 37, 38 | 34, 35 |
| TxD7 | 31, 37, 38 | 34, 35 |
| TxEN- | 20 | 36, 36, 36, 22, 24 |
| TxSTART- | 39 | 36 |
| TxDONE- | 40 | 41 |
| TxDONE.STAT | 40 | 41 |
| TxABORT- | 40 | 41 |
| TxABORT.STAT | 40 | 41 |
| TxFAIL- | 40 | 41 |
| TxFAIL.STAT | 40 | 41 |
| TxEN | 20 | 20 |
| TxDIR- | 20 | 20, 22 |
| UNAV.MODE | 39 | 34 |
| WR.SEL- | 26 | 26 |
| WR- | 26 | 31, 39 |
| ZB1.DATA | 22 | 35 |

What is claimed is:

1. A communications interface for a client data processing unit that sends outgoing and receives incoming packets to and from other data processing units over a common data link, said packets including data packets and response means coupled to said data link for receiving an incoming packet from said data link;

means coupled to said receiving means for generating an outgoing response packet corresponding to an incoming data packet directed to said client data processing unit; and means coupled to said data link and said generating means for transmitting outgoing packets onto said data link, an outgoing data packet being transmitted after performing a link acquisition protocol and said outgoing response packet being transmitted without checking for transmission activity on said data link.

2. An apparatus as defined in claim 1 wherein said link acquisition protocol obtains exclusive use of said data link.

3. An apparatus as defined in claim 1 wherein said outgoing response packet is an acknowledgment packet.

4. A communications interface for a client data processing unit that sends outgoing and receives incoming packets to and from other data processing units over a common data link, said packets including data packets and response packets, said interface comprising:

means coupled to said data link for receiving an incoming packet from said data link;

means coupled to said receiving means for generating an outgoing response packet after the reception of an incoming data packet directed to said client data processing unit; and means coupled to said data link and said generating means for transmitting outgoing packets onto said data link, an outgoing data packet being transmitted after performing a first link acequisition protocol and said outgoing response packet being transmitted without a second link acquisition protocol or a fixed waiting period intermediate the completion of reception of said incoming data packet and the beginning of transmission of said outgoing response packet.

5. An apparatus as defined in claim 2 wherein said first link acquisition protocol obtains exclusive use of said data link.

6. An apparatus as defined in claim 4 wherein said transmitting means begins transmitting said outgoing response packet immediately after said incoming data packet is received by said receiving means.

7. An apparatus as defined in claim 1 or 2 or 3 wherein said generating means includes means for checking the accuracy of said incoming data packet.

8. An apparatus as defined in claim 7 wherein said generating means includes means to signal said client data processing unit when said incoming data packet has been perfectly received.

9. An apparatus as defined in claim 1 or 4 or 6 wherein said transmitting means transmits delimiting flags on both ends of said outgoing packets.

10. An apparatus as defined in claim 1 or 4 or 6 wherein said transmitting means includes a transmit buffer means for storing outgoing data packets, said transmit buffer means having multiple addressable locations from which said outgoing data packets may be transmitted and a receive buffer means for storing incoming response packets, said receive buffer means having multiple addressable locations in which said incoming response packets may be stored.

11. An apparatus as defined in claim 10 wherein said generating means includes means for taking one of said outgoing data packets from a first location in said transmit buffer for transmission to another data processing unit and for placing an incoming respone packet received in response to said outgoing data packet in said transmit buffer at a known location relative to said first location.

12. An apparatus as defined in claim 7 wherein said generating means includes means for generating an acknowledgment code for transmission in said outgoing response packet which indicates in a first state that said incoming data packet was perfectly received and in a second state that said incoming data packet must be retransmitted.

13. An apparatus as defined in claim 12 wherein said second state includes information representing a variable retransmission delay period which determines the time at which said incoming data packet must be retransmitted.

14. An apparatus as defined in claim 1 or 4 or 6 wherein said generating means generates error check data from said outgoing data packet and transmits said error check data with said outgoing data packet.

15. A communications interface for a client data processing unit that sends outgoing and receives incoming packets to and from other data processing units over a common data link, said packets including data packets and response packets, said interface comprising:
means coupled to said data link for receiving an incoming packet from said data link;
means coupled to said receiving means for generating an outgoing response packet from an incoming data packet, said outgoing response packet including a code which indicates, in a first state, that said incoming data packet was perfectly received and, in a second state, a predetermined delay after which said incoming data packet should be retransmitted; and
means coupled to said data link and said generating means for transmitting an outgoing packet.

16. A communications interface for a client data processing unit that sends outgoing and receives incoming packets to and from other data processing units over a common data link, said packets including data packets and response packets, said interface comprising:
means for storing an outgoing data packet and an incoming response packet, said storing means having multiple addressable locations from which said outgoing data packet may be transmitted and in which said incoming response packet may be placed;
means coupled to said data link and said storing means for transmitting said outgoing packet from a first location in said storing means to another data processing unit on said data link;
means coupled to said data link for receiving an incoming response packet sent in response to said outgoing data packet; and
means for placing said incoming response packet in said storing means in a known location relative to said first location.

17. An apparatus as defined in claim 16, wherein said incoming response packet includes a code which indicates, in a first state, that said outgoing data packet was perfectly received and, in a second state, a predetermined delay after which said outgoing data packet should be retransmitted.

18. A communications interface for a client data processing unit that sends outgoing and receives incoming packets to and from other data processing units over a common data link, said packets including data packets and response packets, said interface comprising:
means coupled to said data link for obtaining exclusive use of said data link;
means coupled to said data link for receiving an incoming packet from a second data processing unit;
means coupled to said receiving means for checking the accuracy of said incoming packet;
means coupled to said checking means for signaling said client data processing unit that an incoming data packet addressed to said client data processing unit has arrived when said incoming data packet has been received perfectly; and
means coupled to said data link and said checking means for retaining exclusive use of said data link by transmitting an outgoing response packet to said second data processing unit after reception of said incoming data packet.

19. A method for transmitting and receiving data on a data network comprised of a plurality of data processing units, each with a communications interface coupled to a data link, said method comprising the steps of:
obtaining exclusive use of said data network for a first data processing unit needing to send data to a second data processing unit by performing a first link acquisition protocol;
transmitting a data packet from a first location in a transmit buffer in said first data processing unit to said second data processing unit on sad network;
retaining exclusive use of said data network by transmitting a response packet from said second data processing unit to said first unit immediately after receipt of said data packet without performing a second link acquisition protocol.

20. The method of claim 19 wherein the step of transmitting a response packet includes generating acknowledgment data and including said acknowledgment data in said response packet.

21. The method of claim 20 wherein the step of generating acknowledgment data includes the steps of:
checking to determine if said data packet was perfectly received; and
sending said acknowledgment data if said data packet was perfectly received.

22. The method of claim 20 wherein the step of generating acknowledgment data includes the steps of:
checking to determine if said data packet was perfectly received;
checking to determine whether said second data processing unit was able to successfully store said data packet; and
generating and sending a code in said response packet to indicate either that said data packet was perfectly received and successfully stored or that said data packet should be retransmitted.

23. The method of claim 19 or 20 or 21 or 22 wherein said step of transmitting said data packet further includes transmitting unique flag data to delimit said data packet.

24. The method of claim 19 or 20 or 21 or 22 wherein said step of transmitting a response packet includes the step of transmitting unique flag data to delimit said response packet.

25. The method of claim 19 or 20 or 21 or 22, further comprising the step of placing said response packet received by said first data processing unit in said transmit buffer at a second location, said transmit buffer having multiple addressable locations from which outgoing data packets may be transmitted and in which incoming response packets may be placed, said second location being identifiable by said first data processing unit using only the address of said first location.

26. A method as described in claim 19 or 20 or 21 or 22 wherein said response packet includes as a source address the address of said second data processing unit and includes as a destination address the address of said first data processing unit.

27. A method as described in claim 26 wherein said response packet includes error check data which allows the accuracy of said response packet to be checked.

28. A data link controller for a communications interface of a client data processing unit coupled to a data communications network coupled to other data processing units, comprising:
means coupled to said network for transmitting outgoing and receiving incoming packets, said packets including data packets and response packets;
means coupled to said transmitting and receiving means for detecting properly addressed incoming data packets and response packets and for storing said incoming packets for the use of said client data processing unit;
means coupled to said detecting means and said transmitting and receiving means for automatically preparing acknowledgment data from one of said incoming data packets without interaction with or request by said client data processing unit, said acknowledgment data being transmitted in an outgoing response packet transmitted in response to said incoming data packet, said means for automatically preparing acknowledgment data comprising:
means for detecting a first condition occurring when said incoming data packet has not been correctly received and a second condition occurring when said incoming data packet has been correctly received but said storing means was not able to store said incoming data packet; and
means coupled to said detecting means for generating a first code indicating when either of said first or second conditions has occurred and including said first code in said acknowledgment data.

29. An apparatus as defined in claim 28 further comprising means for preventing the transmission of said acknowledgment data in said outgoing response packet if said incoming data packet was not received perfectly.

30. An apparatus as defined in claim 28, further comprising:
means for storing an outgoing data packet from said client data processing unit for transmission to another data processing unit in said local area data network; and
means for preparing said outgoing data packet for transmission by adding flag data which delimits the boundaries of said outgoing data packet.

31. An apparatus as defined in claim 28, further comprising means for preparing said outgoing response packet for transmission by adding flag data to delimit the boundaries of said outgoing response packet.

32. A data link controller for a communications interface of a client data processing unit coupled to a data communications network coupled to other data processing units, comprising:
means coupled to said network for transmitting outgoing and receiving incoming packets, said packets including data packets and response packets;
means coupled to said transmitting and receiving means for detecting properly addressed incoming data packets and response packets and for storing said incoming packets for the use of said client data processing unit;
means coupled to said detecting means and said transmitting and receiving means for automatically preparing acknowledgment data from one of said incoming data packets without interaction with or request by said client data processing unit, said acknowledgment data being transmitted in an outgoing response packet transmitted in response to said incoming data packet, said means for automatically preparing acknowledgment data comprising:
means for detecting a first condition occurring when said incoming data packet has not been correctly received, a second condition occuring when said incoming data packet has been correctly received but said storing means was not able to store said incoming data packet, and a third condition occurring when said incoming data packet has been received correctly but is not to be stored; and
means coupled to said detecting means for generating a first code indicating when either of said first or second conditions has occurred and a second code indicating the presence of said third condition, and including said first and second codes in said acknowledgment data.

33. An apparatus as defined in claim 32 further comprising means for preventing the transmission of said acknowledgment data in said outgoing response packet if said incoming data packet was not received perfectly.

34. An apparatus as defined in claim 32, further comprising:
transmission buffer means for storing an outgoing data packet from said client data processing unit for transmission to another data processing unit in said local area data network; and
means for preparing said outgoing data packet for transmission by adding unique flag data which delimits the boundaries of said outgoing data packet.

35. An apparatus as defined in claim 32, further comprising means for preparing said outgoing response packet for transmission by adding flag data to delimit the boundaries of said outgoing response packet.

36. An apparatus as defined in claim 34, further comprising means for placing an incoming response packet corresponding to an outgoing data packet previously transmitted in said storing means at a known location relative to the location in said storing means from which said outgoing data packet was transmitted.

37. A communications interface for interfacing a client data processing unit to a data network comprising:
means for performing a first link acquisition protocol for establishing an exclusive communication link between said client data processing unit and a second data processing unit on said network; and
means for reserving said data network for exclusive use by said second data processing unit in sending a communication back to said client data processing unit without the need to perform a second link acquisition protocol.

38. An apparatus as defined in claim 37, wherein said first link acquisition is identical to said second link acquisition protocol.

39. A data link controller for a client data processing unit, said controller comprising:
means coupled to a data link for storing an incoming data packet addressed to said data link controller sent by another data processing unit via said data link;
means coupled to said storing means independent of said client data processing unit for generating a response packet corresponding to said incoming data packet, said generating means comprising:

means for using the source address of said incoming data packet as the destination address of said response packet and for using the address of said data link controller as the source address of said response packet; and means coupled to said storing means for detecting whether said incoming data packet was completely stored and for generating a code for use in said response packet, said code separately indicating both: (a) whether said incoming data packet was received accurately and (b) whether said incoming data packet was completely stored; and means for including said code in said response packet.

40. An apparatus as defined in claim 39 further comprising means for generating error check data on the data bits in said response packet and including said error check data as part of said response packet.

41. An apparatus as defined in claim 40, further comprising means for generating flag characters to delimit said response packet and transmitting said flag characters at each end of said response packet.

42. A data link controller for a client data processing unit, said controller comprising:

means coupled to a data link for storing an incoming data packet addressed to said data link controller sent by another data processing unit via said data link;

means coupled to said storing means independent of said client data processing unit for generating a response packet corresponding to said incoming data packet, said generating means comprising:

means for using the source address of said incoming data packet as the destination address of said response packet and for using the address of said data link controller as the source address of said response packet; and means coupled to said storing means for detecting whether said incoming data packet was completely stored and for generating a code for use in said response packet, said code separately indicating both: (a) whether said incoming data packet was received accurately and (b) whether said incoming data packet was completely stored;

means for including said code in said response packet;

means for generating error check data on the data bits in said response packet and including said error check data as part of said response packet;

means for generating unique flag characters to delimit said response packet and transmitting said flag characters at each end of said response packet; and means for storing an incoming response packet in a known location relative to the location in said storing means from which said corresponding data packet was transmitted.

43. A data link controller comprising:

first means coupled to a data link for storing an incoming data packet from another data processing unit sent via said data link; and second means coupled to said first means for generating three different types of acknowledgment codes for acknowledging the reception of said incoming data packet comprising:

means for generating a first type of acknowledgment code indicating that said incoming data packet was accurately received and completely stored in said first means;

means for generating a second type of acknowledgment code indicating that said incoming data packet was accurately received but not completely stored; and means for generating a third type of acknowledgment code indicating that said incoming data packet was accurately received but intentionally not stored; and a third means for including one of said acknowledgment codes in an outgoing response packet.

44. An apparatus as defined in claim 43 further comprising means for preventing the generation of an acknowledgment code unless one of said three types of acknowledgment codes is generated by said second means.

45. A method of interfacing a data link controller to a modem for a data communications network comprising the steps of:

generating a request to send signal in said data link controller and transmitting said request to send signal to said modem when data is to be transmitted;

generating a request to acknowledge signal in said data link controller after data has been received by said modem and transferred from said modem to said data link controller and transmitting said request to acknowledge signal to said modem;

generating a clear to send signal in said modem in response to the reception of said request to send signal and after a link acquisition protocol has been performed and the data link has been acquired;

generating a clear to send signal in said modem immediately upon receipt of said request to acknowledge signal without performing a link acquisition or checking for activity on said data network;

generating an acknowledgment window signal in said modem for a predetermined time after the end of transmission by said modem of a data packet from said data link controller and transmitting said acknowledgment window signal to said data link controller; and generating a carrier detect signal in said modem whenever incoming data is detected and transmitting it to said data link controller for use by said data link controller in conjunction with said acknowledgment window signal in determining when an acknowledgment packet is being received which corresponds to a data packet just transmitted.

46. A data link controller for a communications interface of a client data processing unit coupled to a data communications network coupled to other data processing units, comprising:

means coupled to said network for transmitting outgoing and receiving incoming packets, said packets including data packets and response packets;

means coupled to said transmitting and receiving means for detecting properly addressed incoming data packets and response packets and for storing said incoming packets for the use of said client data processing unit;

means coupled to said detecting means and said transmitting and receiving means for automatically preparing acknowledgment data from one of said incoming data packets without interaction with or request by said client data processing unit, said acknowledgment data being transmitted in an outgoing response packet transmitted in response to said incoming data packet, said means for automatically preparing acknowledgment data comprising:

means for detecting a first condition occurring when said incoming data packet has not been correctly received and a second condition occurring when said incoming data packet has been correctly received but said storing means was not able to store said incoming data packet; and means coupled to said detecting means for generating a first code indicating when either of said first or second conditions has occurred and including said first code in said acknowledgment data;

transmission buffer means for storing an outgoing data packet from said client data processing unit for transmission to another data processing unit in said local area data network;

means for preparing said outgoing data packet for transmission by adding unique flag data which delimits the boundaries of said outgoing data packet; and means for placing an incoming response packet corresponding to a previously transmitted data packet in said storing means at a known location relative to the location in said storing means from which said data packet was transmitted.

47. A data link controller for a communications interface of a client data processing unit coupled to a data communications network coupled to other data processing units, comprising:

means coupled to said network for transmitting outgoing and receiving incoming packets, said packets including data packets and response packets;

means coupled to said receiving means for storing incoming data packets on a first-in/first-out basis;

means coupled to said storing means for determining the status of said storing means;

means coupled to said determining means for generating a code indicating when said storing means is full;

means coupled to said generating means for preventing storage of said incoming data packets when said storing means is full;

means for preparing acknowledgment data from an incoming packet;

means for including said acknowledgment data in an outgoing response packet;

means for including said code in said acknowledgment data;

transmission buffer means for storing an outgoing data packet from said client data processing unit for transmission to another data processing unit in said local area data network;

means for preparing said outgoing data packet for transmission by adding unique flag data which delimits the boundaries of said outgoing data packet; and means for placing an incoming response packet corresponding to a previously transmitted data packet in said storing means at a known location relative to the location in said storing means from which said data packet was transmitted.

48. A communications interface for a client data processing unit that sends outgoing and receives incoming packets to and from other data processing units over a common data link, said packets including data packets and response packets, said interface comprising:

means coupled to said data link for receiving an incoming packet from said data link;

means coupled to said receiving means for generating an outgoing response packet corresponding to an incoming data packet directed to said client data processing unit; and means coupled to said data link and said generating means for transmitting outgoing packets onto said data link, an outgoing data packet being transmitted after performing a link acquisition protocol and said outgoing response packet being transmitted after the reception of said incoming packet at a time which is independent of the length of said data link, said outgoing response packet being transmitted without performing a link acquisition protocol.

* * * * *